United States Patent
Bohannon et al.

(10) Patent No.: US 11,582,347 B2
(45) Date of Patent: Feb. 14, 2023

(54) SYSTEM AND METHOD FOR ENHANCED VIRTUAL QUEUING

(71) Applicant: Virtual Hold Technology Solutions, LLC

(72) Inventors: Daniel Bohannon, Livermore, CA (US); Richard Daniel Siebert, Franklin, TN (US); Jay Power, Franklin, TN (US); Matthew Donaldson Moller, Petaluma, CA (US); Matthew DiMaria, Brentwood, TN (US); Shannon Lekas, Cushing, TX (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

(21) Appl. No.: 17/667,522

(22) Filed: Feb. 8, 2022

(65) Prior Publication Data
US 2022/0174155 A1    Jun. 2, 2022

Related U.S. Application Data

(63) Continuation-in-part of application No. 17/667,034, filed on Feb. 8, 2022, and a continuation-in-part of application No. 17/572,620, filed on Jan. 10, 2022, which is a continuation of application No. 17/389,837, filed on Jul. 30, 2021, now Pat. No.
(Continued)

(51) Int. Cl.
*G06F 15/173* (2006.01)
*H04M 3/523* (2006.01)
*H04L 67/306* (2022.01)
*G06Q 10/047* (2023.01)
*G06Q 10/0637* (2023.01)
(Continued)

(52) U.S. Cl.
CPC ........ *H04M 3/5231* (2013.01); *G06Q 10/047* (2013.01); *G06Q 10/06375* (2013.01); *H04L 67/306* (2013.01); *H04M 3/5183* (2013.01)

(58) Field of Classification Search
CPC .............. H04M 3/5231; H04M 3/5183; G06Q 10/047; G06Q 10/06375; H04L 67/306; H04L 67/02; H04L 65/00
USPC .................................................. 709/231, 224
See application file for complete search history.

(56) References Cited

U.S. PATENT DOCUMENTS 10,026,099 B1 *  7/2018  Joshi ................. G06Q 30/0261
10,121,170 B2    11/2018 DuLeone et al.
(Continued)

*Primary Examiner* — Karen C Tang
(74) *Attorney, Agent, or Firm* — Galvin Patent Law LLC; Brian R. Galvin

(57) ABSTRACT

A system and method for managing virtual queues. A cloud-based queue service manages a plurality of queues hosted by one or more entities. The queue service is in constant communication with the entities providing queue management, queue analysis, and queue recommendations. The queue service is likewise in direct communication with queued persons. Sending periodic updates while also motivating and incentivizing punctuality and minimizing wait times based on predictive analysis. The predictive analysis uses "Big Data" and other available data resources, for which the predictions assist in the balancing of persons across multiple queues for the same event or multiple persons across a sequence of queues for sequential events.

4 Claims, 53 Drawing Sheets

Related U.S. Application Data 11,223,725, said application No. 17/667,034 is a continuation-in-part of application No. 17/235,408, filed on Apr. 20, 2021, said application No. 17/389,837 is a continuation of application No. 16/985,093, filed on Aug. 4, 2020, said application No. 17/235,408 is a continuation of application No. 16/836,798, filed on Mar. 31, 2020, now Pat. No. 10,992,811, said application No. 16/985,093 is a continuation of application No. 16/583,967, filed on Sep. 26, 2019, now Pat. No. 10,735,589, which is a continuation-in-part of application No. 16/542,577, filed on Aug. 16, 2019, now Pat. No. 10,609,218, said application No. 16/836,798 is a continuation of application No. 16/542,577, filed on Aug. 16, 2019, now Pat. No. 10,609,218, said application No. 17/389,837 is a continuation of application No. 16/523,501, filed on Jul. 26, 2019, now Pat. No. 11,146,517, which is a continuation of application No. 15/411,424, filed on Jan. 20, 2017, now Pat. No. 10,367,766.

(60) Provisional application No. 62/828,133, filed on Apr. 2, 2019, provisional application No. 62/820,190, filed on Mar. 18, 2019.

(51) Int. Cl.
*G06F 15/16* (2006.01)
*H04M 3/51* (2006.01)

(56) References Cited

U.S. PATENT DOCUMENTS

| | | | |
|---|---|---|---|
| 10,185,921 B1* | 1/2019 | Heller | G07C 9/38 |
| 10,636,069 B1* | 4/2020 | Knas | H04W 4/021 |
| 2015/0242770 A1* | 8/2015 | Song | G06Q 10/0631 |
| | | | 705/7.12 |
| 2015/0339597 A1* | 11/2015 | Chiu | H04M 1/72451 |
| | | | 705/5 |
| 2016/0055429 A1* | 2/2016 | Schwartz | G06Q 10/02 |
| | | | 705/5 |
| 2016/0227000 A1* | 8/2016 | Tsuchida | H04W 12/12 |
| 2017/0011311 A1* | 1/2017 | Backer | G06Q 10/02 |
| 2017/0270734 A1* | 9/2017 | Geraghty | G07C 11/00 |
| 2018/0033018 A1* | 2/2018 | Opalka | G06Q 30/016 |
| 2018/0129984 A1* | 5/2018 | Polk | G07C 11/00 |
| 2021/0021709 A1* | 1/2021 | Scodary | H04M 3/5234 |
| 2021/0150421 A1 | 5/2021 | Abbe et al. | |
| 2022/0148040 A1* | 5/2022 | Williams | H04N 21/47815 |
| 2022/0253867 A1* | 8/2022 | Mora | G06Q 30/0277 |

\* cited by examiner

```
┌─────────────────────────────────────────────────────────────┐
│ Interfacing with a brand interface server, which may        │
│ interface with third party or exterior services and         │
│ devices including network endpoints                         │
│ 1305                                                        │
└─────────────────────────────────────────────────────────────┘
                              ↓
┌─────────────────────────────────────────────────────────────┐
│ Receive a request for a callback to a callback recipient    │
│ from a callback requester                                   │
│ 1310                                                        │
└─────────────────────────────────────────────────────────────┘
                              ↓
┌─────────────────────────────────────────────────────────────┐
│ Instantiate a callback object, containing callback-relevant │
│ data                                                        │
│ 1315                                                        │
└─────────────────────────────────────────────────────────────┘
                              ↓
┌─────────────────────────────────────────────────────────────┐
│ Retrieve global profiles for the callback requester and the │
│ callback recipient                                          │
│ 1320                                                        │
└─────────────────────────────────────────────────────────────┘
                              ↓
┌─────────────────────────────────────────────────────────────┐
│ Analyze environment context data and available schedule     │
│ data for both callback requester and recipients             │
│ 1325                                                        │
└─────────────────────────────────────────────────────────────┘
                              ↓
┌─────────────────────────────────────────────────────────────┐
│ Determine a callback time based on the profile and the      │
│ environmental context                                       │
│ 1330                                                        │
└─────────────────────────────────────────────────────────────┘
                              ↓
┌─────────────────────────────────────────────────────────────┐
│ When a callback time arrives, attempt a first callback      │
│ 1335                                                        │
└─────────────────────────────────────────────────────────────┘
                              ↓
┌─────────────────────────────────────────────────────────────┐
│ Call a second called party, the other of the callback       │
│ requester and callback recipients, when the first called    │
│ party is online                                             │
│ 1340                                                        │
└─────────────────────────────────────────────────────────────┘
                              ↓
┌─────────────────────────────────────────────────────────────┐
│ Connect the called parties when the second called party is  │
│ online, and delete the callback object                      │
│ 1345                                                        │
└─────────────────────────────────────────────────────────────┘
```

Fig. 13

Interfacing with a brand interface server, which may interface with third party or exterior services and devices including network endpoints
1405

Analyze intent of user based on context of input
1410

Receive a request for a callback to a callback recipient from a callback requester
1415

Instantiate a callback object, containing callback-relevant data
1420

Retrieve global profiles for the callback requester and the callback recipient
1425

Analyze environment context data and available schedule data for both callback requester and recipients
1430

Determine a callback time based on the profile and the environmental context
1435

When a callback time arrives, attempt a first callback
1440

Call a second called party, the other of the callback requester and callback recipients, when the first called party is online
1445

Connect the called parties when the second called party is online, and delete the callback object
1450

Fig. 14

| Time until reservation | Notification Type |
|---|---|
| 20 minutes | Preferred / Push / Text |
| 10 minutes | Preferred / Push / Text |
| 5 minutes | Preferred / Push / Text |
| 0 minutes | Preferred / Push / Text |
| -2 minutes | Preferred / Push / Text |
| -5 minutes | IVR call |
| -7 minutes | Intercom announcement |
| -10 minutes | Call center agent |

Fig. 44

| Time ▲ | Notification Type |
|---|---|
| -20 minutes | Call center agent |
| -10 minutes | IVR call |
| -5 minutes | IVR call |
| 0 minutes | Preferred / Push / Text |
| >2 minutes | Preferred / Push / Text if moved up in queue |

Fig. 45

SYSTEM AND METHOD FOR ENHANCED VIRTUAL QUEUING

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/572,620
Ser. No. 17/235,408
Ser. No. 17/389,837
Ser. No. 16/985,093
Ser. No. 16/583,967
Ser. No. 16/542,577
Ser. No. 62/820,190
Ser. No. 62/828,133
Ser. No. 16/523,501
Ser. No. 15/411,424

BACKGROUND OF THE INVENTION

Field of the Art

The disclosure relates to queuing, specifically to the field of cloud-implemented automated callback systems.

Discussion of the State of the Art

Queues have been around for at least 185 years. With urbanization and population growth increasing the length of most queues by orders of magnitude in some situations. The design of the queue has changed ever-so-slightly, zig-zagging the line for example, but the basic queue remains relatively unchanged. That was up until virtual queuing came around in the form of paper tickets and more recently electronic pagers. However, these new modes require a queued person to remain within earshot of an announcement or within visual range of a monitor, in the case of paper tickets. In the case of pagers, a queued person is still limited in physical space by the range of the pager. Newer virtual queuing systems have been devised to use a person's mobile device, but still haven't really added much to queuing. These current solutions fail to efficiently facilitate or even address at all the complexity of multiple queues, punctuality concerns and no-shows, and simply does not take advantage of modern-day advantages such as "Big Data."

What is needed is a system and method for virtual queuing that overcomes the limitations of the prior art as noted above by organizing and motivating multiple persons between multiple queues and taking full advantage of the breadth of data available to make predictions and organize queues.

SUMMARY OF THE INVENTION

Accordingly, the inventor has conceived and reduced to practice, a system and method for managing virtual queues. A cloud-based queue service manages a plurality of queues hosted by one or more entities. The queue service is in constant communication with the entities providing queue management, queue analysis, and queue recommendations. The queue service is likewise in direct communication with queued persons. Sending periodic updates while also motivating and incentivizing punctuality and minimizing wait times based on predictive analysis. The predictive analysis uses "Big Data" and other available data resources, for which the predictions assist in the balancing of persons across multiple queues for the same event or multiple persons across a sequence of queues for sequential events.

According to a first preferred embodiment, a system for enhanced virtual queuing is disclosed, comprising: a task blending service comprising at least a processor, a memory, and a first plurality of programming instructions stored in the memory and operating on the processor, wherein the first plurality of programming instructions, when operating on the processor, cause the processor to: receive a plurality of data relating to the historical throughput of a queue; model future iterations of the queue using the plurality of data; determine times of low queue throughput; reallocate computational resources used for queue simulations during times of low queue throughput; use the reallocated computational resources for simulating new queue configurations for the duration of the low queue throughput; analyze the new queue configuration simulations for an optimal configuration, wherein the optimal configuration is the simulation with the least wait time; and output the difference between the current queue configuration and the optimal queue simulation as a set of recommendations.

According to a second preferred embodiment, a method for enhanced virtual queuing is disclosed, comprising the steps of: receiving a plurality of data relating to the historical throughput of a queue; modelling future iterations of the queue using the plurality of data; determining times of low queue throughput; reallocating computational resources used for queue simulations during times of low queue throughput; using the reallocated computational resources for simulating new queue configurations for the duration of the low queue throughput; analyzing the new queue configuration simulations for an optimal configuration, wherein the optimal configuration is the simulation with the least wait time; and outputting the difference between the current queue configuration and the optimal queue simulation as a set of recommendations.

According to various aspects; wherein the task blending service predicts future queue iterations with machine learning; the system further comprising an accumulation service comprising at least a processor, a memory, and a second plurality of programming instructions stored in the memory and operating on the processor, wherein the second plurality of programming instructions, when operating on the processor, cause the processor to: receive a request to join a virtual queue from two or more persons forming a group; accumulate positions in the queue totaling the number of persons in the group; send confirmation of the request to the group; send periodic update notifications to the group based on a notification escalation plan, wherein the notification escalation plan comprises a rules-based multimodality means of communicating with the group; receive a plurality of check-in notifications from an entity indicating the group has begun to check-in, or indicating how many persons in the group have already checked-in, or indicating the group has finished checking-in; and remove the group from the virtual queue; wherein the multimodality means of communicating comprises internet-based communications, satellite communications, public telephone networks, mobile networks, Wi-Fi, Bluetooth, LoRa, public address systems, and near-field communications; wherein the request is selected from the group consisting of a request to join a queue, a request to leave a queue, a request to transfer to a different queue, a request for the current wait time of a queue, a request for additional time, a request to schedule a position in a queue for a later time, and a request to change places in a queue; further comprising a call blending feature comprising at least a processor, a memory, and a third plurality of programming instructions stored in the memory and operating on the processor, wherein the third plurality of programming instructions, when operating on the processor, cause the processor to: dynamically shift call center agents to place outbound marketing calls during times of low queue throughput; wherein the optimal configuration is the simulation with the least distance a queued person must travel; wherein the optimal configuration is the simulation with wherein the queue occupies the least amount of space while maintaining at least 6 feet of separation between queued persons; wherein the optimal configuration is the simulation with the least amount of cost to an entity hosting a physical queue associated with the virtual queue; wherein the optimal configuration is the simulation with the least cost to the queued persons.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 13 is a method diagram illustrating the use of a callback cloud for intent-based active callback management, including gathering of environmental context data of users, according to an embodiment.

FIG. 14 is a method diagram illustrating the use of a callback cloud for intent-based active callback management, including a brand interface server and intent analyzer, according to an embodiment.

FIG. 44 is a table diagram showing an exemplary and simplified rules-based notification escalation plan, according to one aspect.

FIG. 45 is a table diagram showing an exemplary and simplified rules-based notification escalation plan that further uses location data, according to one aspect.

DETAILED DESCRIPTION

Figure 1:
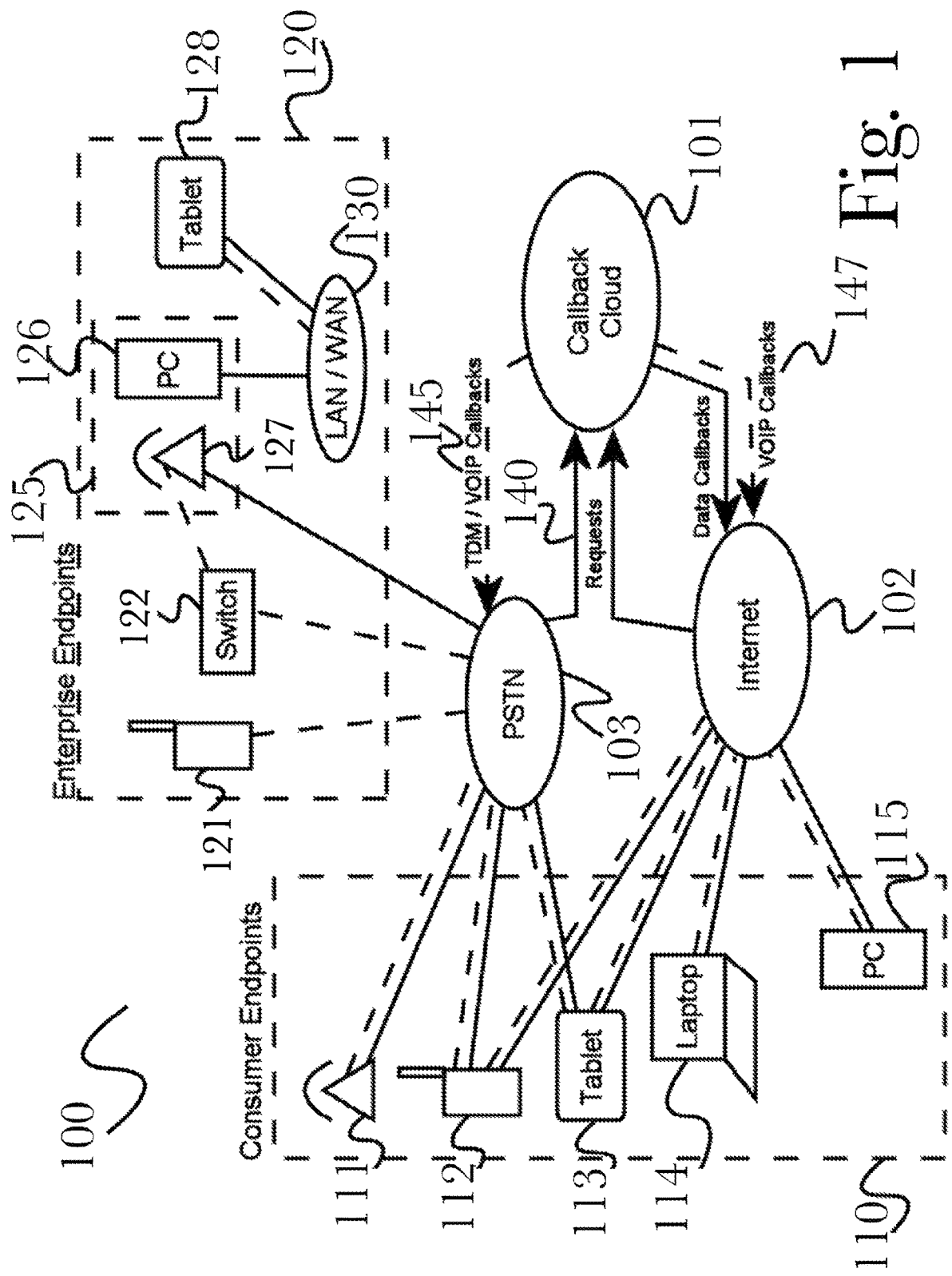
FIG. 1 is a block diagram illustrating an exemplary system architecture for operating a callback cloud, according to one aspect.

The inventor has conceived, and reduced to practice, a system and method for managing virtual queues. A cloud-based queue service manages a plurality of queues hosted by one or more entities. The queue service is in constant communication with the entities providing queue management, queue analysis, and queue recommendations. The queue service is likewise in direct communication with queued persons. Sending periodic updates while also motivating and incentivizing punctuality and minimizing wait times based on predictive analysis. The predictive analysis uses "Big Data" and other available data resources, for which the predictions assist in the balancing of persons across multiple queues for the same event or multiple persons across a sequence of lines for sequential events.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to an instance of an individual being contacted after their initial contact was unsuccessful. For instance, if a first user calls a second user on a telephone, but the second user does not receive their call for one of numerous reasons including turning off their phone or simply not picking up, the second user may then place a callback to the first user once they realize they missed their call. This callback concept applies equally to many forms of interaction that need not be restricted to telephone calls, for example including (but not limited to) voice calls over a telephone line, video calls over a network connection, or live text-based chat such as web chat or short message service (SMS) texting, email, and other messaging applications (e.g., WhatsApp, etc.). While a callback (and various associated components, methods, and operations taught herein) may also be used with an email communication despite the inherently asynchronous nature of email (participants may read and reply to emails at any time, and need not be interacting at the same time or while other participants are online or available), the preferred usage as taught herein refers to synchronous communication (that is, communication where participants are interacting at the same time, as with a phone call or chat conversation).

"Callback object" as used herein means a data object representing callback data, such as the identities and call information for a first and second user, the parameters for a callback including what time it shall be performed, and any other relevant data for a callback to be completed based on the data held by the callback object.

"Latency period" as used herein refers to the period of time between when a Callback Object is created and the desired Callback is initiated, for example, if a callback object is created and scheduled for a time five hours from the creation of the object, and the callback initiates on-time in five hours, the latency period is equal to the five hours between the callback object creation and the callback initiation.

"Brand" as used herein means a possible third-party service or device that may hold a specific identity, such as a specific MAC address, IP address, a username or secret key which can be sent to a cloud callback system for identification, or other manner of identifiable device or service that may connect with the system. Connected systems or services may include a Private Branch Exchange ("PBX"), call router, chat server which may include text or voice chat data, a Customer Relationship Management ("CRM") server, an Automatic Call Distributor ("ACD"), or a Session Initiation Protocol ("SIP") server.

Conceptual Architecture

FIG. 1 is a block diagram of a preferred embodiment of the invention, illustrating an exemplary architecture of a system 100 for providing a callback cloud service. According to the embodiment, callback cloud 101 may receive requests 140 via a plurality of communications networks such as a public switched telephone network (PSTN) 103 or the Internet 102. These requests may comprise a variety of communication and interaction types, for example including (but not limited to) voice calls over a telephone line, video calls over a network connection, or live text-based chat such as web chat or short message service (SMS) texting via PSTN 103. Such communications networks may be connected to a plurality of consumer endpoints 110 and enterprise endpoints 120 as illustrated, according to the particular architecture of communication network involved. Exemplary consumer endpoints 110 may include, but are not limited to, traditional telephones 111, cellular telephones 112, mobile tablet computing devices 113, laptop computers 114, or desktop personal computers (PC) 115. Such devices may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 100 according to the invention.

A PSTN 103 or the Internet 102 (and it should be noted that not all alternate connections are shown for the sake of simplicity, for example a desktop PC 126 may communicate via the Internet 102) may be further connected to a plurality of enterprise endpoints 120, which may comprise cellular telephones 121, telephony switch 122, desktop environment 125, internal Local Area Network (LAN) or Wide-Area Network (WAN) 130, and mobile devices such as tablet computing device 128. As illustrated, desktop environment 125 may include both a telephone 127 and a desktop computer 126, which may be used as a network bridge to connect a telephony switch 122 to an internal LAN or WAN 130, such that additional mobile devices such as tablet PC 128 may utilize switch 122 to communicate with PSTN 102. Telephone 127 may be connected to switch 122 or it may be connected directly to PSTN 102. It will be appreciated that the illustrated arrangement is exemplary, and a variety of arrangements that may comprise additional devices known in the art are possible, according to the invention.

Callback cloud 101 may respond to requests 140 received from communications networks with callbacks appropriate to the technology utilized by such networks, such as data or Voice over Internet Protocol (VOIP) callbacks 145, 147 sent to Internet 102, or time-division multiplexing (TDM) such as is commonly used in cellular telephony networks such as the Global System for Mobile Communications (GSM) cellular network commonly used worldwide, or VOIP callbacks to PSTN 103. Data callbacks 147 may be performed over a variety of Internet-enabled communications technologies, such as via e-mail messages, application pop-ups, or Internet Relay Chat (IRC) conversations, and it will be appreciated by one having ordinary skill in the art that a wide variety of such communications technologies are available and may be utilized according to the invention. VOIP callbacks may be made using either, or both, traditional telephony networks such as PSTN 103 or over VOIP networks such as Internet 102, due to the flexibility to the technology involved and the design of such networks. It will be appreciated that such callback methods are exemplary, and that callbacks may be tailored to available communications technologies according to the invention.

Additionally, callback cloud 101 may receive estimated wait time (EWT) information from an enterprise 120 such as a contact center. This information may be used to estimate the wait time for a caller before reaching an agent (or other destination, such as an automated billing system), and determine whether to offer a callback proactively before the customer has waited for long. EWT information may also be used to select options for a callback being offered, for example to determine availability windows where a customer's callback is most likely to be fulfilled (based on anticipated agent availability at that time), or to offer the customer a callback from another department or location that may have different availability. This enables more detailed and relevant callback offerings by incorporating live performance data from an enterprise, and improves customer satisfaction by saving additional time with preselected recommendations and proactively-offered callbacks.

Figure 2:
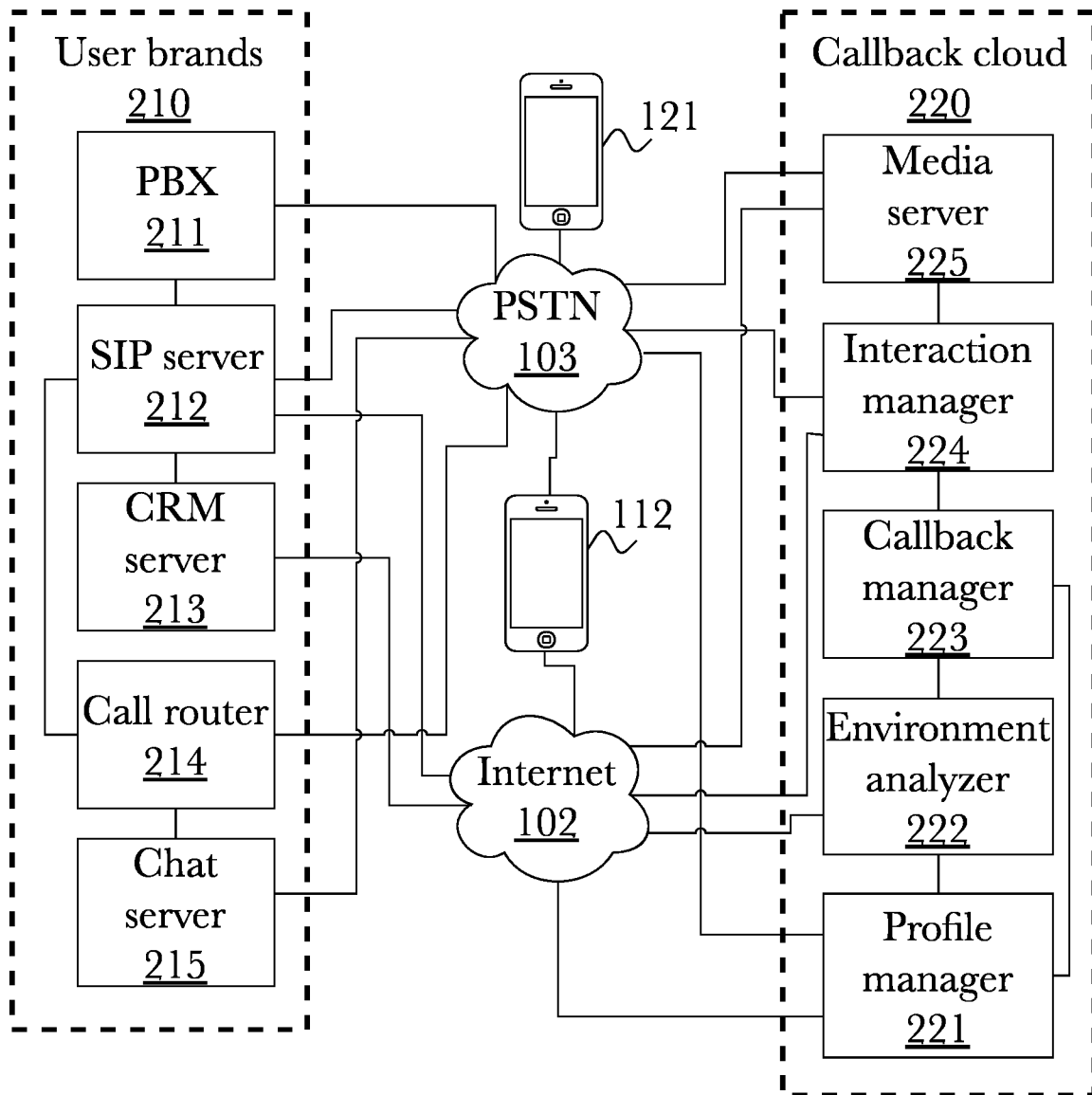
FIG. 2 is a block diagram illustrating an exemplary system architecture for a callback cloud operating over a public switched telephone network and internet, to a variety of other brand devices and services, according to an embodiment.

FIG. 2 is a block diagram illustrating an exemplary system architecture for a callback cloud operating over a public switched telephone network and the Internet, and connecting to a variety of other brand devices and services, according to an embodiment. A collection of user brands 210 may be present either singly or in some combination, possibly including a Public Branch Exchange ("PBX") 211, a Session Initiation Protocol ("SIP") server 212, a Customer Relationship Management ("CRM") server 213, a call router 214, or a chat server 215, or some combination of these brands. These brands 210 may communicate over a combination of, or only one of, a Public Switched Telephone Network ("PSTN") 103, and the Internet 102, to communicate with other devices including a callback cloud 220, a company phone 121, or a personal cellular phone 112. A SIP server 212 is responsible for initiating, maintaining, and terminating sessions of voice, video, and text or other messaging protocols, services, and applications, including handling of PBX 211 phone sessions, CRM server 213 user sessions, and calls forwarded via a call router 214, all of which may be used by a business to facilitate diverse communications requests from a user or users, reachable by phone 121, 112 over either PSTN 103 or the Internet 102. A chat server 215 may be responsible for maintaining one or both of text messaging with a user, and automated voice systems involving technologies such as an Automated Call Distributor ("ACD"), forwarding relevant data to a call router 214 and CRM server 213 for further processing, and a SIP server 212 for generating communications sessions not run over the PSTN 103. Various systems may also be used to monitor their respective interactions (for example, chat session by a chat server 215 or phone calls by an ACD or SIP server 212), to track agent and resource availability for producing EWT estimations.

When a user calls from a mobile device 112 or uses some communication application such as (for example, including but not limited to) SKYPE™ or instant messaging, which may also be available on a laptop or other network endpoint other than a cellular phone 112, they may be forwarded to brands 210 operated by a business in the manner described herein. For example, a cellular phone call my be placed over PSTN 103 before being handled by a call router 214 and generating a session with a SIP server 212, the SIP server creating a session with a callback cloud 220 with a profile manager 221 if the call cannot be completed, resulting in a callback being required. A profile manager 221 manages the storage, retrieval, and updating of user profiles, including global and local user profiles. The profile manager 221, which may be located in a callback cloud 220 receives initial requests to connect to callback cloud 220, and forwards relevant user profile information to a callback manager 223, which may further request environmental context data from an environment analyzer 222. Environmental context data may include (for example, and not limited to) recorded information about when a callback requester or callback recipient may be suspected to be driving or commuting from work, for example, and may be parsed from online profiles or online textual data, using an environment analyzer 222.

A callback manager 223 centrally manages all callback data, creating a callback programming object which may be used to manage the data for a particular callback, and communicates with an interaction manager 224 which handles requests to make calls and bridge calls, which go out to a media server 225 which actually makes the calls as requested. For example, interaction manager 224 may receive a call from a callback requester, retrieve callback parameters for that callback requester from the callback manager 223, and cause the media server 225 to make a call to a callback recipient while the callback requester is still on the line, thus connecting the two parties. After the call is connected, the callback programming object used to make the connection may be deleted. The interaction manager 224 may subsequently provide changed callback parameters to the callback manager 223 for use or storage. In this way, the media server 225 may be altered in the manner in which it makes and bridges calls when directed, but the callback manager 223 does not need to adjust itself, due to going through an intermediary component, the interaction manager 224, as an interface between the two. A media server 225, when directed, may place calls and send messages, emails, or connect voice over IP ("VoIP") calls and video calls, to users over a PSTN 103 or the Internet 102. Callback manager 223 may work with a user's profile as managed by a profile manager 221, with environmental context from an environment analyzer 222 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 224 to physically place and bridge the calls with a media server 225. In this way, a user may communicate with another user on a PBX system 211, or with automated services hosted on a chat server 215, and if they do not successfully place their call or need to be called back by a system, a callback cloud 220 may find an optimal time to bridge a call between the callback requestor and callback recipient, as necessary.

Figure 3:
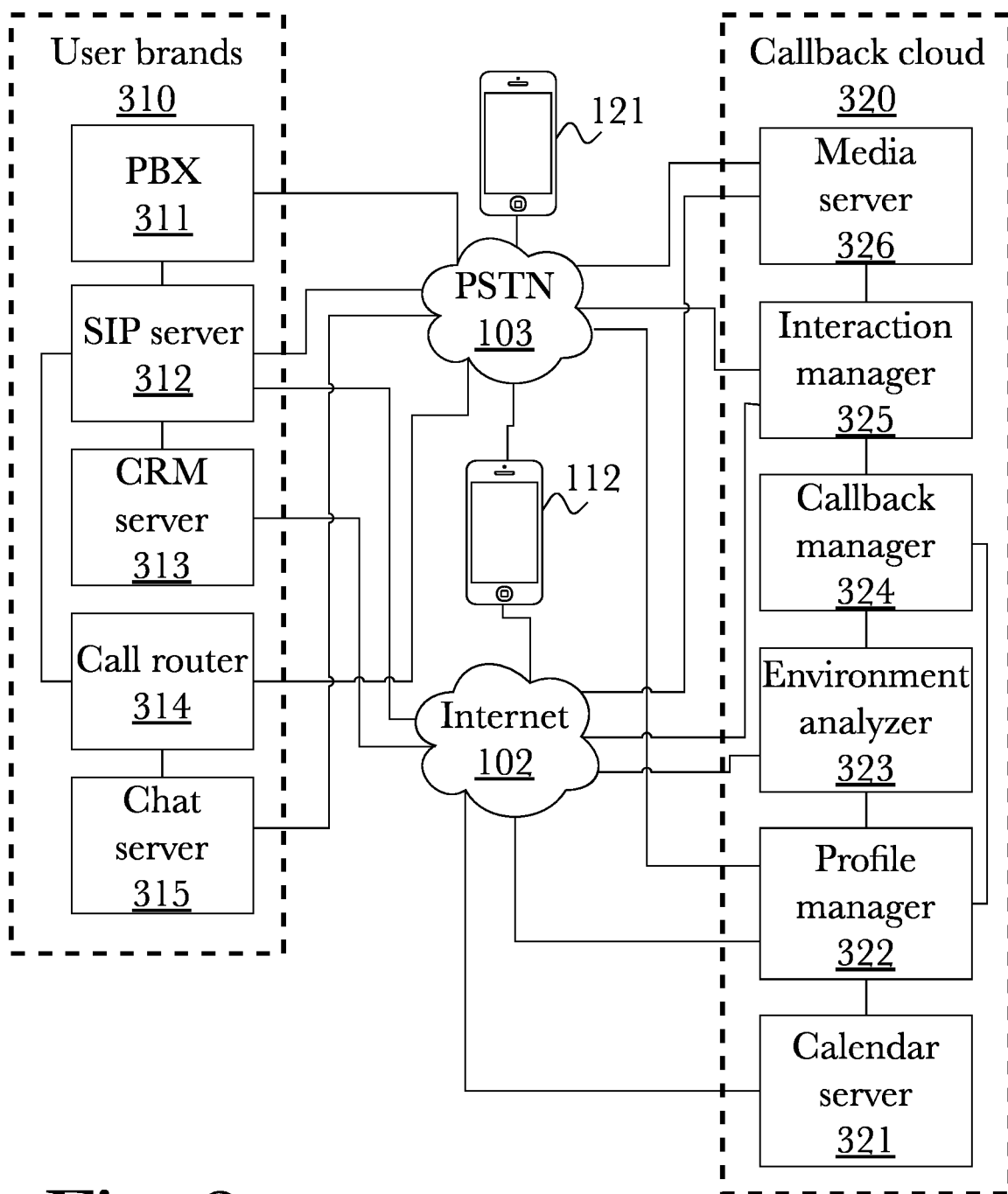
FIG. 3 is a block diagram illustrating an exemplary system architecture for a callback cloud operating including a calendar server, over a public switched telephone network and internet, to a variety of other brand devices and services, according to an embodiment.

FIG. 3 is a block diagram illustrating an exemplary system architecture for a callback cloud including a calendar server operating over a public switched telephone network and the Internet, and connected to a variety of other brand devices and services, according to an embodiment. According to this embodiment, many user brands 310 are present, including PBX system 311, a SIP server 312, a CRM server 313, a call router 314, and a chat server 315, which may be connected variously to each other as shown, and connected to a PSTN 103 and the Internet 102, which further connect to a cellular phone 112 and a landline 121 or other phone that may not have internet access. As further shown, callback cloud 320 contains multiple components, including a calendar server 321, profile manager 322, environment analyzer 323, callback manager 324, interaction manager 325, and media server 326, which similarly to user brands 310 may be interconnected in various ways as depicted in the diagram, and connected to either a PSTN 103 or the internet 102.

A calendar server 321, according to the embodiment, is a server which may store and retrieve, either locally or from internet-enabled services associated with a user, calendars which hold data on what times a user may be available or busy (or some other status that may indicate other special conditions, such as to allow only calls from certain sources) for a callback to take place. A calendar server 321 connects to the internet 102, and to a profile manager 322, to determine the times a callback requestor and callback recipient may both be available.

Figure 4:
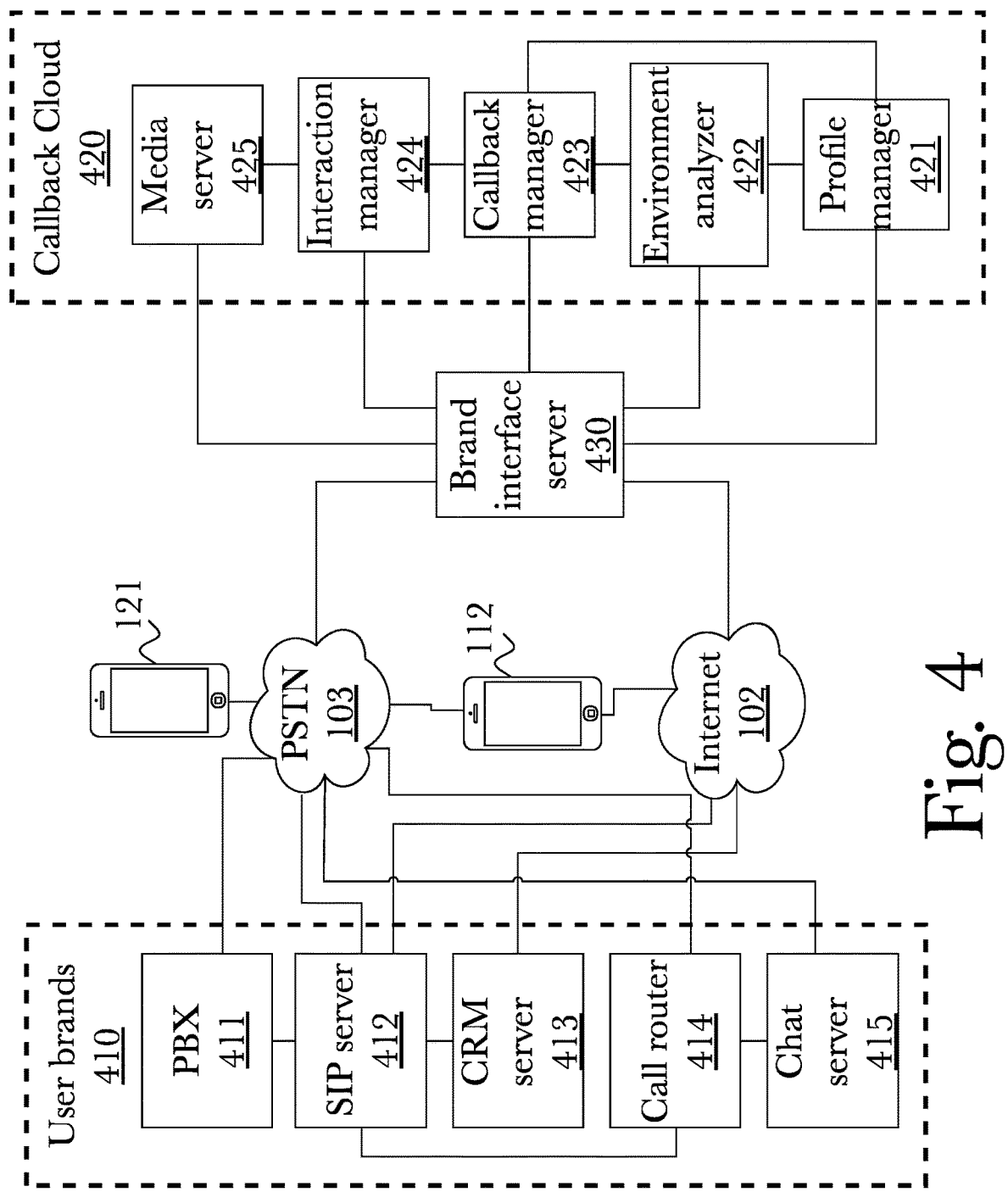
FIG. 4 is a block diagram illustrating an exemplary system architecture for a callback cloud operating including a brand interface server, over a public switched telephone network and internet, to a variety of other brand devices and services, according to an embodiment.

FIG. 4 is a block diagram illustrating an exemplary system architecture for a callback cloud including a brand interface server, operating over a public switched telephone network and the Internet, and connected to a variety of other brand devices and services, according to an embodiment. According to this embodiment, many user brands 410 are present, including PBX system 411, a SIP server 412, a CRM server 413, a call router 414, and a chat server 415, which may be connected variously to each other as shown, and connected to a PSTN 103 and the Internet 102, which further connect to a cellular phone 112 and a landline 121 or other phone that may not have internet access. As further shown, callback cloud 420 contains multiple components, including a profile manager 421, environment analyzer 422, callback manager 423, interaction manager 424, and media server 425, which similarly to user brands 410 may be interconnected in various ways as depicted in the diagram, and connected to either a PSTN 103 or the internet 102.

Present in this embodiment is a brand interface server 430, which may expose the identity of, and any relevant API's or functionality for, any of a plurality of connected brands 410, to elements in a callback cloud 420. In this way, elements of a callback cloud 420 may be able to connect to, and interact more directly with, systems and applications operating in a business' infrastructure such as a SIP server 412, which may be interfaced with a profile manager 421 to determine the exact nature of a user's profiles, sessions, and interactions in the system for added precision regarding their possible availability and most importantly, their identity.

Figure 5:
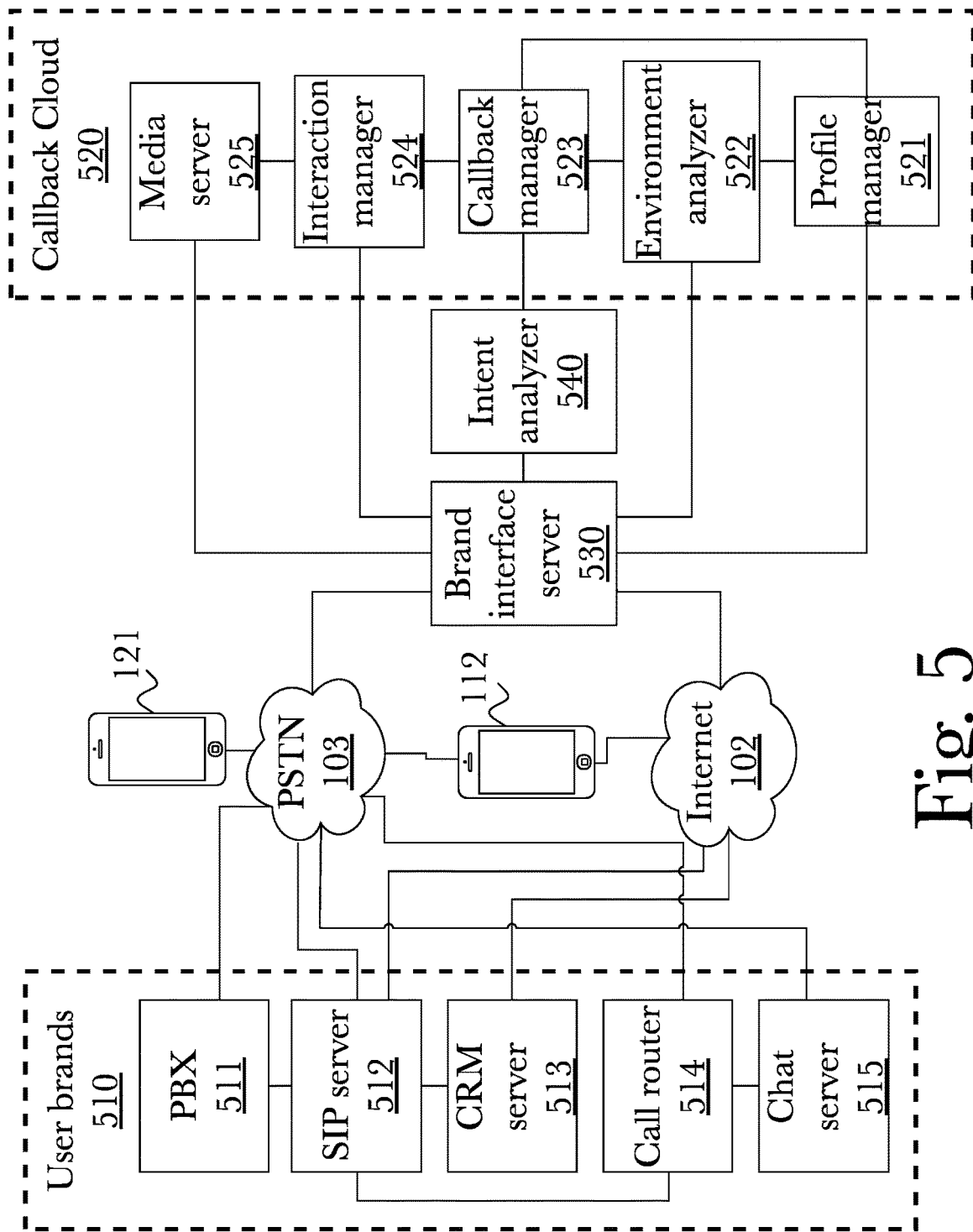
FIG. 5 is a block diagram illustrating an exemplary system architecture for a callback cloud operating including a brand interface server and intent analyzer, over a public switched telephone network and internet, to a variety of other brand devices and services, according to an embodiment.

FIG. 5 is a block diagram illustrating an exemplary system architecture for a callback cloud including a brand interface server and intent analyzer, operating over a public switched telephone network and the Internet, and connected to a variety of other brand devices and services, according to an embodiment. According to this embodiment, many user brands 510 are present, including PBX system 511, a SIP server 512, a CRM server 513, a call router 514, and a chat server 515, which may be connected variously to each other as shown, and connected to a PSTN 103 and the Internet 102, which further connect to a cellular phone 112 and a landline 121 or other phone that may not have internet access. Further shown is a callback cloud 520 contains multiple components, including a profile manager 521, environment analyzer 522, callback manager 523, interaction manager 524, and media server 525, which similarly to user brands 510 may be interconnected in various ways as depicted in the diagram, and connected to either a PSTN 103 or the internet 102.

Present in this embodiment is a brand interface server 530, which may expose the identity of, and any relevant API's or functionality for, any of a plurality of connected brands 510, to elements in a callback cloud 520. In this way, elements of a callback cloud 520 may be able to connect to, and interact more directly with, systems and applications operating in a business' infrastructure such as a SIP server 512, which may be interfaced with a profile manager 521 to determine the exact nature of a user's profiles, sessions, and interactions in the system for added precision regarding their possible availability and most importantly, their identity. Also present in this embodiment is an intent analyzer 540, which analyzes spoken words or typed messages from a user that initiated the callback request, to determine their intent for a callback. For example, their intent may be to have an hour-long meeting, which may factor into the decision by a callback cloud 520 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 6:
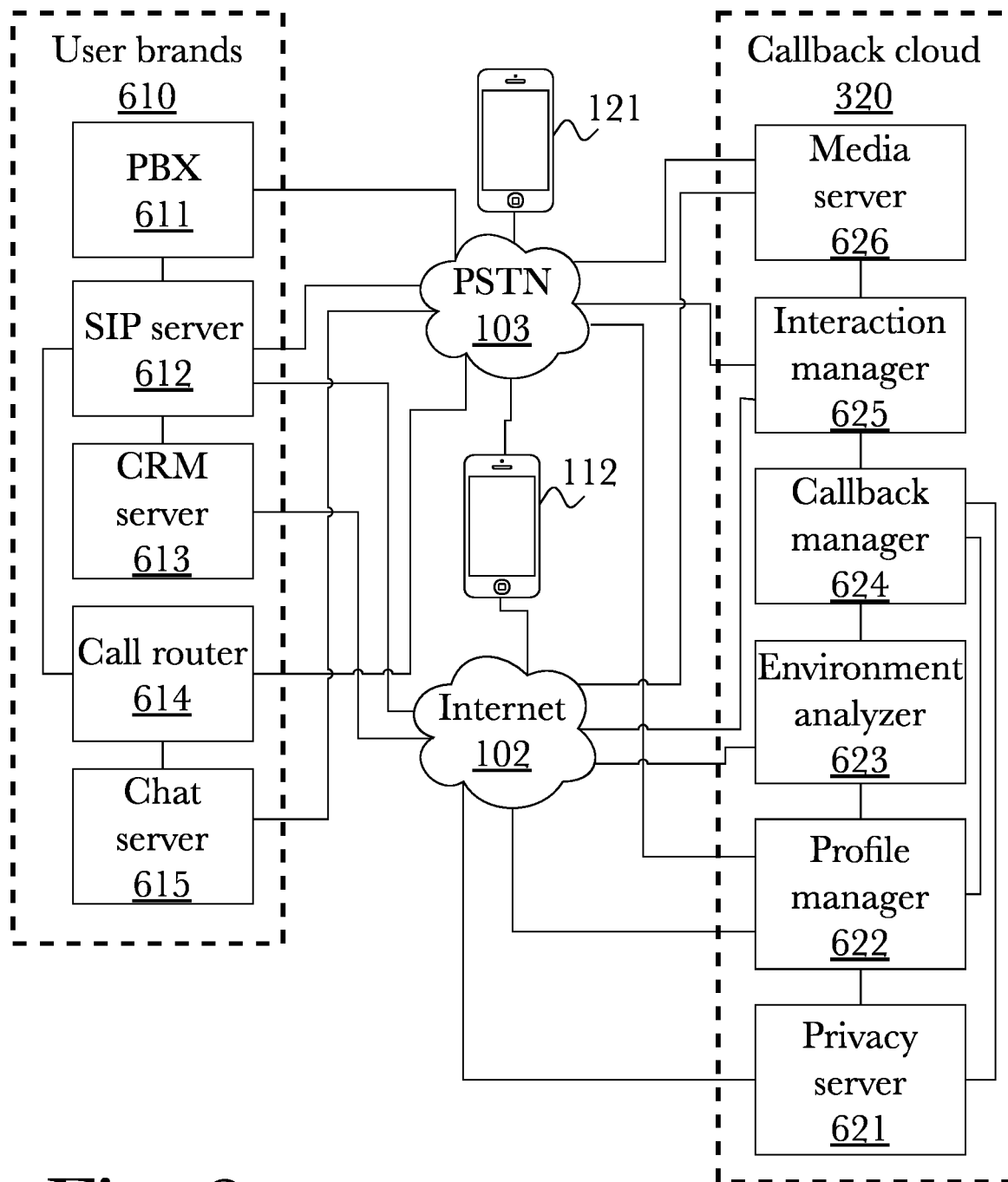
FIG. 6 is a block diagram illustrating an exemplary system architecture for a callback cloud operating including a privacy server, over a public switched telephone network and internet, to a variety of other brand devices and services, according to an embodiment.

FIG. 6 is a block diagram illustrating an exemplary system architecture for a callback cloud including a privacy server, operating over a public switched telephone network and the Internet, and connected to a variety of other brand devices and services, according to an embodiment. According to this embodiment, many user brands 610 are present, including PBX system 611, a SIP server 612, a CRM server 613, a call router 614, and a chat server 615, which may be connected variously to each other as shown, and connected to a PSTN 103 and the Internet 102, which further connect to a cellular phone 112 and a landline 121 or other phone that may not have internet access. As further shown, a callback cloud 620 contains multiple components, including a profile manager 622, environment analyzer 623, callback manager 624, interaction manager 625, and media server 626, which similarly to user brands 610 may be interconnected in various ways as depicted in the diagram, and connected to either a PSTN 103 or the internet 102.

In this embodiment, a privacy server 621 may connect to the internet 102, and to a profile manager 622 as well as a callback manager 624, and allows for callback requestors to first be validated using trust-circles to determine if they are a trusted user. A trusted user may be defined using a variety of criteria (that may vary according to the user, interaction, device, enterprise, or other context), and may for example comprise a determination of whether the callback requestor is a friend or family member, or is using a trusted brand such as a piece of equipment from the same company that the callback recipient works at, or if the callback requestor is untrusted or is contacting unknown recipients, to determine if a callback request is permitted based on user settings. Further, a privacy server 621 may encrypt one or both of incoming and outgoing data from a callback manager 624 in such a way as to ensure that, for example, a callback recipient might not know who requested the callback, or their profile may not be visible to the recipient, or vice versa, and other privacy options may also be enabled as needed by a corporation. Encryption may utilize public or private keys, or may utilize perfect forward secrecy (such that even the enterprise routing the call cannot decrypt it), or other encryption schema or combinations thereof that may provide varying features or degrees of privacy, security, or anonymity (for example, one enterprise may permit anonymous callbacks while another may require a user to identify themselves and may optionally verify this identification).

Figure 7:
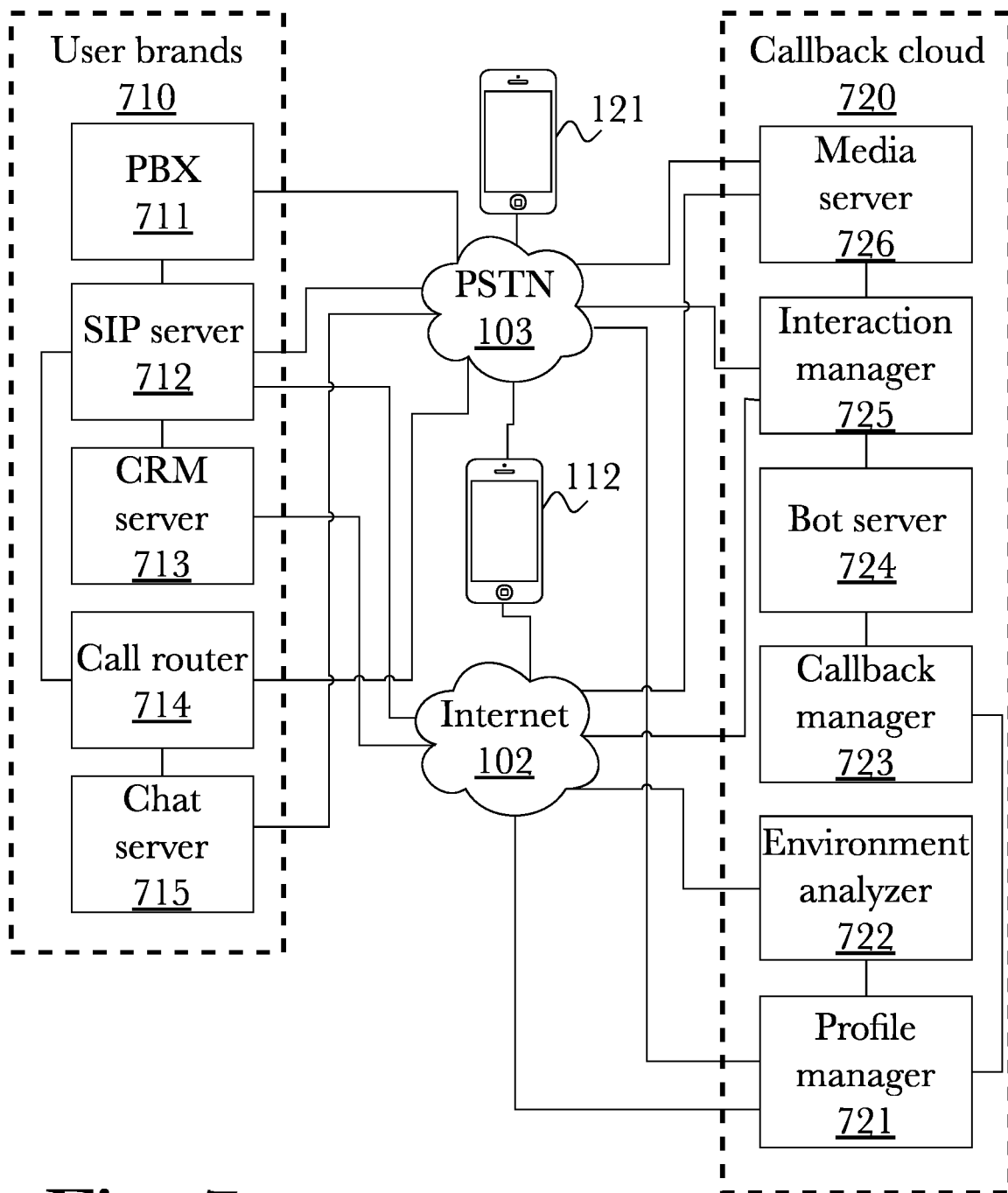
FIG. 7 is a block diagram illustrating an exemplary system architecture for a callback cloud operating including a bot server, over a public switched telephone network and internet, to a variety of other brand devices and services, according to an embodiment.

FIG. 7 is a block diagram illustrating an exemplary system architecture for a callback cloud including a bot server, operating over a public switched telephone network and the Internet, and connected to a variety of other brand devices and services, according to an embodiment. According to this embodiment, many user brands 710 are present, including PBX system 711, a SIP server 712, a CRM server 713, a call router 714, and a chat server 715, which may be connected variously to each other as shown, and connected to a PSTN 103 and the Internet 102, which further connect to a cellular phone 112 and a landline 121 or other phone that may not have internet access. As further shown, a callback cloud 720 contains multiple components, including a profile manager 721, environment analyzer 722, callback manager 723, interaction manager 725, and media server 726, which similarly to user brands 710 may be interconnected in various ways as depicted in the diagram, and connected to either a PSTN 103 or the internet 102.

In the present embodiment, a bot server 724 also is present in a callback cloud 720, which allows for communication with a callback requestor. Bot server 724 allows a user to specify, through any available data type such as (including, but not limited to) SMS texting, email, or audio data, any desired parameters for the callback they would like to request. This is similar to an ACD system used by individual call-centers, but exists as a separate server 724 in a cloud service 720 which may then be configured as-needed by a hosting company, and behaves akin to an automated secretary, taking user information down to specify a callback at a later time from the callback recipient.

Figure 8:
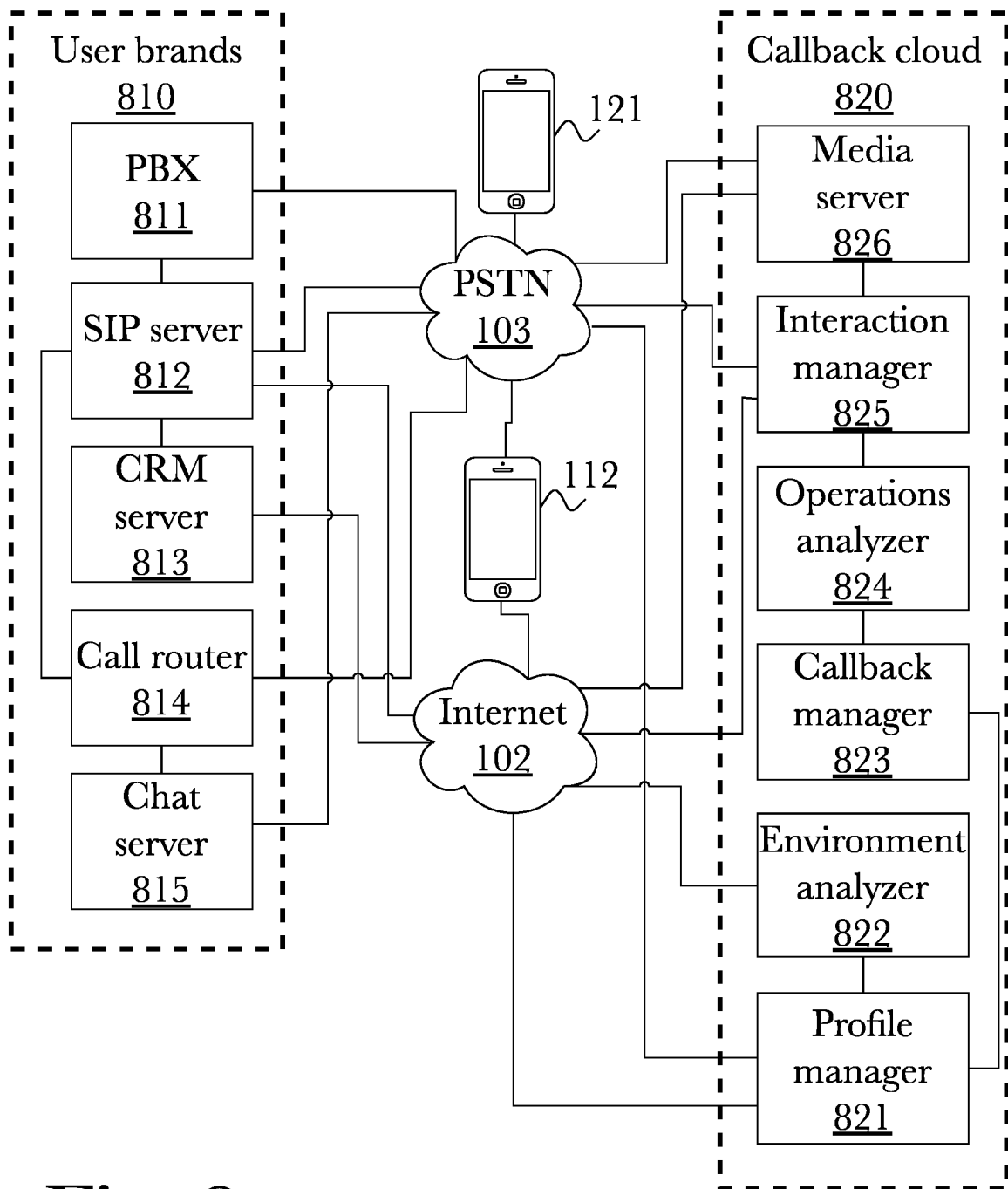
FIG. 8 is a block diagram illustrating an exemplary system architecture for a callback cloud operating including an operations analyzer over a public switched telephone network and internet, to a variety of other brand devices and services, according to an embodiment.

FIG. 8 is a block diagram illustrating an exemplary system architecture for a callback cloud including an operations analyzer operating over a public switched telephone network and the Internet, and connected to a variety of other brand devices and services, according to an embodiment. According to this embodiment, many user brands 810 are present, including PBX system 811, a SIP server 812, a CRM server 813, a call router 814, and a chat server 815, which may be connected variously to each other as shown, and connected to a PSTN 103 and the Internet 102, which further connect to a cellular phone 112 and a landline 121 or other phone that may not have internet access. As further shown, a callback cloud 820 contains multiple components, including a profile manager 821, environment analyzer 822, callback manager 823, interaction manager 825, and media server 826, which similarly to user brands 810 may be interconnected in various ways as depicted in the diagram, and connected to either a PSTN 103 or the internet 102.

In this embodiment, an operations analyzer 824 is present, which may determine a particular channel to be used to reach a callback recipient and callback requestor, for example (and not limited to), VoIP services such as SKYPE™ or DISCORD™, a PSTN phone connection, any particular phone number or user accounts to connect using, or other service, to determine the optimal method with which to reach a user during a callback. An operations analyzer 824 may also analyze and determine the points of failure in a callback cloud 820, if necessary, for example if a callback attempt fails to connect operations analyzer 824 may bridge a callback requestor and recipient using an alternate communication channel to complete the callback at the scheduled time.

Figure 9:
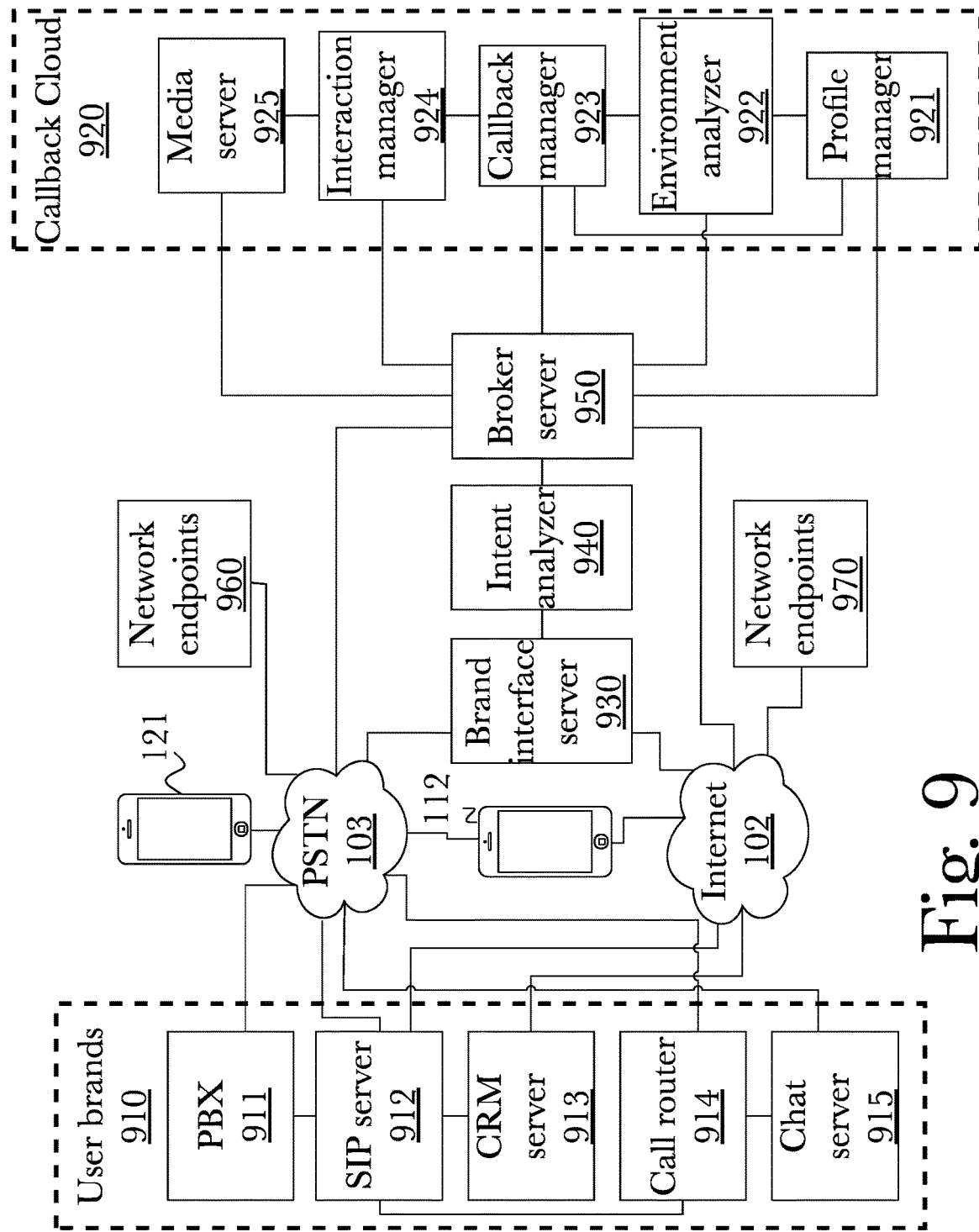
FIG. 9 is a block diagram illustrating an exemplary system architecture for a callback cloud including a brand interface server, an intent analyzer, and a broker server, operating over a public switched telephone network and internet, to a variety of other brand devices and services, according to an embodiment.

FIG. 9 is a block diagram illustrating an exemplary system architecture for a callback cloud including a brand interface server, an intent analyzer, and a broker server, operating over a public switched telephone network and internet, and connected to a variety of other brand devices and services, according to an embodiment. According to this embodiment, many user brands 910 are present, including PBX system 911, a SIP server 912, a CRM server 913, a call router 914, and a chat server 915, which may be connected variously to each other as shown, and connected to a PSTN 103 and the Internet 102, which further connect to a cellular phone 112 and a landline 121 or other phone that may not have internet access. As further shown, a callback cloud 920 contains multiple components, including a profile manager 921, environment analyzer 922, callback manager 923, interaction manager 924, and media server 925, which similarly to user brands 910 may be interconnected in various ways as depicted in the diagram, and connected to either a PSTN 103 or the internet 102. Also present are a plurality of network endpoints 960, 970, connected to either or both of the internet 102 and a PSTN 103, such network endpoints representing contact points other than a landline 121 or cell phone 112, including laptops, desktops, tablet computers, or other communication devices.

Present in this embodiment is a brand interface server 930, which may expose the identity of, and any relevant API's or functionality for, any of a plurality of connected brands 910, to an intent analyzer 940. In this way, elements of a callback cloud 920 may be able to connect to, and interact more directly with, systems and applications operating in a business' infrastructure such as a SIP server 912, which may be interfaced with a profile manager 921 to determine the exact nature of a user's profiles, sessions, and interactions in the system for added precision regarding their possible availability and most importantly, their identity. An intent analyzer 940 may analyze spoken words or typed messages from a user that initiated the callback request, to determine their intent for a callback, as well as forward data received from a brand interface server. For example, their intent may be to have an hour-long meeting, which may factor into the decision by a callback cloud 920 to place a call shortly before one or both users may be required to start commuting to or from their workplace. An intent analyzer 940 may forward all data through a broker server 950 which may allocate specific actions and responses to take between third-party brands 910 and callback cloud 920 components, as needed, as well as forward all data from the exposed and interfaced elements with the callback cloud 920.

Figure 10:
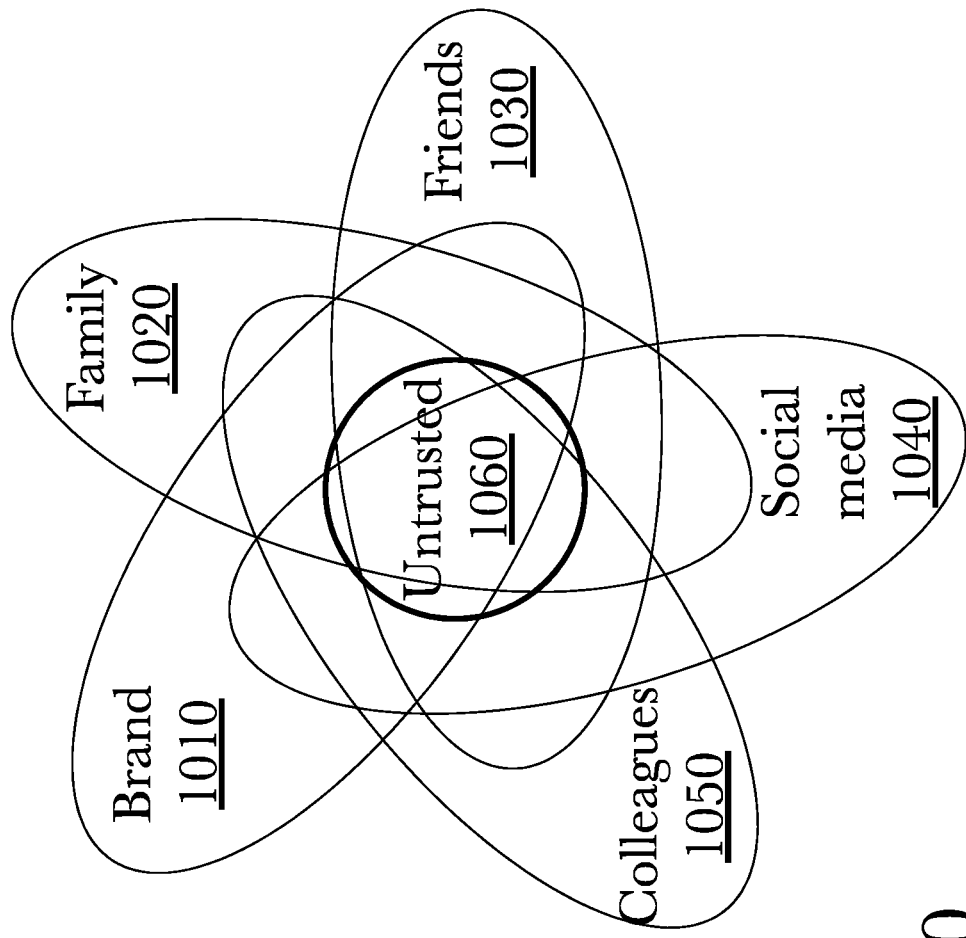
FIG. 10 is a diagram illustrating trust circles of levels of privacy for a user of a callback cloud, according to an aspect.

FIG. 10 is a diagram illustrating trust circles of levels of privacy for a user of a callback cloud, according to an aspect. These trust circles are data constructs enforced by a privacy server 621 which are determined with a profile manager 622, which indicate the level of trust that callers may possess, and therefore the system's ability to schedule a callback with the caller and the recipient. A caller who calls from a recognized brand 1010, for example a company's phone forwarded through their PBX 611, may be recognized as having the highest level of trust, due to coming from a recognized source within the same organization. Family 1020 may (for example) be the second highest level of trust, allowing for just as many privileges with callbacks, or perhaps restricting callback requests to only certain hours, to prevent users from being disrupted during certain work hours. A callback recipient's friends 1030 may occupy a level of trust lower than that of family, representing users less-trusted than family 1020 callers, and may yet have more restricted access to making callback requests for a user, and a continuing, descending hierarchy may be used to model additional levels of trust. For example, additional trust levels may include (but are not limited to) social media 1040 recognized users, colleagues 1050 which may represent individuals only loosely affiliated with a potential callback recipient, and untrusted 1060, representing users who are known to the system and deemed banned or untrustworthy, having the lowest ability to request an automated callback connection with a user. A further level of trust may exist, outside of the trust-circle paradigm, representing unknown contacts 1070, which, depending on the settings for an individual user or an organization using a callback cloud system 620, may be unable to request callbacks, or may only be able to request callbacks at certain restricted hours until they are set to a higher level of trust in the system, according to a preferred embodiment.

As shown in FIG. 10, trust circles need not be implicitly hierarchical in nature and may overlap in various ways similar to a logical Venn diagram. For example one individual may be a friend and also known on social media, or someone may be both family and a colleague (as is commonplace in family businesses or large companies that may employ many people). As shown, anybody may be considered "untrusted" regardless of their other trust groupings, for example if a user does not wish to receive callbacks from a specific friend or coworker. While the arrangement shown is one example, it should be appreciated that a wide variety of numerous overlapping configuration may be possible with arbitrary complexity, as any one person may be logically placed within any number of groups as long as the trust groupings themselves are not exclusive (such as a group for coworkers and one for individuals outside the company).

Expanding on the notion of trust circles, there may also be logical "ability" circles that correspond to various individuals' capabilities and appropriateness for various issues, such as (for example) tech support skill or training with specific products, or whether a member of a brand 1010 is actually a member of the best brand to handle a specific reason for a callback, based on the callback request context. For example, a customer requesting a callback for assistance with booking a flight may not be adequately served by employees of airlines that don't offer flights to their intended destination, so combining the brand trust zone 1010 with a capability map would indicate to the callback system which individuals are more appropriate for the callback in question. This expands from merely trusting certain users and discarding others, to a form of automated virtual concierge service that finds the user for a callback request that is most capable and relevant to the request, ensuring optimum handling of the callback requestor's needs.

Figure 11:
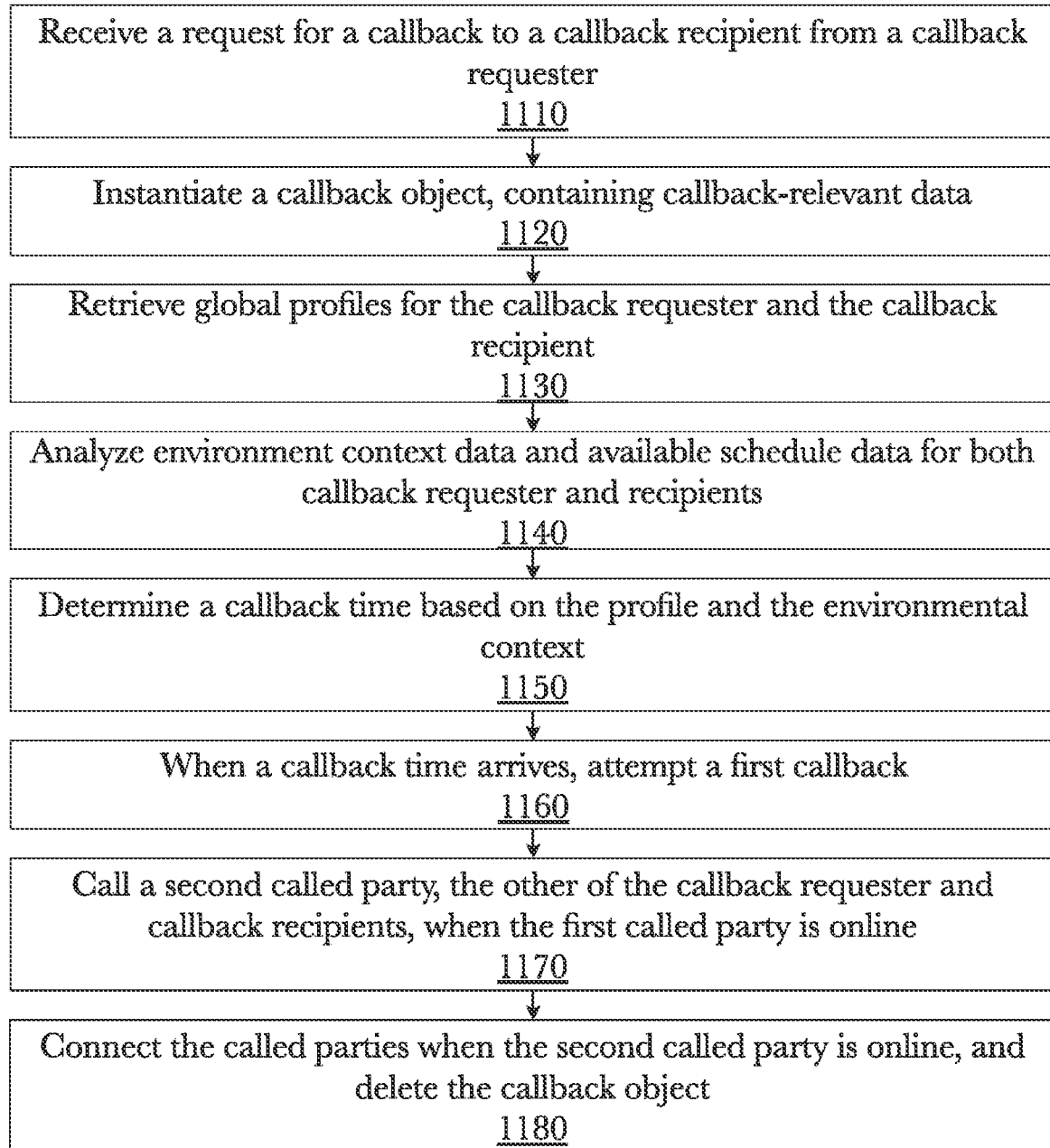
FIG. 11 is a method diagram illustrating the use of a callback cloud for intent-based active callback management, according to an embodiment.

FIG. 11 is a method diagram illustrating the use of a callback cloud for intent-based active callback management, according to an embodiment. According to an embodiment, a callback cloud 220 must receive a request for a callback to a callback recipient, from a callback requester 1110. This refers to an individual calling a user of a cloud callback system 220, being unable to connect for any reason, and the system allowing the caller to request a callback, thus becoming the callback requester, from the callback recipient, the person they were initially unable to reach. A callback object is instantiated 1120, using a callback manager 223, which is an object with data fields representing the various parts of callback data for a callback requester and callback recipient, and any related information such as what scheduled times may be possible for such a callback to take place. Global profiles may then be retrieved 1130 using a profile manager 221 in a cloud callback system, as well as an analysis of environmental context data 1140, allowing for the system to determine times when a callback may be possible for a callback requestor and callback recipient both 1150. When such a time arrives, a first callback is attempted 1160 to the callback requestor or callback recipient, and if this succeeds, a second call is attempted to the second of the callback requestor and callback recipient 1170, allowing a media server 225 to bridge the connection when both are online, before deleting the callback object 1180.

Figure 12:
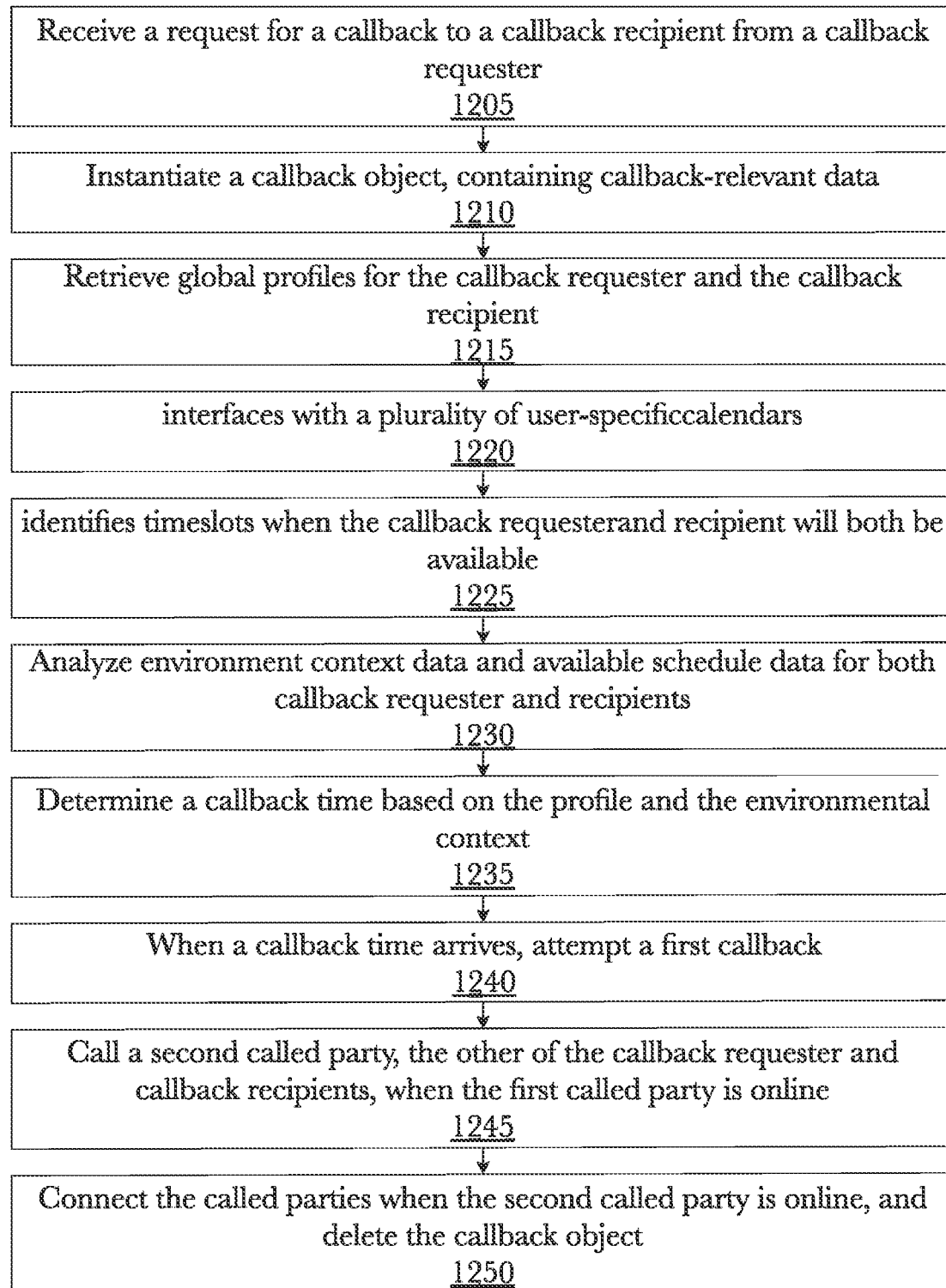
FIG. 12 is a method diagram illustrating the use of a callback cloud for intent-based active callback management, including a calendar server, according to an embodiment.

FIG. 12 is a method diagram illustrating the use of a callback cloud for intent-based active callback management, including a calendar server, according to an embodiment. According to an embodiment, a callback cloud 320 must receive a request for a callback to a callback recipient, from a callback requester 1205. This refers to an individual calling a user of a cloud callback system 320, being unable to connect for any reason, and the system allowing the caller to request a callback, thus becoming the callback requester, from the callback recipient, the person they were initially unable to reach. A callback object is instantiated 1210, using a callback manager 324, which is an object with data fields representing the various parts of callback data for a callback requester and callback recipient, and any related information such as what scheduled times may be possible for such a callback to take place. Global profiles may then be retrieved 1215 using a profile manager 322 which manages the storage and retrieval of user profiles, including global and local user profiles. The profile manager 322, which may be located in a cloud callback system, interfaces with user-specific calendars 1220 to find dates and timeslots on their specific calendars that they both may be available 1225 through use of a calendar server 321, as well as an analysis of environmental context data 1230, allowing for the system to determine times when a callback may be possible for a callback requestor and callback recipient both 1235. When such a time arrives, a first callback is attempted 1240 to the callback requestor or callback recipient, and if this succeeds, a second call is attempted to the second of the callback requestor and callback recipient 1245, allowing a media server 326 to bridge the connection when both are online, before deleting the callback object 1250.

FIG. 13 is a method diagram illustrating the use of a callback cloud for intent-based active callback management, including gathering of environmental context data of users, according to an embodiment. According to an embodiment, a callback cloud 420 may interface with a brand interface server 430, which may interface with third-party or proprietary brands of communications devices and interfaces such as automated call distributor systems 1305. Through this brand interface, the system may receive a request for a callback to a callback recipient, from a callback requester 1310. This refers to an individual calling a user of a cloud callback system 420, being unable to connect for any reason, and the system allowing the caller to request a callback, thus becoming the callback requester, from the callback recipient, the person they were initially unable to reach. A callback object is instantiated 1315, using a callback manager 423, which is an object with data fields representing the various parts of callback data for a callback requester and callback recipient, and any related information such as what scheduled times may be possible for such a callback to take place. Global profiles may then be retrieved 1320 using a profile manager 421 in a cloud callback system, as well as an analysis of environmental context data 1325, allowing for the system to determine times when a callback may be possible for a callback requestor and callback recipient both 1330. When such a time arrives, a first callback is attempted 1335 to the callback requestor or callback recipient, and if this succeeds, a second call is attempted to the second of the callback requestor and callback recipient 1340, allowing a media server 425 to bridge the connection when both are online, before deleting the callback object 1345.

FIG. 14 is a method diagram illustrating the use of a callback cloud for intent-based active callback management, including a brand interface server and intent analyzer, according to an embodiment. According to an embodiment, a callback cloud 520 may interface with a brand interface server 530, which may interface with third-party or proprietary brands of communications devices and interfaces such as automated call distributor systems 1405. Through this brand interface, the system may receive a request for a callback to a callback recipient, analyzing their intent from the provided input 1410, followed by processing it as a callback request 1415. Callback requestor intent in this case may indicate how long or what times are preferred for a callback to take place, which may be taken into account for a callback 1410. This refers to an individual calling a user of a cloud callback system 520, being unable to connect for any reason, and the system allowing the caller to request a callback, thus becoming the callback requester, from the callback recipient, the person they were initially unable to reach. A callback object is instantiated 1420, using a callback manager 523, which is an object with data fields representing the various parts of callback data for a callback requester and callback recipient, and any related information such as what scheduled times may be possible for such a callback to take place. Global profiles may then be retrieved 1425 using a profile manager 521 in a cloud callback system, as well as an analysis of environmental context data 1430, allowing for the system to determine times when a callback may be possible for a callback requestor and callback recipient both 1435. When such a time arrives, a first callback is attempted 1440 to the callback requestor or callback recipient, and if this succeeds, a second call is attempted to the second of the callback requestor and callback recipient 1445, allowing a media server 525 to bridge the connection when both are online, before deleting the callback object 1450.

Figure 15:
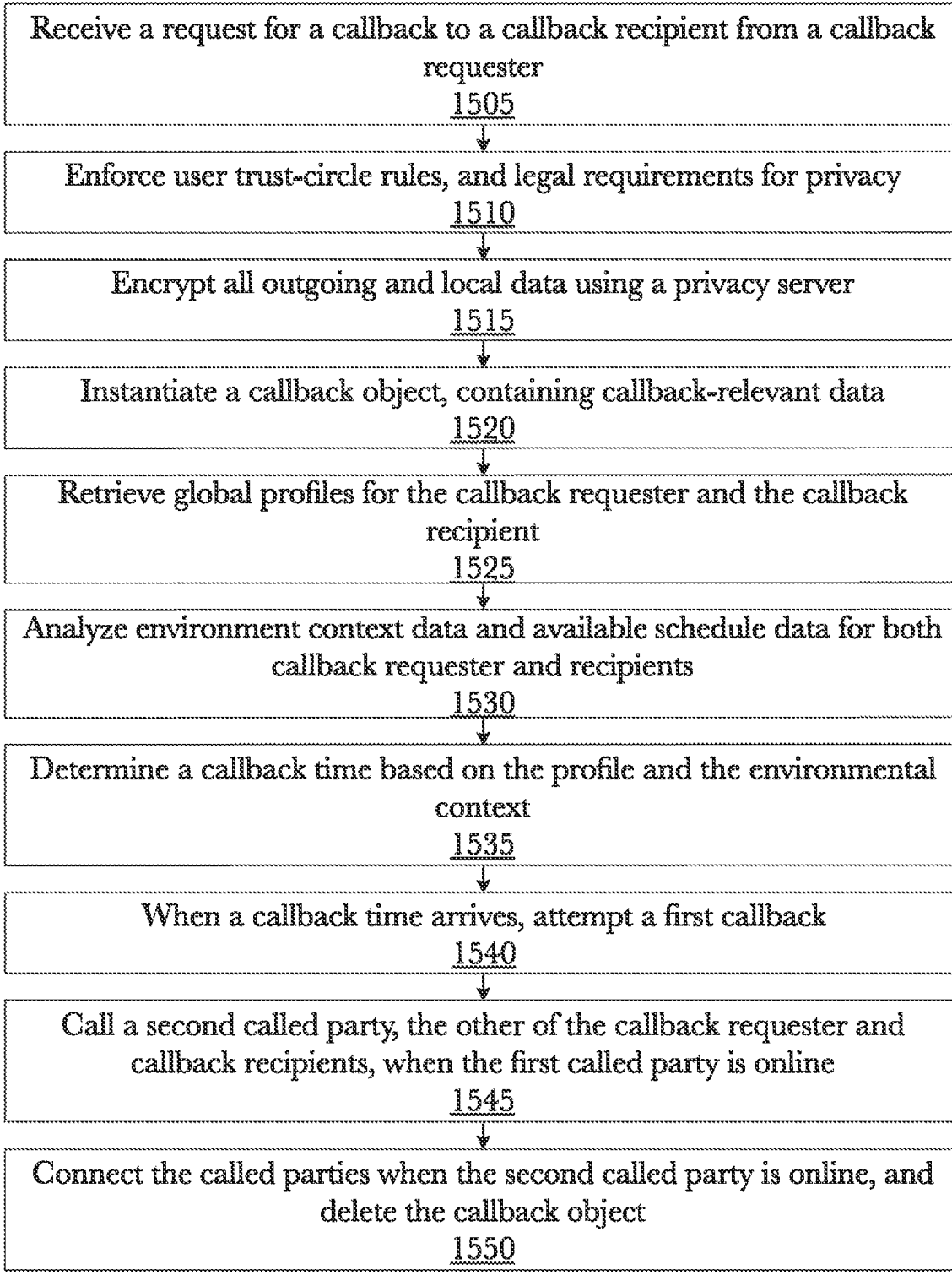
FIG. 15 is a method diagram illustrating the use of a callback cloud for intent-based active callback management, including a privacy server, according to an embodiment.

FIG. 15 is a method diagram illustrating the use of a callback cloud for intent-based active callback management, including a privacy server, according to an embodiment. According to an embodiment, a callback cloud 620 must receive a request for a callback to a callback recipient, from a callback requester 1505. This refers to an individual calling a user of a cloud callback system 620, being unable to connect for any reason, and the system allowing the caller to request a callback, thus becoming the callback requester, from the callback recipient, the person they were initially unable to reach. When a callback request is received 1505, trust-circle rules are enforced using a privacy server 621, 1510 preventing untrusted users from requesting a callback, or insufficiently trusted users from scheduling callbacks at specific times or perhaps preventing them from requesting callbacks with certain callback recipients, depending on the privacy settings of a given callback recipient. All data may also be encrypted 1515 for added security, using a privacy server 621. If a callback request is allowed to proceed, a callback object is instantiated 1520, using a callback manager 624, which is an object with data fields representing the various parts of callback data for a callback requester and callback recipient, and any related information such as what scheduled times may be possible for such a callback to take place. Global profiles may then be retrieved 1525 using a profile manager 622 in a cloud callback system, as well as an analysis of environmental context data 1530, allowing for the system to determine times when a callback may be possible for a callback requestor and callback recipient both 1535. When such a time arrives, a first callback is attempted 1540 to the callback requestor or callback recipient, and if this succeeds, a second call is attempted to the second of the callback requestor and callback recipient 1545, allowing a media server 626 to bridge the connection when both are online, before deleting the callback object 1550.

Figure 16:
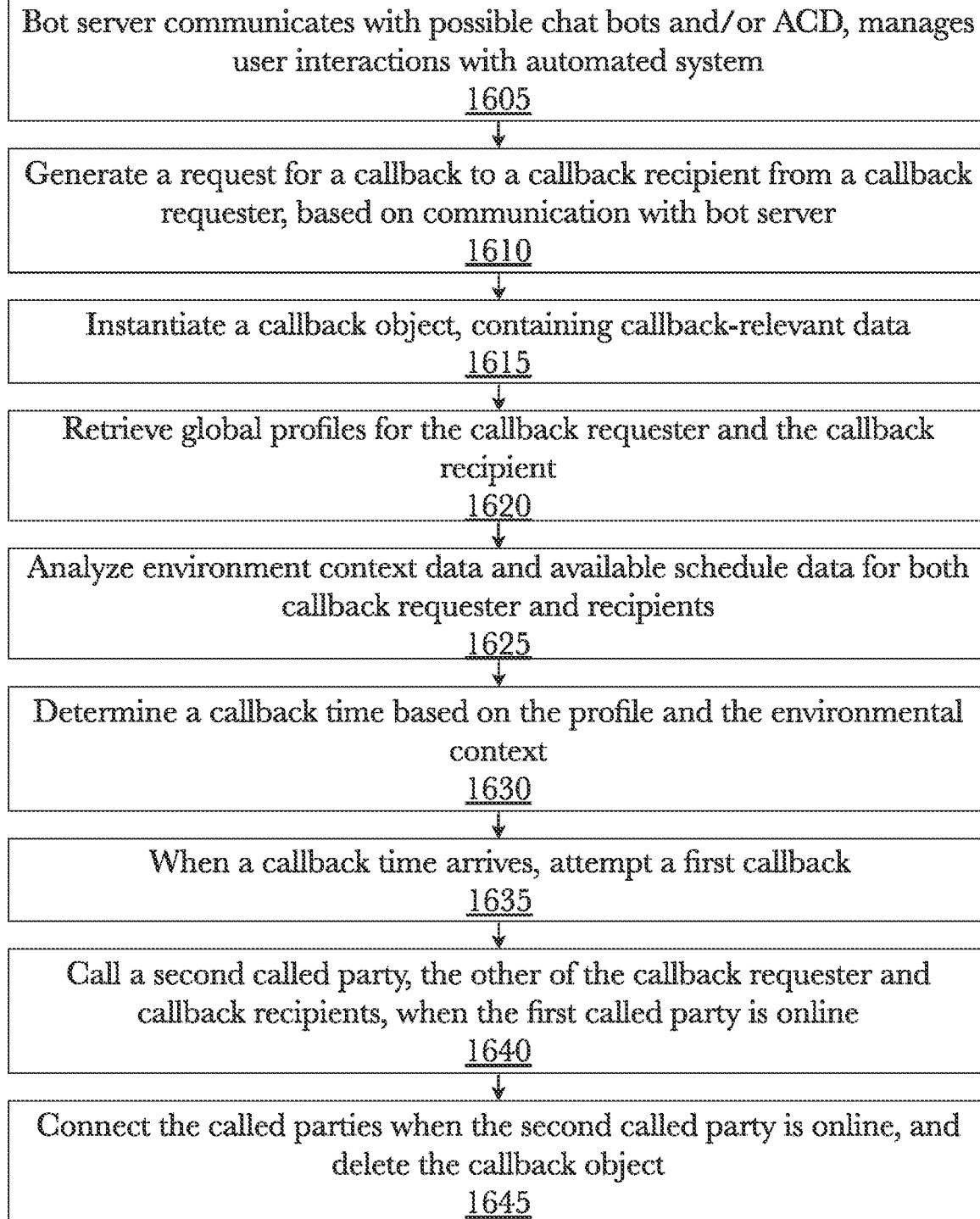
FIG. 16 is a method diagram illustrating the use of a callback cloud for intent-based active callback management, including a bot server, according to an embodiment.

FIG. 16 is a method diagram illustrating the use of a callback cloud for intent-based active callback management, including a bot server, according to an embodiment. According to an embodiment, a callback cloud 720 may first utilize a bot server 724 to receive an automated callback request from a user 1605, which may allow a user to specify their parameters for a callback directly to the system. The system may then receive a request for a callback to a callback recipient, from a callback requester 1610. This refers to an individual calling a user of a cloud callback system 720, being unable to connect for any reason, and the system allowing the caller to request a callback, thus becoming the callback requester, from the callback recipient, the person they were initially unable to reach. A callback object is instantiated 1615, using a callback manager 723, which is an object with data fields representing the various parts of callback data for a callback requester and callback recipient, and any related information such as what scheduled times may be possible for such a callback to take place. Global profiles may then be retrieved 1620 using a profile manager 721 in a cloud callback system, as well as an analysis of environmental context data 1625, allowing for the system to determine times when a callback may be possible for a callback requestor and callback recipient both 1630. When such a time arrives, a first callback is attempted 1635 to the callback requestor or callback recipient, and if this succeeds, a second call is attempted to the second of the callback requestor and callback recipient 1640, allowing a media server 726 to bridge the connection when both are online, before deleting the callback object 1645.

Figure 17:
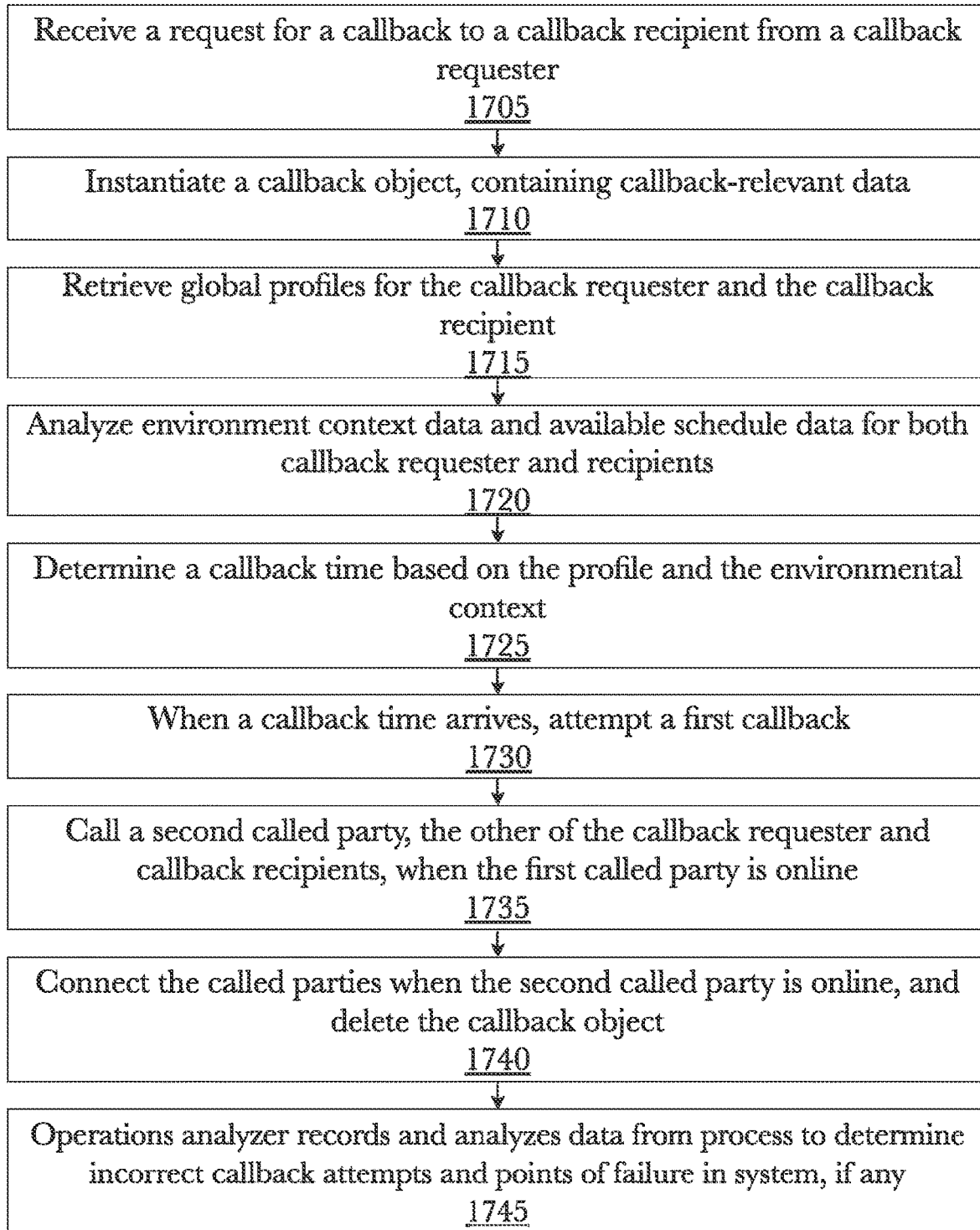
FIG. 17 is a method diagram illustrating the use of a callback cloud for intent-based active callback management, including an operations analyzer, according to an embodiment.

FIG. 17 is a method diagram illustrating the use of a callback cloud for intent-based active callback management, including an operations analyzer, according to an embodiment. According to an embodiment, a callback cloud 820 must receive a request for a callback to a callback recipient, from a callback requester 1705. This refers to an individual calling a user of a cloud callback system 820, being unable to connect for any reason, and the system allowing the caller to request a callback, thus becoming the callback requester, from the callback recipient, the person they were initially unable to reach. A callback object is instantiated 1710, using a callback manager 823, which is an object with data fields representing the various parts of callback data for a callback requester and callback recipient, and any related information such as what scheduled times may be possible for such a callback to take place. Global profiles may then be retrieved 1715 using a profile manager 821 in a cloud callback system, as well as an analysis of environmental context data 1720, allowing for the system to determine times when a callback may be possible for a callback requestor and callback recipient both 1725. When such a time arrives, a first callback is attempted 1730 to the callback requestor or callback recipient, and if this succeeds, a second call is attempted to the second of the callback requestor and callback recipient 1735, allowing a media server 826 to bridge the connection when both are online, before deleting the callback object 1740. An operations analyzer 824 may then monitor operation of components and communication channels involved in the callback, analyze the results of the attempted callback bridge, and if it was unsuccessful, determine whether a component or communication channel of a callback cloud experiences a failure, and either select an alternate communication channel to complete the callback at a scheduled time or store such results 1745 for viewing by a later system administrator.

Figure 18:
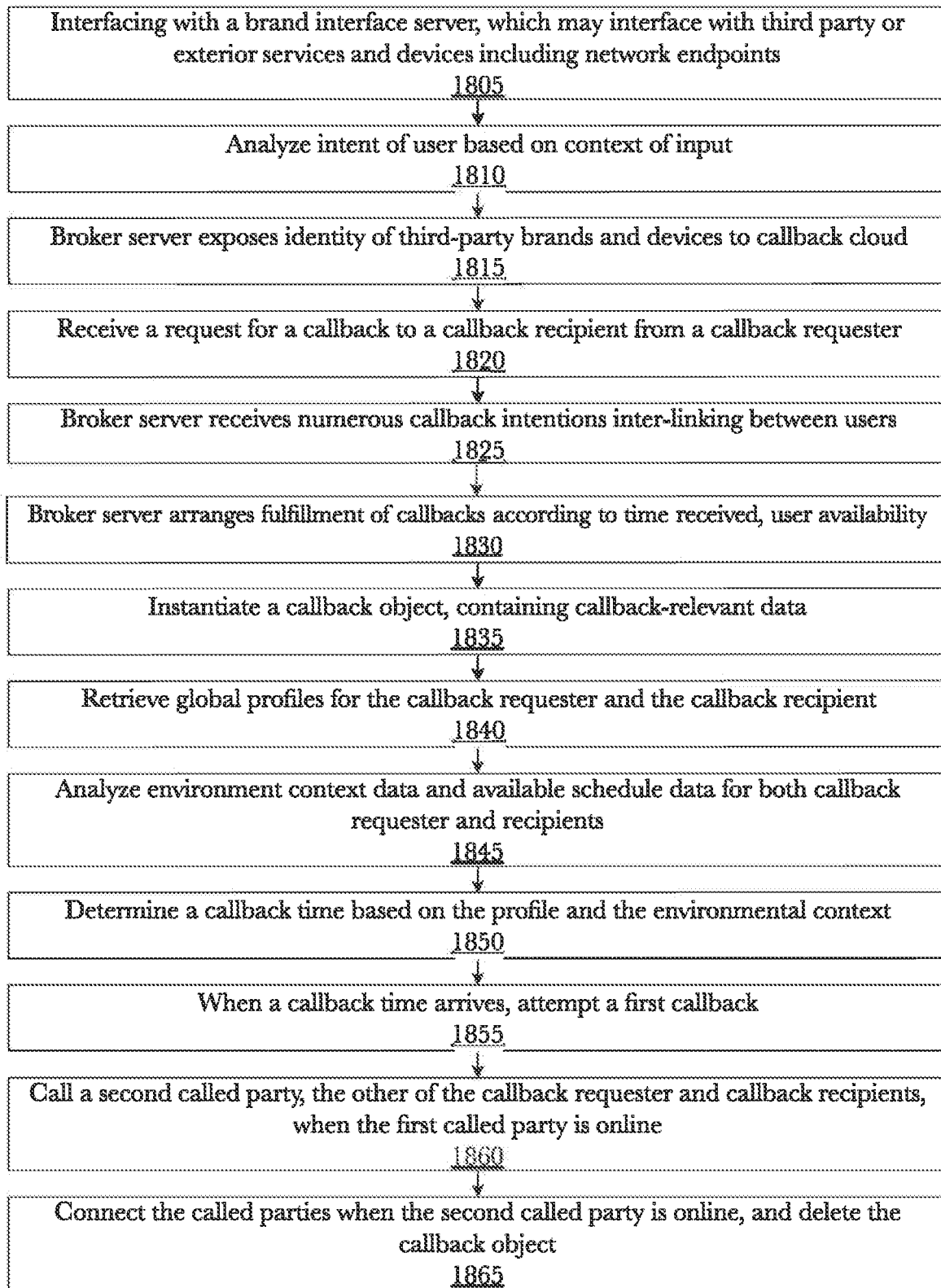
FIG. 18 is a method diagram illustrating the use of a callback cloud for intent-based active callback management, including a brand interface server, intent analyzer, and broker server, according to an embodiment.

FIG. 18 is a method diagram illustrating the use of a callback cloud for intent-based active callback management, including a brand interface server, intent analyzer, and broker server, according to an embodiment. According to an embodiment, a callback cloud 920 may interface with a brand interface server 930, which may interface with third-party or proprietary brands of communications devices and interfaces such as automated call distributor systems 1805. Through this brand interface, the system may receive a request for a callback to a callback recipient, analyzing their intent from the provided input 1810, before a broker server 940 communicates this request to the callback cloud 920, 1820 and not only exposes but also manages connections and interactions between various brands 910 and a callback cloud 920, 1815. The system may then process a callback request 1820. Callback requestor intent in this case may indicate how long or what times are preferred for a callback to take place, which may be taken into account for a callback 1810. This refers to an individual calling a user of a cloud callback system 920, being unable to connect for any reason, and the system allowing the caller to request a callback, thus becoming the callback requester, from the callback recipient, the person they were initially unable to reach. After receiving at least one callback request, a broker server 940 may further manage dealings between multiple callback requests and more than two requestors or recipients 1825, selecting a plurality of specific actions to take during a callback and allocating each selected action to a system component involved in the callback. The broker server 940 may organize successive or nested callback attempts by user availability and times available, as well as the times the requests are received 1830. At least one callback object is then instantiated 1835, using a callback manager 923, which is an object with data fields representing the various parts of callback data for a callback requester and callback recipient, and any related information such as what scheduled times may be possible for such a callback to take place. Global profiles may then be retrieved 1840 using a profile manager 921 in a cloud callback system, as well as an analysis of environmental context data 1845, allowing for the system to determine times when a callback may be possible for a callback requestor and callback recipient both 1850. When such a time arrives, a first callback is attempted 1855 to the callback requestor or callback recipient, and if this succeeds, a second call is attempted to the second of the callback requestor and callback recipient 1860, allowing a media server 925 to bridge the connection when both are online, before deleting the callback object 1865.

Figure 19:
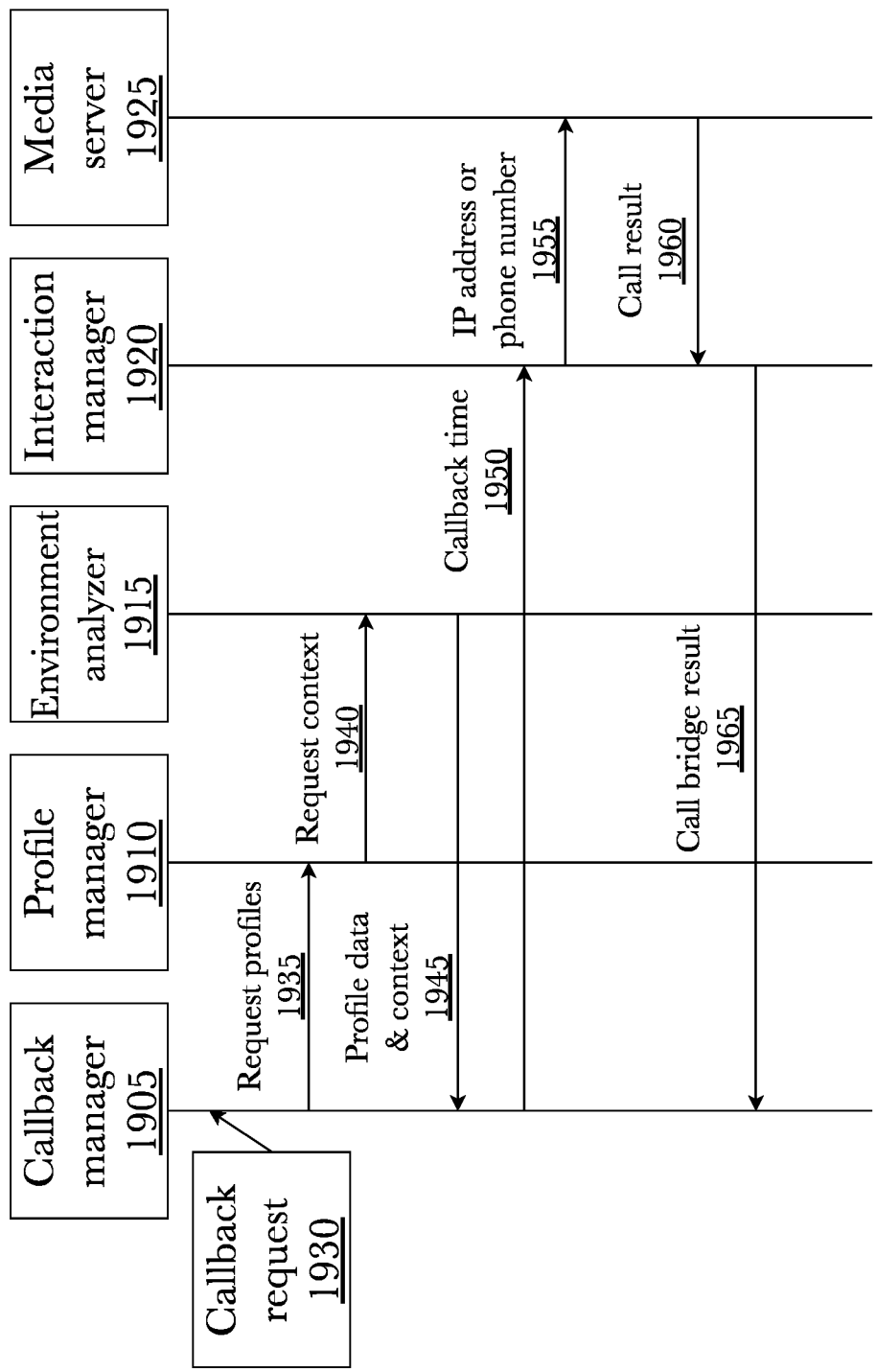
FIG. 19 is a message flow diagram illustrating the exchange of messages and data between components of a callback cloud for intent-based active callback management, according to an embodiment.

FIG. 19 is a message flow diagram illustrating the exchange of messages and data between components of a callback cloud for intent-based active callback management, according to an embodiment. Key components exchanging messages in this embodiment include a callback manager 1905, a profile manager 1910, an environment analyzer 1915, an interaction manager 1920, and a media server 1925. A callback request is made 1930, which is forwarded to a callback manager 1915. A callback manager then requests profile information on a callback requestor and recipient 1935, a profile manager 1910 then requesting environmental context 1940 from an environment analyzer 1915. Profile information and environmental context information are both sent to the callback manager 1945, before an interaction manager is sent the time for an attempted callback 1950, which then, at the designated time, sends the relevant IP addresses, usernames, phone numbers, or other pertinent connection information to a media server 1955. The call results are sent back to an interaction manager 1960, which then sends the finished result of the attempt at bridging the callback to the callback manager 1965.

Figure 20:
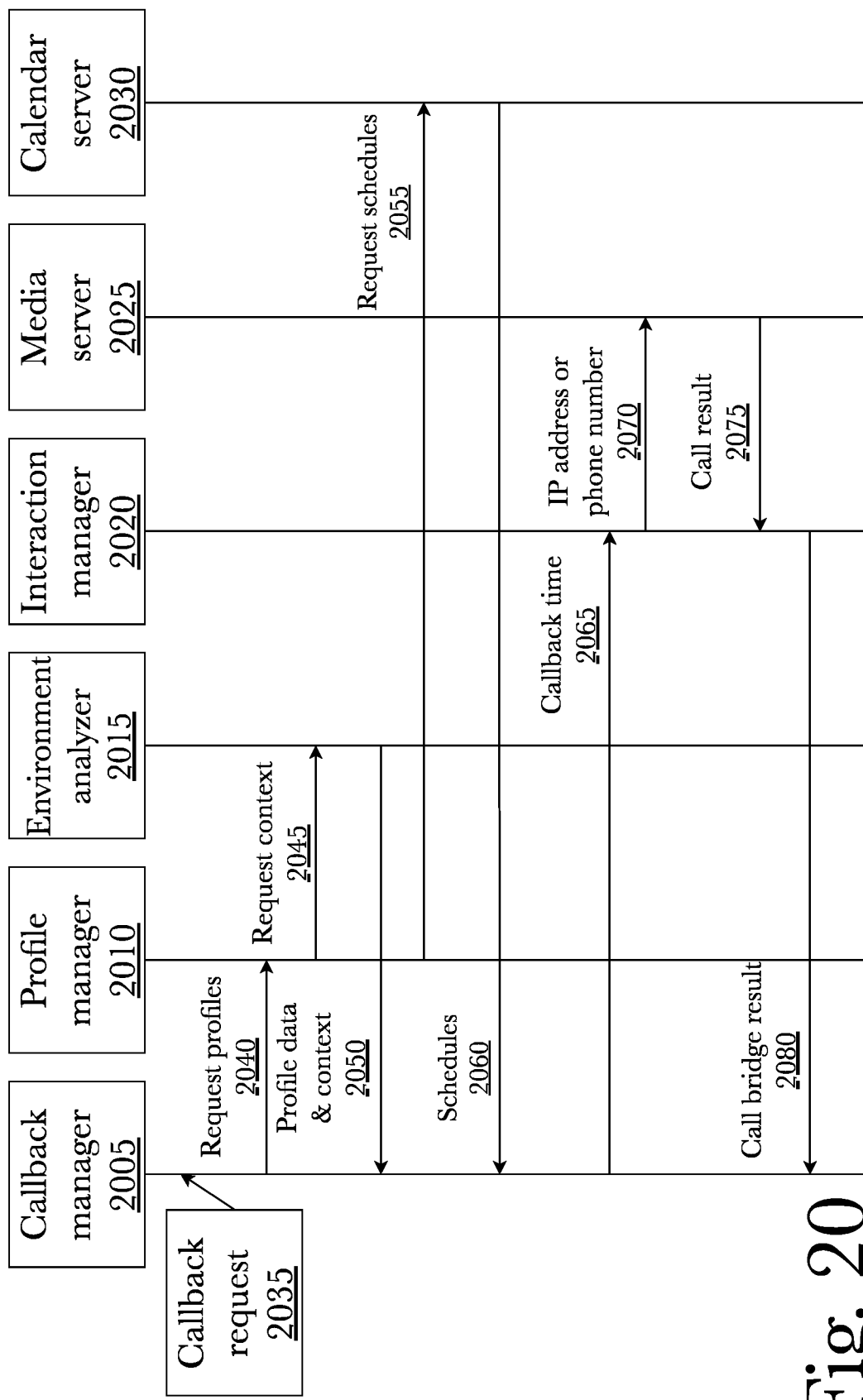
FIG. 20 is a message flow diagram illustrating the exchange of messages and data between components of a callback cloud for intent-based active callback management, including a calendar server, according to an embodiment.

FIG. 20 is a message flow diagram illustrating the exchange of messages and data between components of a callback cloud for intent-based active callback management, including a calendar server, according to an embodiment. Key components exchanging messages in this embodiment include a callback manager 2005, a profile manager 2010, an environment analyzer 2015, an interaction manager 2020, a media server 2025, and a calendar server 2030. A callback request is made 2035, which is forwarded to a callback manager 2015. A callback manager then requests profile information on a callback requestor and recipient 2040, a profile manager 2010 then requesting environmental context 2045 from an environment analyzer 2015. Profile information and environmental context information are both sent to the callback manager 2050, before a profile manager may request calendar schedules 2055 from both a callback requestor and a callback recipient, using a calendar server 2030. If calendars are available for either or both users, they are forwarded to the callback manager 2060. The interaction manager is then sent the time for an attempted callback 2065, which then, at the designated time, sends the relevant IP addresses, usernames, phone numbers, or other pertinent connection information to a media server 2070. The call results are sent back to an interaction manager 2075, which then sends the finished result of the attempt at bridging the callback to the callback manager 2080.

Figure 21:
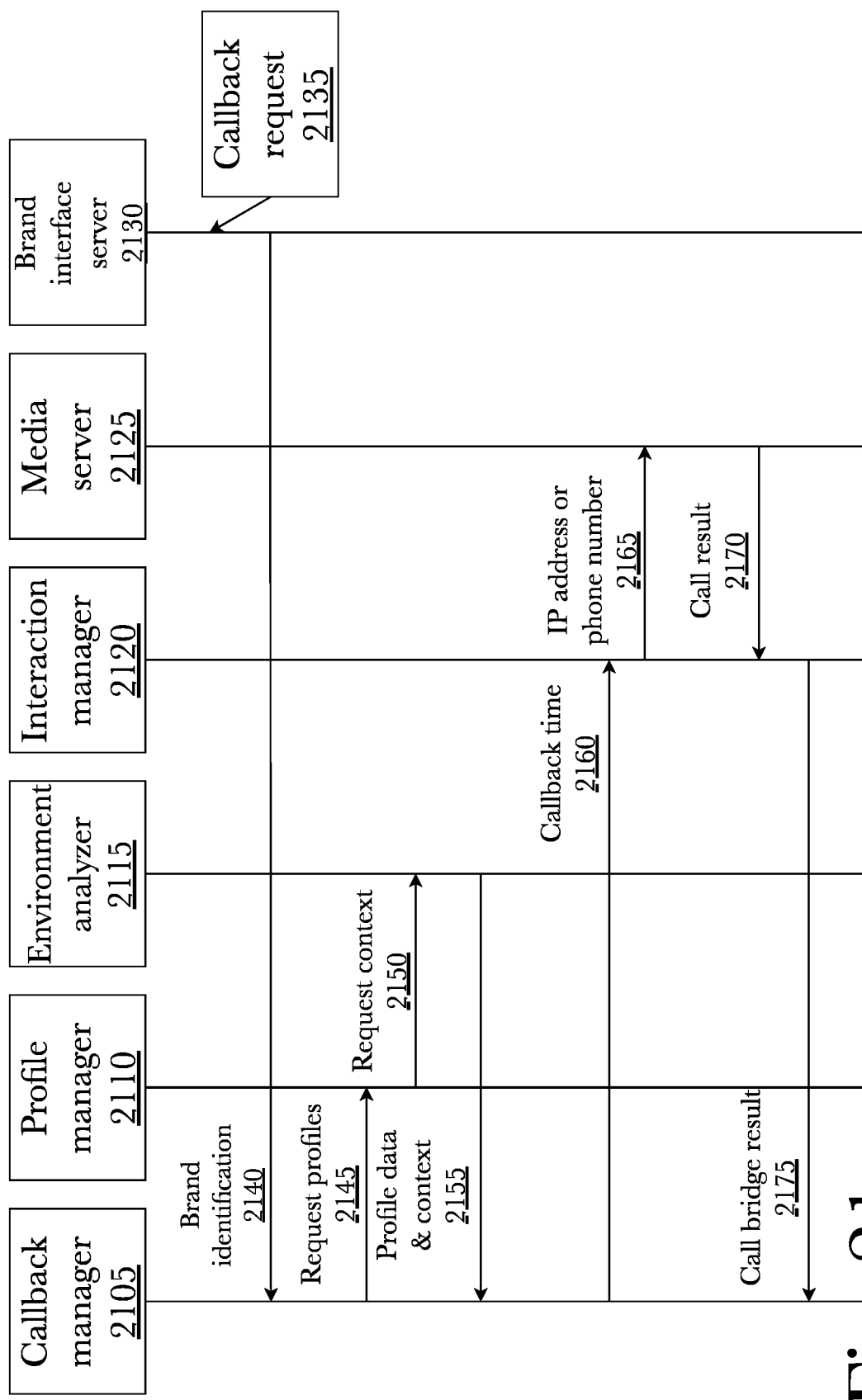
FIG. 21 is a message flow diagram illustrating the exchange of messages and data between components of a callback cloud for intent-based active callback management, including a brand interface server, according to an embodiment.

FIG. 21 is a message flow diagram illustrating the exchange of messages and data between components of a callback cloud for intent-based active callback management, including a brand interface server, according to an embodiment. Key components exchanging messages in this embodiment include a callback manager 2105, a profile manager 2110, an environment analyzer 2115, an interaction manager 2120, a media server 2125, and a brand interface server 2130. A callback request is made 2135, which is forwarded to a callback manager 2115. A brand interface server may identify the devices or services communicating with the callback cloud system 2140, and possibly allow for communication back to such services and devices. A callback manager then requests profile information on a callback requestor and recipient 2145, a profile manager 2110 then requesting environmental context 2150 from an environment analyzer 2115. Profile information and environmental context information are both sent to the callback manager 2155, before an interaction manager is sent the time for an attempted callback 2160, which then, at the designated time, sends the relevant IP addresses, usernames, phone numbers, or other pertinent connection information to a media server 2165. The call results are sent back to an interaction manager 2170, which then sends the finished result of the attempt at bridging the callback to the callback manager 2175.

Figure 22:
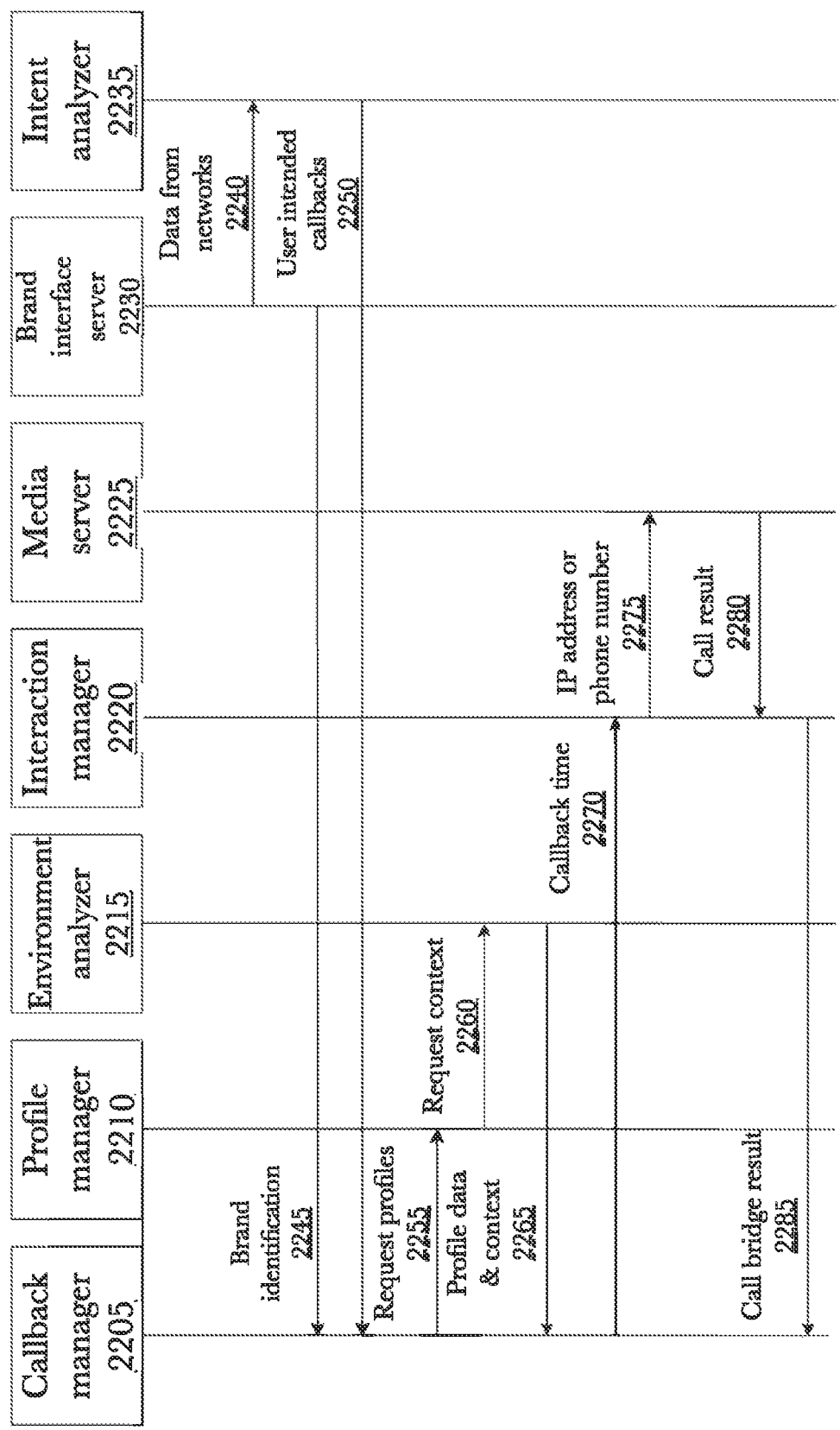
FIG. 22 is a message flow diagram illustrating the exchange of messages and data between components of a callback cloud for intent-based active callback management, including a brand interface server and intent analyzer, according to an embodiment.

FIG. 22 is a message flow diagram illustrating the exchange of messages and data between components of a callback cloud for intent-based active callback management, including a brand interface server and intent analyzer, according to an embodiment. Key components exchanging messages in this embodiment include a callback manager 2205, a profile manager 2210, an environment analyzer 2215, an interaction manager 2220, a media server 2225, a brand interface server 2230, and an intent analyzer 2235. After a callback request is made, a brand interface server may forward raw data from the services or applications used in making the request to an intent analyzer 2240, before identifying the devices or services communicating with the callback cloud system 2245 and sending such data to a callback manager. An intent analyzer may then send data on callback request intent 2250 to a callback manager 2205, which may indicate such things as the time a user may want to receive a callback, or what days they may be available, or how long the callback may take, which may affect the availability of timeslots for both a callback requestor and recipient. A callback manager then requests profile information on a callback requestor and recipient 2255, a profile manager 2210 then requesting environmental context 2260 from an environment analyzer 2215. Profile information and environmental context information are both sent to the callback manager 2265, before an interaction manager is sent the time for an attempted callback 2270, which then, at the designated time, sends the relevant IP addresses, user-names, phone numbers, or other pertinent connection information to a media server 2275. The call results are sent back to an interaction manager 2280, which then sends the finished result of the attempt at bridging the callback to the callback manager 2285.

Figure 23:
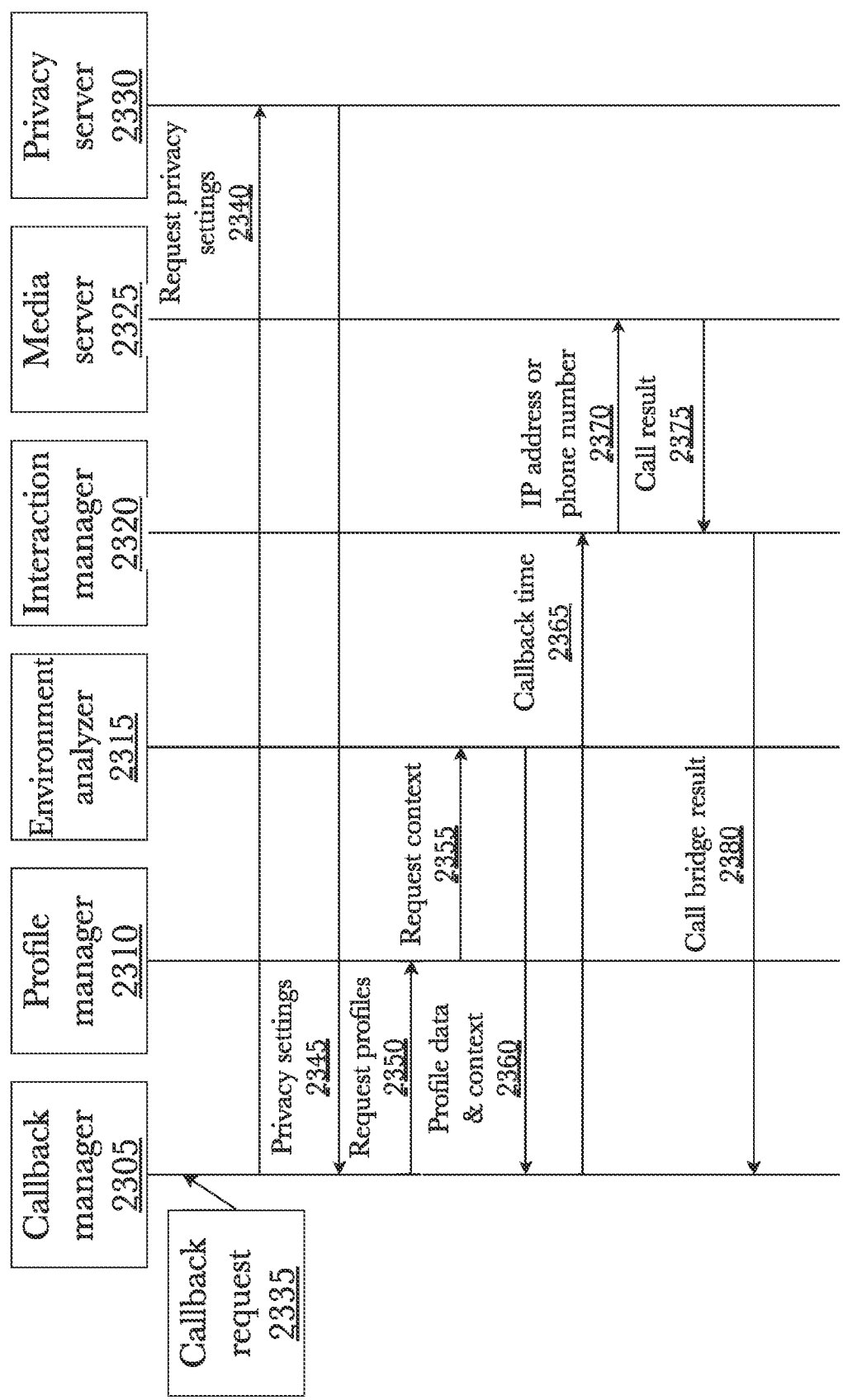
FIG. 23 is a message flow diagram illustrating the exchange of messages and data between components of a callback cloud for intent-based active callback management, including a privacy server, according to an embodiment.

FIG. 23 is a message flow diagram illustrating the exchange of messages and data between components of a callback cloud for intent-based active callback management, including a privacy server, according to an embodiment. Key components exchanging messages in this embodiment include a callback manager 2305, a profile manager 2310, an environment analyzer 2315, an interaction manager 2320, a media server 2325, and a privacy server 2330. A callback request is made 2335, which is forwarded to a callback manager 2315. A callback manager may then request privacy settings 2340 from a privacy server 2330, being forwarded the privacy settings 2345 from said server, including information on a user's trust circles as needed. A callback manager 2305 then requests profile information on a callback requestor and recipient 2350, a profile manager 2310 then requesting environmental context 2355 from an environment analyzer 2315. Profile information and environmental context information are both sent to the callback manager 2360, before an interaction manager is sent the time for an attempted callback 2365, which then, at the designated time, sends the relevant IP addresses, usernames, phone numbers, or other pertinent connection information to a media server 2370. The call results are sent back to an interaction manager 2375, which then sends the finished result of the attempt at bridging the callback to the callback manager 2380.

Figure 24:
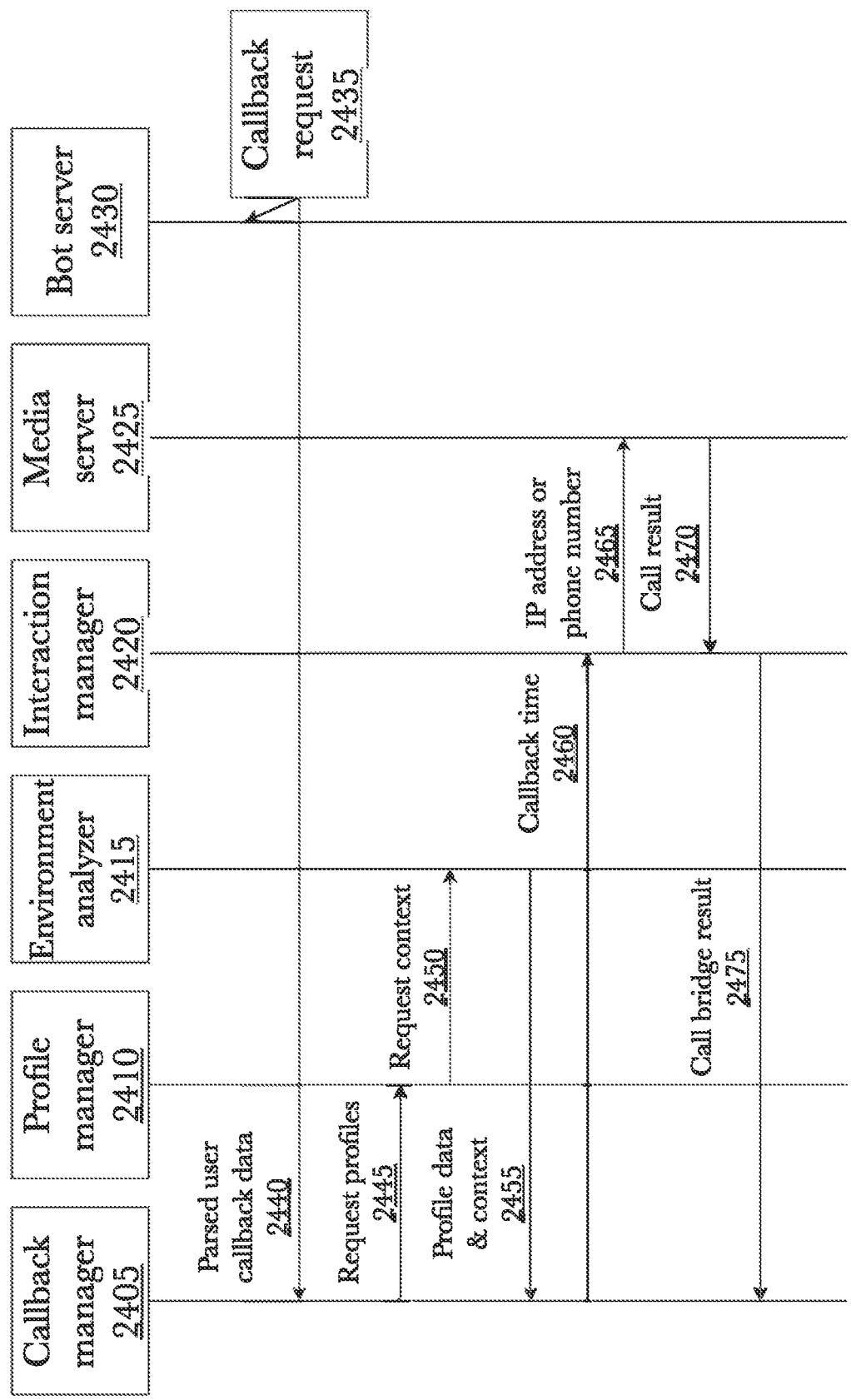
FIG. 24 is a message flow diagram illustrating the exchange of messages and data between components of a callback cloud for intent-based active callback management, including a bot server, according to an embodiment.

FIG. 24 is a message flow diagram illustrating the exchange of messages and data between components of a callback cloud for intent-based active callback management, including a bot server, according to an embodiment. Key components exchanging messages in this embodiment include a callback manager 2405, a profile manager 2410, an environment analyzer 2415, an interaction manager 2420, a media server 2425, and a bot server 2430. A callback request is made 2435, which is forwarded to a bot server 2430. A bot server may handle a user in a similar manner to an automated call distribution server for example, allowing a user to communicate verbally or textually with it, or it may instead handle results from a chat server and parse the results of a user interacting with another chat server 715. A callback manager may then receive parsed callback data 2440 from a bot server 2430. A callback manager 2405 then requests profile information on a callback requestor and recipient 2445, a profile manager 2410 then requesting environmental context 2450 from an environment analyzer 2415. Profile information and environmental context information are both sent to the callback manager 2455, before an interaction manager is sent the time for an attempted callback 2460, which then, at the designated time, sends the relevant IP addresses, usernames, phone numbers, or other pertinent connection information to a media server 2465. The call results are sent back to an interaction manager 2470, which then sends the finished result of the attempt at bridging the callback to the callback manager 2475.

Figure 25:
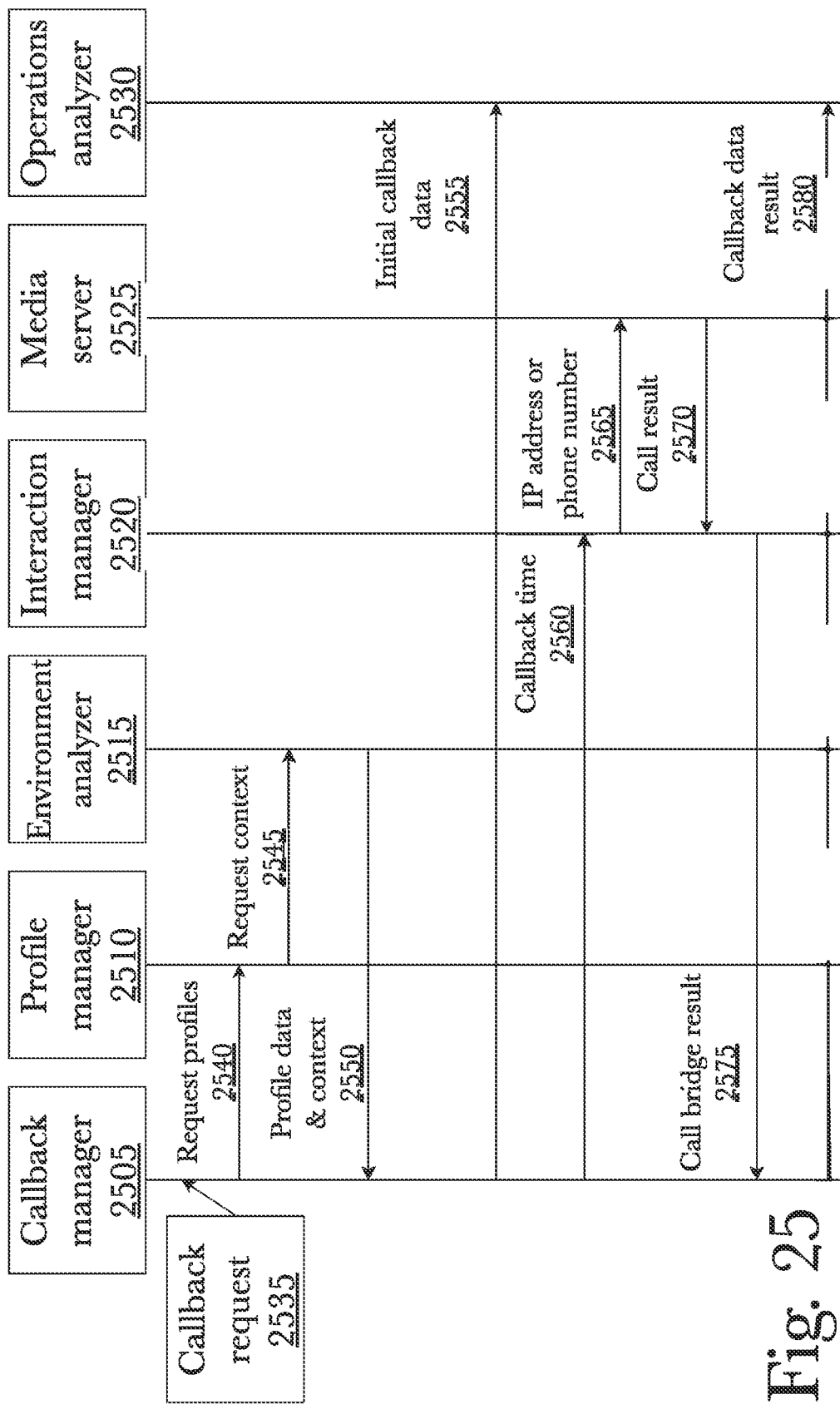
FIG. 25 is a message flow diagram illustrating the exchange of messages and data between components of a callback cloud for intent-based active callback management, including an operations analyzer, according to an embodiment.

FIG. 25 is a message flow diagram illustrating the exchange of messages and data between components of a callback cloud for intent-based active callback management, including an operations analyzer, according to an embodiment. Key components exchanging messages in this embodiment include a callback manager 2505, a profile manager 2510, an environment analyzer 2515, an interaction manager 2520, a media server 2525, and an operations analyzer 2530. A callback request is made 2535, which is forwarded to a callback manager 2505. A callback manager then requests profile information on a callback requestor and recipient 2540, a profile manager 2510 then requesting environmental context 2545 from an environment analyzer 2515. Profile information and environmental context information are both sent to the callback manager 2550, allowing a callback manager to forward initial callback object data to an operations analyzer 2555, before an interaction manager is sent the time for an attempted callback 2560, which then, at the designated time, sends the relevant IP addresses, usernames, phone numbers, or other pertinent connection information to a media server 2565. The call results are sent back to an interaction manager 2570, which then sends the finished result of the attempt at bridging the callback to the callback manager 2575. At the end of this sequence, the callback result data, including any failures or lack of ability to bridge a call for a completed callback between at least two users, is forwarded to an operations analyzer 2580 for possible review by a human, if needed, and for adjustment of the parameters the system uses in attempts to make callbacks for said users.

Figure 30:
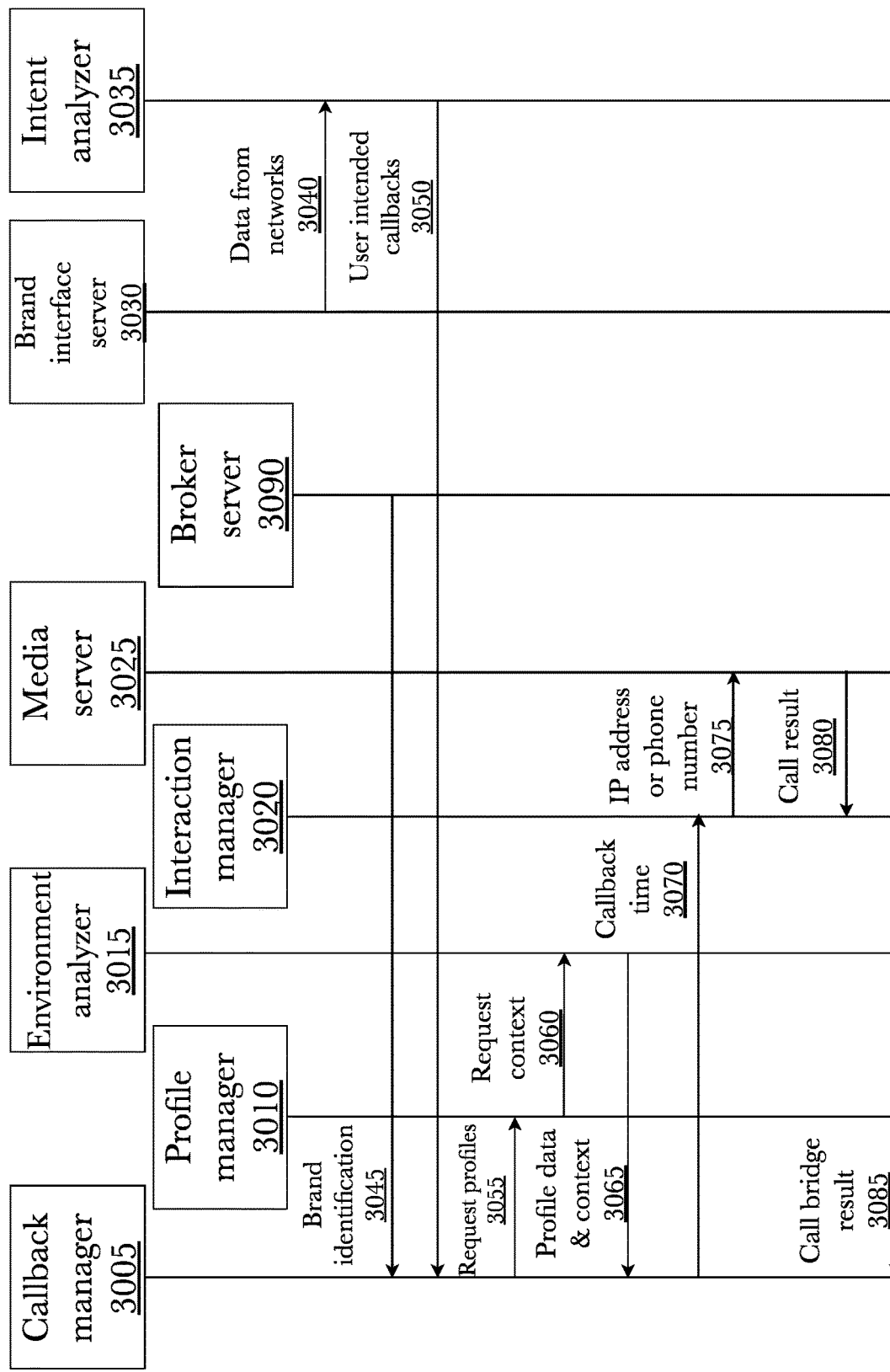
FIG. 30 is a message flow diagram illustrating the exchange of messages and data between components of a callback cloud for intent-based active callback management, including a brand interface server, intent analyzer, and broker server, according to an embodiment.

FIG. 30 is a message flow diagram illustrating the exchange of messages and data between components of a callback cloud for intent-based active callback management, including a brand interface server, intent analyzer, and broker server, according to an embodiment. Key components exchanging messages in this embodiment include a callback manager 3005, a profile manager 3010, an environment analyzer 3015, an interaction manager 3020, a media server 3025, a brand interface server 3030, an intent analyzer 3035, and a broker server 3090. After a callback request is made, a brand interface server may forward raw data 3040 from the services or applications used in making the request to an intent analyzer 3035, before identifying the devices or services communicating with the callback cloud system and sending such data to a broker server 3090, which identifies and exposes brand information 3045 to the callback cloud while managing connections between the callback cloud and various brands. An intent analyzer may then send data on callback request intent 3050 to broker server 3090, which forwards this information to a callback manager 3005, which may indicate such things as the time a user may want to receive a callback, or what days they may be available, or how long the callback may take, which may affect the availability of timeslots for both a callback requestor and recipient. A callback manager then requests profile information on a callback requestor and recipient 3055, a profile manager 3010 then requesting environmental context 3060 from an environment analyzer 3015. Profile information and environmental context information are both sent to the callback manager 3065, before an interaction manager is sent the time for an attempted callback 3070, which then, at the designated time, sends the relevant IP addresses, usernames, phone numbers, or other pertinent connection information to a media server 3075. The call results are sent back to an interaction manager 3080, which then sends the finished result of the attempt at bridging the callback to the callback manager 3085.

Figure 31:
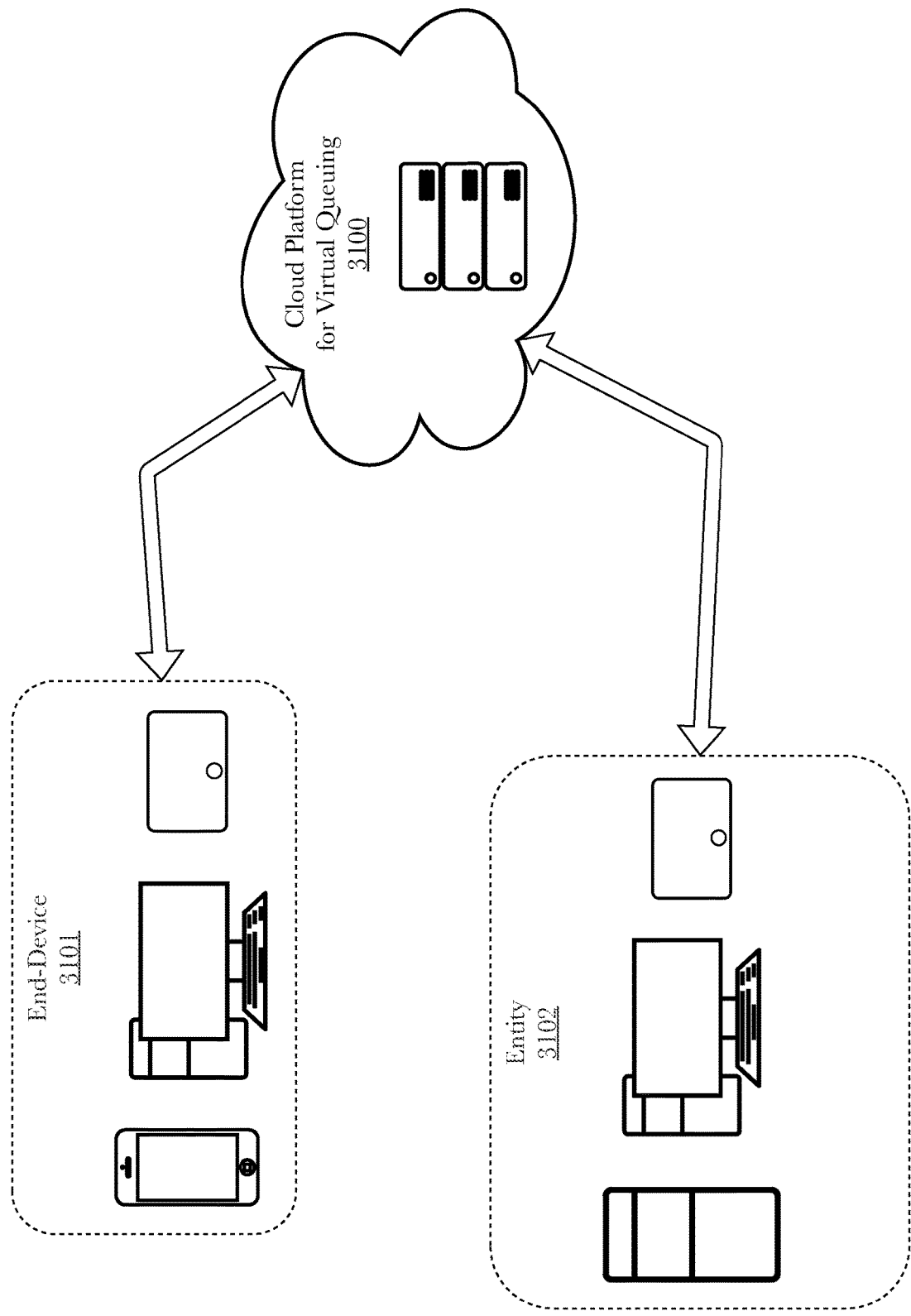
FIG. 31 is a block diagram illustrating an exemplary system for a cloud-based virtual queuing platform, according to an embodiment.
Figure 32:
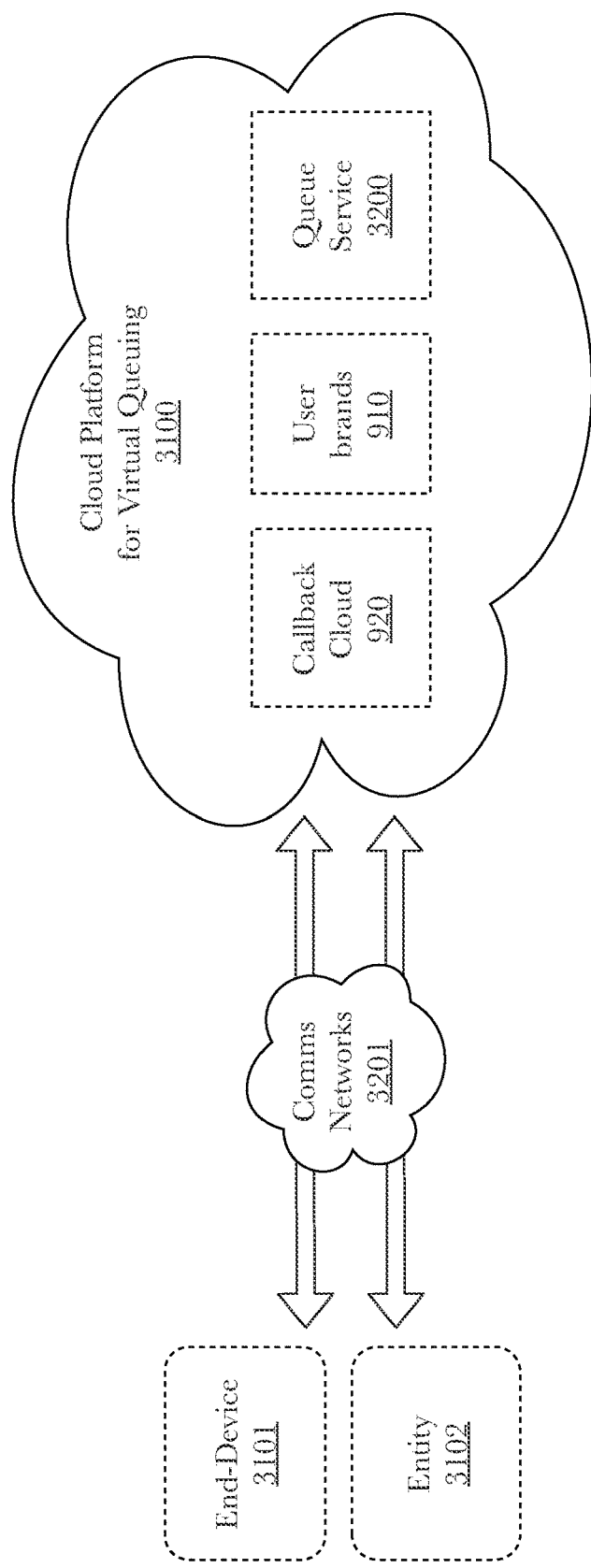
FIG. 32 is a block diagram illustrating an exemplary system architecture and the possible communication means for a cloud-based virtual queuing platform, according to an embodiment.

FIG. 31 is a block diagram illustrating an exemplary system for a cloud-based virtual queuing platform 3100, according to an embodiment. A cloud-based virtual queuing platform 3100 establishes and manages virtual queues associated with real or virtual events hosted by entities 3102 and attended by end-devices or person's with end-devices 3101. The benefits of cloud-based queue management comprise cost savings, security, flexibility, mobility, insight offerings, increased collaboration, enhanced quality control, redundant disaster recovery, loss prevention, automatic software updates, a competitive edge, and sustainability. A cloud-based virtual queuing platform 3100 may comprise a web-based (e.g., mobile or desktop browser) or some other Internet-based means (CLI, mobile and desktop applications, APIs, etc.) to create, manage, and analyze queues that may be accessed remotely by the hosting entity 3102. A cloud-based virtual queuing platform 3100 may comprise an application-based means to create, manage, and analyze queues that may be accessed remotely by the hosting entity 3102. Entities 3102 may communicate to a cloud-based virtual queuing platform 3100 via on-premise servers, the entity's own cloud-based environment, desktop and laptop computing platforms, mobile platforms, and comparable devices. Likewise, persons wishing to join, leave, or get the status of a queue (other reasons may exist, e.g., transfer queues) may use any electronic means that the entity 3102 may use. Referring now to FIG. 32, entities 3102 and end-devices 3101 may communicate over a plurality of communication networks (Internet, Satellite, PSTN, Mobile networks, Wi-Fi, BlueTooth, NFC, etc.) 3201 to a cloud-based virtual queuing platform 3100.

The cloud based virtual queuing platform 3100 as described herein may make use of the embodiments from the previous figures and referenced applications by combining prior embodiments with at least one of the one or more components from the embodiments described henceforth. For example, a cloud platform for virtual queuing 3100 may employ a callback cloud 920 and/or user brands 910 as previously described to facilitate any features necessitated by the aspects of a cloud platform for virtual queuing 3100 as disclosed herein. As a specific example, a callback cloud 920 may handle the text and voice services used in a cloud platform for virtual queuing 3100. Additionally, any previous embodiments may now implement the queue service 3200 as described in the following paragraphs and figures. For example, previous embodiments are directed towards call center applications. therefore, the queue service 3200 and its aspects as described herein, may better facilitate the queueing aspects of the call center embodiments or provide enhancements not disclosed in the previous embodiments.

Figure 33:
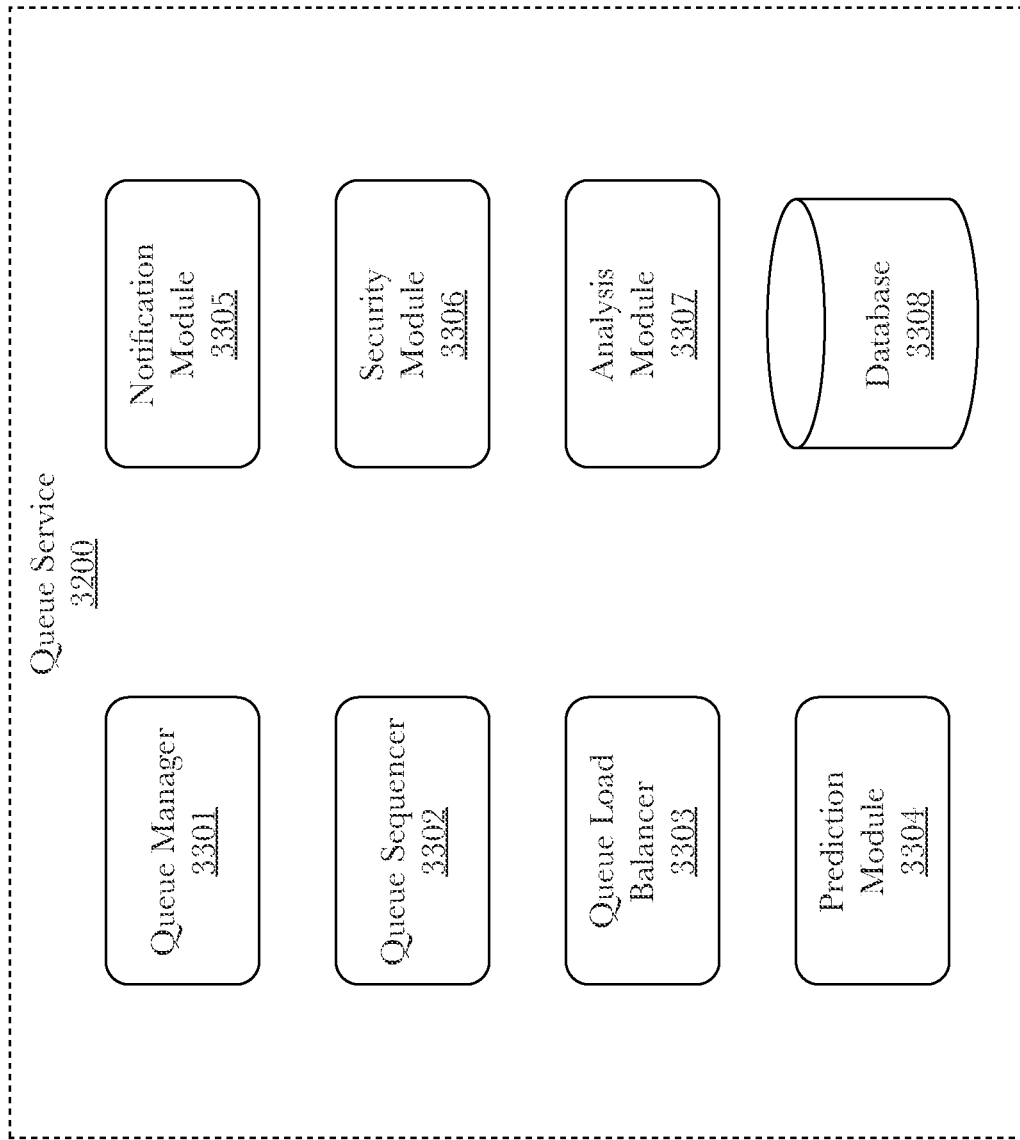
FIG. 33 is a block diagram illustrating an exemplary system architecture for a queue service, according to an embodiment.

FIG. 33 is a block diagram illustrating an exemplary system architecture for a queue service 3200. According to one embodiment, A queue service 3200 may make use of one or more, or some combination of the following components: a queue manager 3301, a queue sequencer 3302, a queue load balancer 3303, a prediction module 3304, a notification module 3305, a security module 3306, an analysis module 3307, and one or more databases 3308.

A queue manager 3301 interfaces with entities and end-devices according to one embodiment. In another embodiment, a queue manager 3301 may use a callback cloud 920 to initiate messages and data flow between itself and entities and end devices. According to another embodiment, a notification module 3305 may take over notification functions to entities and end-devices. In yet another embodiment, a notification module 3305 instructs a callback cloud 920 as to what messages to send and when. According to an aspect of various embodiments, a notification module 3305 may manage notifications to end-devices based on a notification escalation plan, whereby notifications a means are dynamically adjusted based on a set of rules. According to one embodiment, a queue manager 3301 may handle the managing of a plurality of simple queues without the need for the other modules 3302-3307, i.e., if the simple queues require no authentication, security, analysis, predictions, and other aspects, then a queue manager 3301 may be all that is required. The previously mentioned aspects may be implemented based on a pricing scheme, according to one embodiment. A tiered-pricing cloud-based virtual queuing platform wherein the tiered pricing is based off the features available to the entities. According to one embodiment, a queue manager 3301 works in tandem with other modules 3302-3307 to provide the full functionality of the features disclosed herein specifically in regards to handling sequences of queues.

Sequenced queues comprise two or more queues that are sequential, meaning at least one of the queues comes before another queue. Sequential queues may comprise parallel queues, meaning that one of the sequential queues is comprised of more than one queue for the same event. According to one embodiment, sequenced event queue management may be handled by a queue sequencer 3302. Examples of sequenced events with associated sequenced lines include air travel, zoos, concerts, museums, interactive galleries, theme parks, and any event with multiple required or optional queues. Sequential queues may not typically be treated with a first-in-first-out algorithm because the rate at which one person completes a queue may not be the same as a different person. Consider air travel; the first line (check-in) of a sequence of lines (subsequently at least security and then boarding lines) is checking in at an airport. A person with no checked baggage will make it through faster than a person with baggage to be checked; and a person who preprinted their boarding pass is even faster.

The queue sequencer 3302 may be supplemented by a queue load balancer 3303 that manages the load across a plurality of queues, parallel or not, and sequential or not. The queue load balancer 3303 may take predictions from a prediction module 3304 to better manage wait times across the plurality of queues. Continuing with the air travel example; a queue load balancer 3303 may distribute persons across queues for the same event (multiple security queues, etc.) and may consider many factors. One factor may be distributing persons who all belong to a single group into different parallel queues, so that the group may finish clearing the queue(s) more closely in time than had they all queued at just one queue, rather than spread across multiple parallel queues. Another factor may be the consideration of a route a person or group of persons has to take to make it to the first queue or a subsequent queue. Still more factors may be alerting the entity to open or close more queuing lanes or to produce more or less manual or automatic scanners. A factor may also be to consider the estimated time of arrival for some individuals and yet another factor may be whether some individuals are willing to wait longer than others. In some embodiments the queue sequencer 3302 and queue load balancer 3303 work in tandem with the prediction module 3304 to run simulations of queues in order to achieve the minimal wait times possible. Simulations may have goals other than minimal wait times, e.g., to maximize distance between persons during a pandemic.

As one example, expanding on the routing factor, a prediction module 3304 may run simulations (using machine learning, according to one embodiment) where the possible combinations of each queued person and the possible wait-times of a sequence of queues is iterated over to find the optimal configuration of persons across all queues. A specific example may be a simulation which considers all the possible airline check-in counters, their physical location in relation to one or more security lines and each other, their historical check-in rates, the distance to trams, buses, and the like, the passengers and the requirements of their check-in (baggage, wheelchair service, preprinted ticket, groups size, etc.), when the passengers may arrive (using GPS or explicit requests for estimated time of arrival and mode of transportation), passenger walking rate (using sensors), departure times, and other factors such that the simulation produces an optimal time-to-check-in notification to each passenger. Simulations may be constrained not to create a perceptible unfairness to a queue. For example, putting a group of five people who just arrived in front of a single person who has been waiting onsite for a significant amount of time. This invention may also be used in air travel arrivals, expediting baggage claim processes and transportation services. These scenarios are merely exemplary and not to be limiting in any way. Many factors exist across multiple domains and likewise for the types of constraints for simulations.

According to various embodiments, a single queue is used for both walk up users scanning the QR code with a mobile device and users who book a spot in the queue using the web UI (e.g., webpage or webapp, etc.). In this case, users are in a single queue, however, the users who booked online have priority for that time slot they booked. So for instance, if the queue currently has a two hour wait time at 2 p.m., and a user books a time slot for 3 p.m., when 3 p.m. approaches the user will be prioritized and will be notified to enter the physical queue. The queue load balancer 3303 and prediction module 3304 work together to account for these time slots, the total people per time slot, and factor it into the predictive models to produce an accurate estimated wait time for walk-ups joining the virtual queue, according to some embodiments. In other words, if a user walks up and enters the virtual queue, the estimated wait time is taking into account all the users ahead of him or her including the ones in overlapping time slots. Additionally, if a user booked a time slot for 1 p.m. and the user shows up early at 12:30 p.m. and scans the QR code, the user will be provided the queue estimated wait time and given the option (e.g., via an SMS message, email, messaging application, etc.) to keep the booked time slot or cancel the booked time slot and enter the queue like anyone else (that way if the estimated wait time is less than 30 minutes, the user can enter the queue early and not have to wait around).

Factors described above and elsewhere herein may be informed and/or supplemented using large or small data repositories (both private and public), streaming real-time (or near-real-time) data (e.g., traffic, etc.), sensor data, "Big Data", and many other sources of data 3308. Another example from a separate domain is the emergency room (ER). The various hospital departments/clinics, staffing, and procedures that go into the ER service forms a complex logistical system that must be adhered to for regulatory and safety reasons. A queue service 3200 may be used with a predictive medical prognosis module (not illustrated) or simply data entries from front desk staff to prioritize patient queuing. Scheduling ER visits is also possible given the proper circumstances and may reduce wait times. Scheduling appointments and managing walk-ins spans multiple domains and is another factor that is considered by a queue service 3200.

According to some embodiments, the queue service 3200 and/or cloud platform for virtual queuing 3100 may be configured to integrate with one or more internet-of-things (IoT) devices and/or sensors in order to facilitate data exchange between the one or more IoT devices and sensors and the queue service 3200 and/or platform 3100. In some embodiments, one or more IoT devices and/or sensors may be used to detect the number of people in the physical queue and use that information in conjunction with queue load balancer 3303 and/or prediction module 3304 to automatically adjust the throughput of the users being dequeued. Types of IoT devices and/or sensors that may be used include, but are not limited to, thermal sensors, pressure sensors, force sensors, vibration sensors, piezo sensors, position sensors, photoelectric sensors, switches, transducers, and cameras. In some embodiments, received sensor data may be processed using one or more algorithms best suited for processing the particular type of data received from the sensor. For example, a camera may be set up to watch the queue and return live video data to the queue service 3200, which may be configured to apply facial recognition algorithms in order to determine the number of unique faces in the queue, and thus the number of individuals waiting in the queue. As another example, one or more pressure sensors may be deployed in the path of the queue and when pressure is detected and the data sent to queue service 3200, it may determine each set of pressure data corresponds to a new individual entering or leaving the queue. In yet another embodiment, multiple sensors of different types may be used simultaneously in order to determine the number of people waiting in a queue. According to an embodiment, upon determination of the number of people in a queue, queue service 3200 may automatically predict and adjust the queue wait times and subsequently the throughput of the users being dequeued.

A security module 3306 may be used to generate QR codes, one-time passwords, two-factor authentication codes, and the like. A security module 3306 may automatically authentic queued persons at biometric stations, NFC stations, entity scanning devices, or use similar technologies which may identify the uniqueness of a device or person. A security module 3306 may receive an acknowledgement from an entity from a manual verification, or a verification using the entities own equipment (using APIs as one example). A security module 3306 may report the success or failure of an authentication attempt to a 3'$d$ party, such as security forces or electronic alarm. The success or failure of an authentication attempt may drive the next steps of one or more components of a cloud based virtual queuing platform 3100. A security module 3306 may monitor sensors that checks if the correct amount of people enters a designated location. For example, a hotel may use the disclosed invention to automate check-ins; where NFC beacons at the front desk identify the person at the front desk by scanning the device which would have been pre-registered with the guest's profile and could then could trigger the release a locked compartment containing the guest's room key and hotel information. Additionally, rules may be implemented which do not allow the release of the locked compartment if the queued person's turn was not up or has past.

Figure 40:
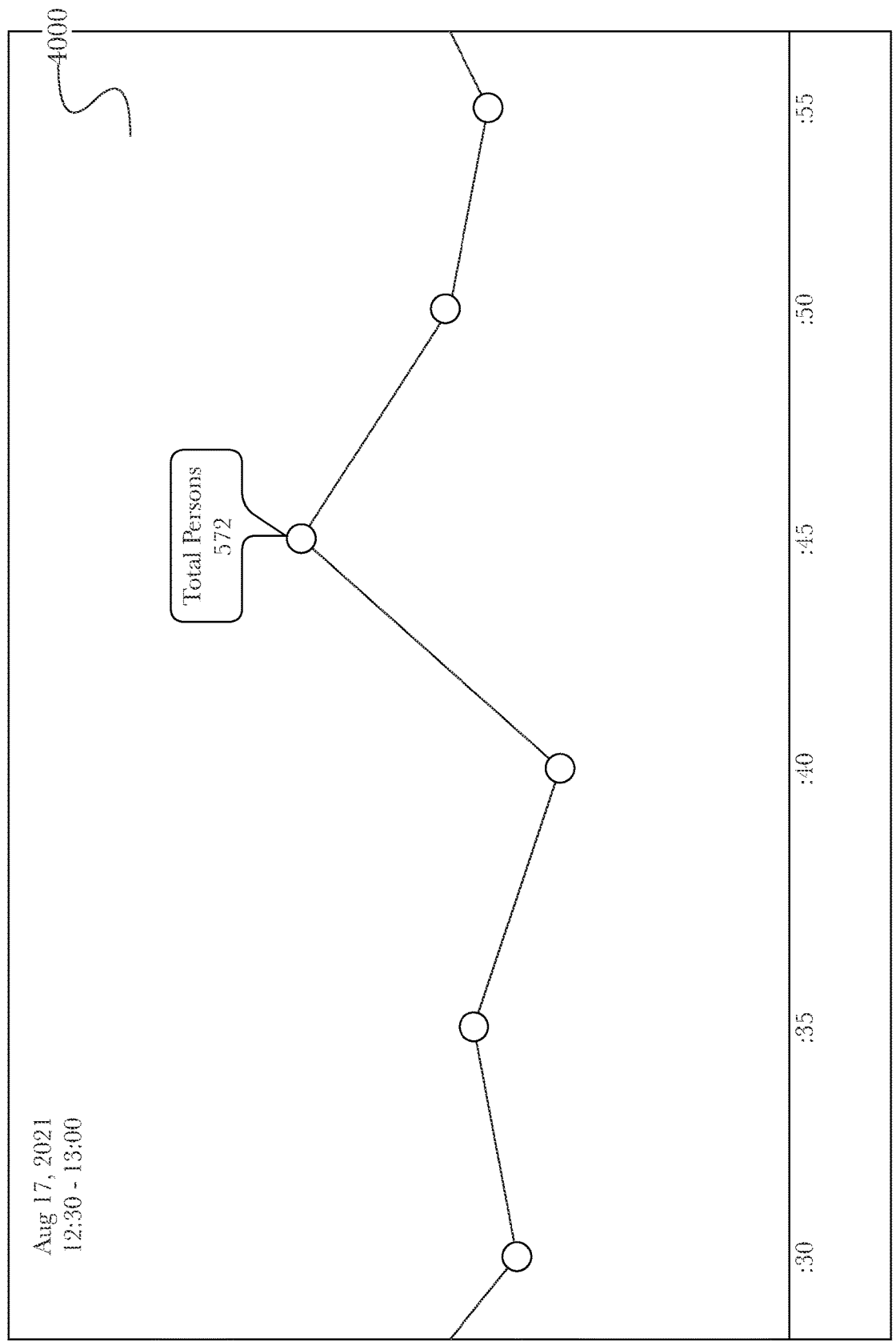
FIG. 40 is a block diagram illustrating a graph output from an analysis module, according to one aspect.
Figure 41:
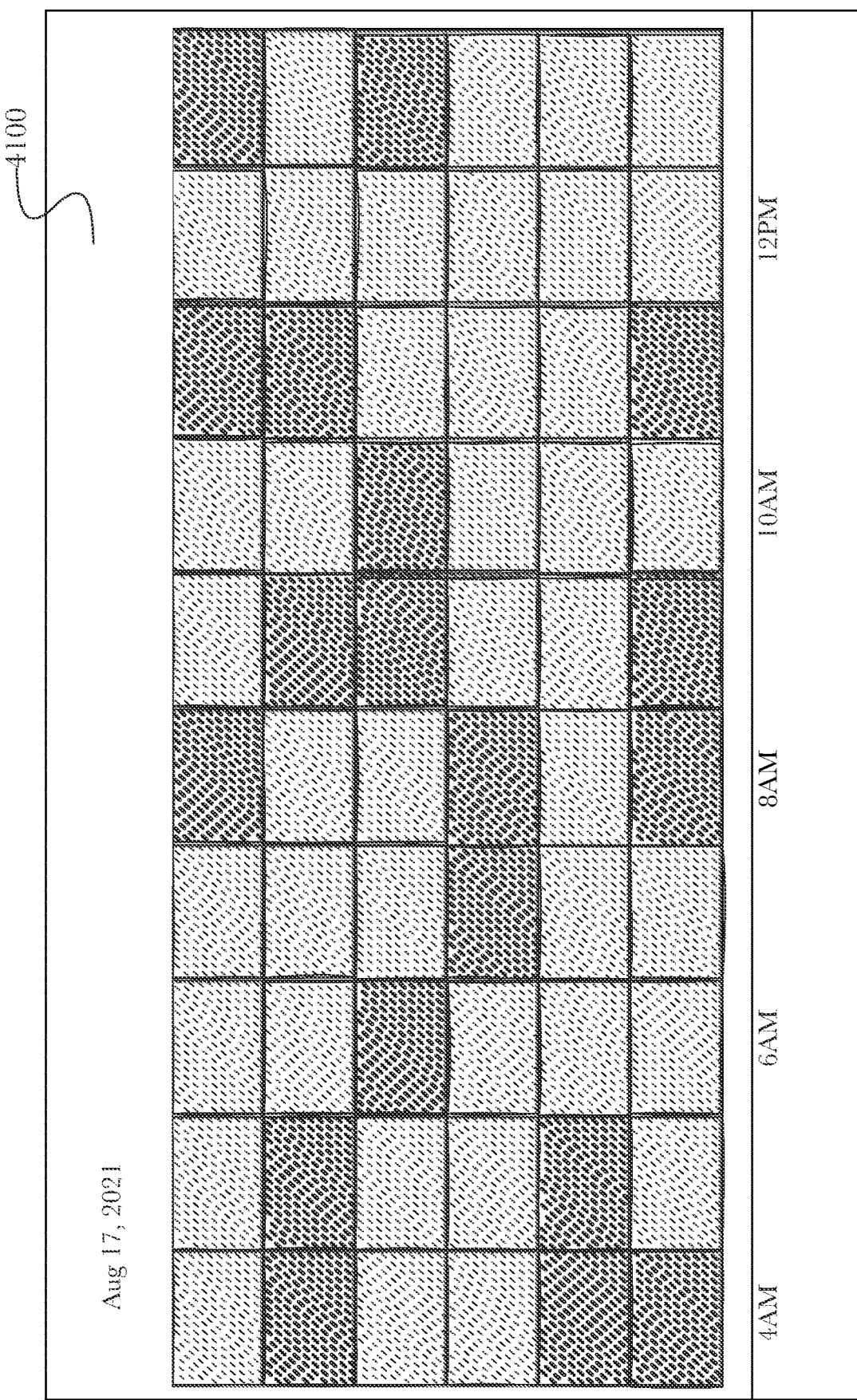
FIG. 41 is a block diagram illustrating another graph output from an analysis module, according to one aspect.

An analysis module 3307 may provide statistical analysis of past, current (i.e., real-time), and future (i.e., predicted) queue metrics. FIG. 40 is exemplary graph output 4000 from an analysis module 3007 illustrating the throughput of a queue during a half-hour timeframe. Over time machine learning could predict what throughput future timeframes may hold. FIG. 41 is another exemplary graph output 4100 from an analysis module 3007 illustrating a 10-minute time-block analysis from 4:00 AM to 1:00 PM of wait-times experienced in a queue, represented as different shadings (simplified for illustrative purposes). Analysis reports may comprise metrics such as total parties, total people, average party size, average queue length, average throughput, average wait, and other comparable metrics.

Figure 34:
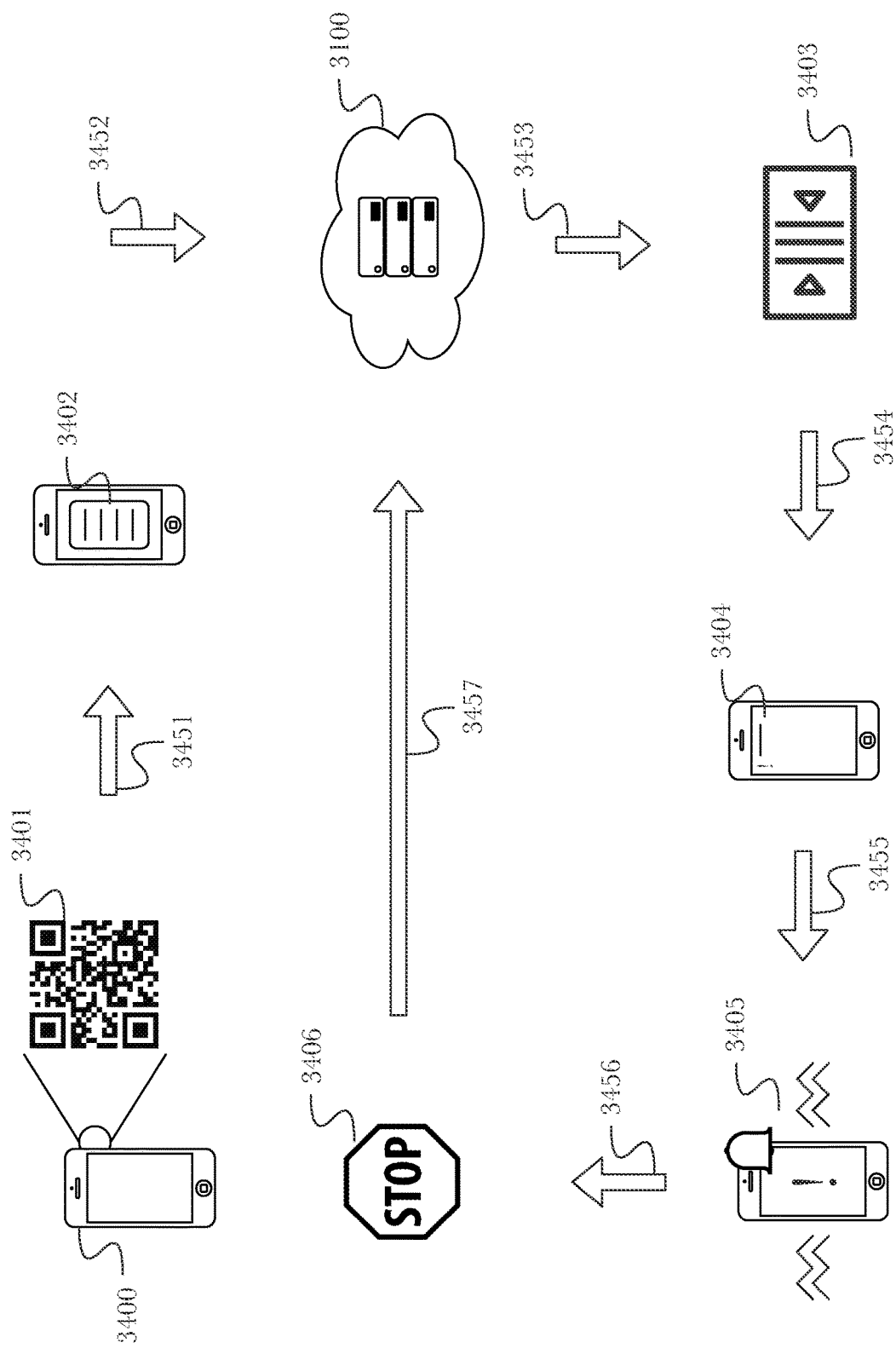
FIG. 34 is a block diagram showing an exemplary use of a cloud-based queue service, according to one aspect.

FIG. 34 is a block diagram showing an exemplary use of a cloud-based queue service 3200, according to one aspect.

Using the scenario of air travel, a passenger or a group of passengers may approach a queue in an airport. At the beginning of the queue, a sign may be displayed such as the one 3700 illustrated in FIG. 37. Where the sign 3700 comprises a QR code 3401 that auto generates a text message on the user's end-device, and that text message is sent to a cloud-based queue service 3200 from the end-device and initializes the queueing service provided by the invention. According to one embodiment, this sign could be scanned by a single passenger or a group of passengers for a sequence of queues. According to one other embodiment, this sign could initialize the passenger or group of passengers for a just one queue. According to yet another embodiment, this sign may be scanned by just one passenger from a group of passengers for a single queue or a sequence of queues for the whole group. According to another embodiment, this sign may be scanned by each passenger in a group of passengers for a single queue or a sequence of queues. Once the QR code 3401 is scanned by an end-device 3400, a text message 3402 may be automatically generated 3451 on the scanning device 3400. The end-device 3400 sends 3452 the text message to a cloud-based virtual queuing platform 3100. A cloud-based virtual queuing platform 3100 updates 3453 the queue 3403 based on the received message 3402 and sends 3454 a confirmation notification 3404 back to the end-device 3400. As the reserved place in the queue approaches, further notifications 3405 are sent 3455 to the end-device 3400 based on a set of notification escalation rules. Once the queued person or persons arrive at the queue destination 3406, and having checked-in (and authenticated their identity—or the end-device's, according to some embodiments) at their designated time 3456, the queue 3403 may be updated accordingly 3457.

Exemplary tables of notification escalation rules are illustrated in FIG. 44 and FIG. 45. FIG. 44 is a table diagram showing an exemplary and simplified rules-based notification escalation plan 4400. The notification type may be configured by the user, or by an administrator, or some combination thereof, based on the desired operating business parameters. When a queued person is 20 minutes out, 10 minutes out, and due to show for a queued reservation, the person's end-device may be notified via their stored preferred communication method if present, or it may default to text-based notifications or some other communication means. According to one embodiment, push notifications may be sent via a browser or application. Should the queued person not show on time, the end-device may receive one last preferred reminder/notification. As time passes, an IVR system may call the end-device and present the user with a series of options such as extending the time to show up by a few minutes or to reschedule the time-slot. Should the IVR call fail, or according to some other parameter, an automated message may play over the intercom if available. As a last resort, a call center agent may place an outbound call to the queued person's end-device to try to resolve the tardiness issue. Call centers with call blending capabilities may make such outbound calls. This table is merely exemplary and meant to convey just one scenario of rules. Many configurations and implementations exist using various means of communication and feedback mechanisms.

For example, FIG. 45 is a table diagram showing an exemplary and simplified rules-based notification escalation plan that further uses location data 4500. Using one or a plurality of sensors, the location of a person may be known or predicted for some time in the future (i.e., using map and traffic data and the end-device's GPS as one example). If the position in the queue is held at some time X, and the estimate time of arrival—using location data—for said queued person is Y, then Time Δ=X-Y. Therefore, any negative value of Time Δ is a likely scenario that a queued person will not show up at the expected time. Similarly, should Time Δ be a positive value, i.e., a person or group will show up earlier than expected a queue load balancer 3303 may reorganize queued persons to facilitate the early arrival. A rule set 4500 may be created and applied for such situations. Other rule sets may be created for various aspects of the queuing procedure. Additionally, location data may be used by a prediction module 3304 to predict the future location of queued persons.

Figure 35:
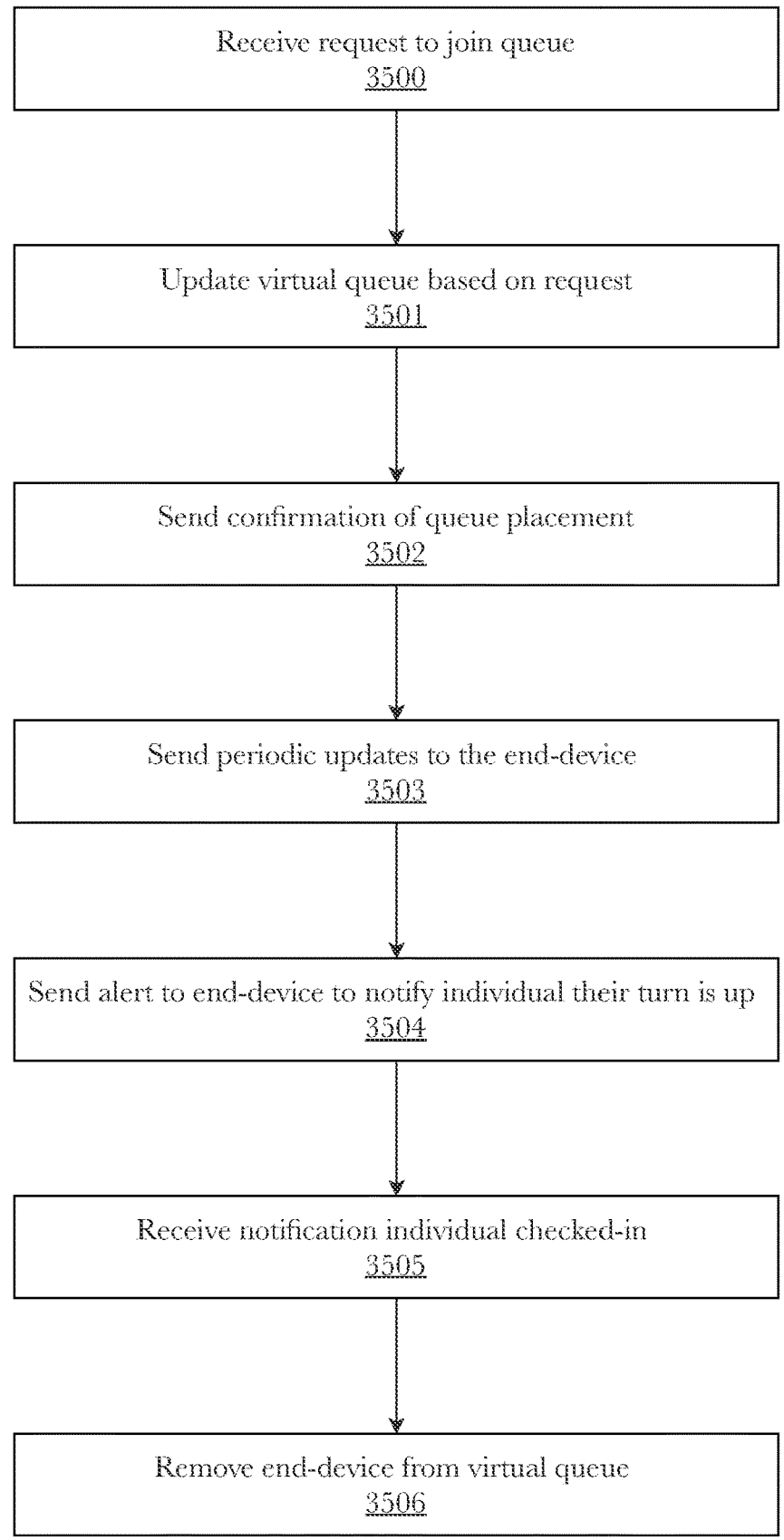
FIG. 35 is a method diagram illustrating the use of a cloud-based virtual queuing platform with an end-device, according to an embodiment.

FIG. 35 is a method diagram illustrating the use of a cloud-based virtual queuing platform with an end-device, according to an embodiment. A cloud-based virtual queuing platform 3100 receives a request from an end device to join a queue 3500. The request may also be to leave a queue if already slotted, or change places in a queue, or request more time to get to the queue destination, change the party size, transfer between queues, or to request the status of a queue.

A cloud-based virtual queuing platform 3100 updates one or more queues based on the type of request, i.e., based on at least one of the scenarios presented above 3501. Configuration changes may occur within components 910, 920, and 3301-3308 of a cloud-based virtual queuing platform 3100 based on certain request scenarios. For example, a request for more time to reach the destination if a person or persons is running late may cause a queue load balancer 3303 and/or a prediction module 3304 to adjust their algorithmic parameters, which in the end may still update the queues.

A confirmation will be sent back to the end-device to confirm a successful or failed request attempt 3502. Requests may also be sent to the entity as desired or stored in a database or blockchain. Failed or suspicious for requests may activate alarms or trigger security sequences within a security module 3306.

Periodic updates may be sent to the end device, entity, or some combination thereof 3503. As described previously, notifications, i.e., periodic updates, maybe sent according to a rule set (e.g., notification escalation plan). Notifications may be sent over any type of communication means, any combinations of said communication means, and in any frequency as necessary.

Notifications may or may not adjust as the time nears when a queued person or persons should begin to move towards the queue destination 3504. Adjustments may be as described above using notification escalation plans. According to one embodiment, alerts may be sent over devices that are not the end-device, such as an intercom or pager system. According to one embodiment, a prediction module 3304 uses routing algorithms and machine learning to determine the amount of time needed for a person or persons to get to the destination in time. The routing algorithms and machine learning not only considers the person who is currently at the front of the queue, but may consider any combination of persons across some or all queues and any combination of some or all persons in some or all queues.

A cloud-based virtual queuing platform 3100 is notified once the person or persons has checked in 3505. A successful notification may depend on whether or not that person or persons have been successfully authenticated, according to one embodiment. Notification that the individual or individuals have checked-in may update queues or trigger other actions according to the embodiments set forth herein.

One such update to the queue may be to remove the queued individual or individuals, i.e., the individual's or individuals' end-devices, from the queue 3506. Should the individuals be in a sequential queue, then the individuals may be transferred to a different queue in addition to being removed from the queue they were previously in.

Figure 36:
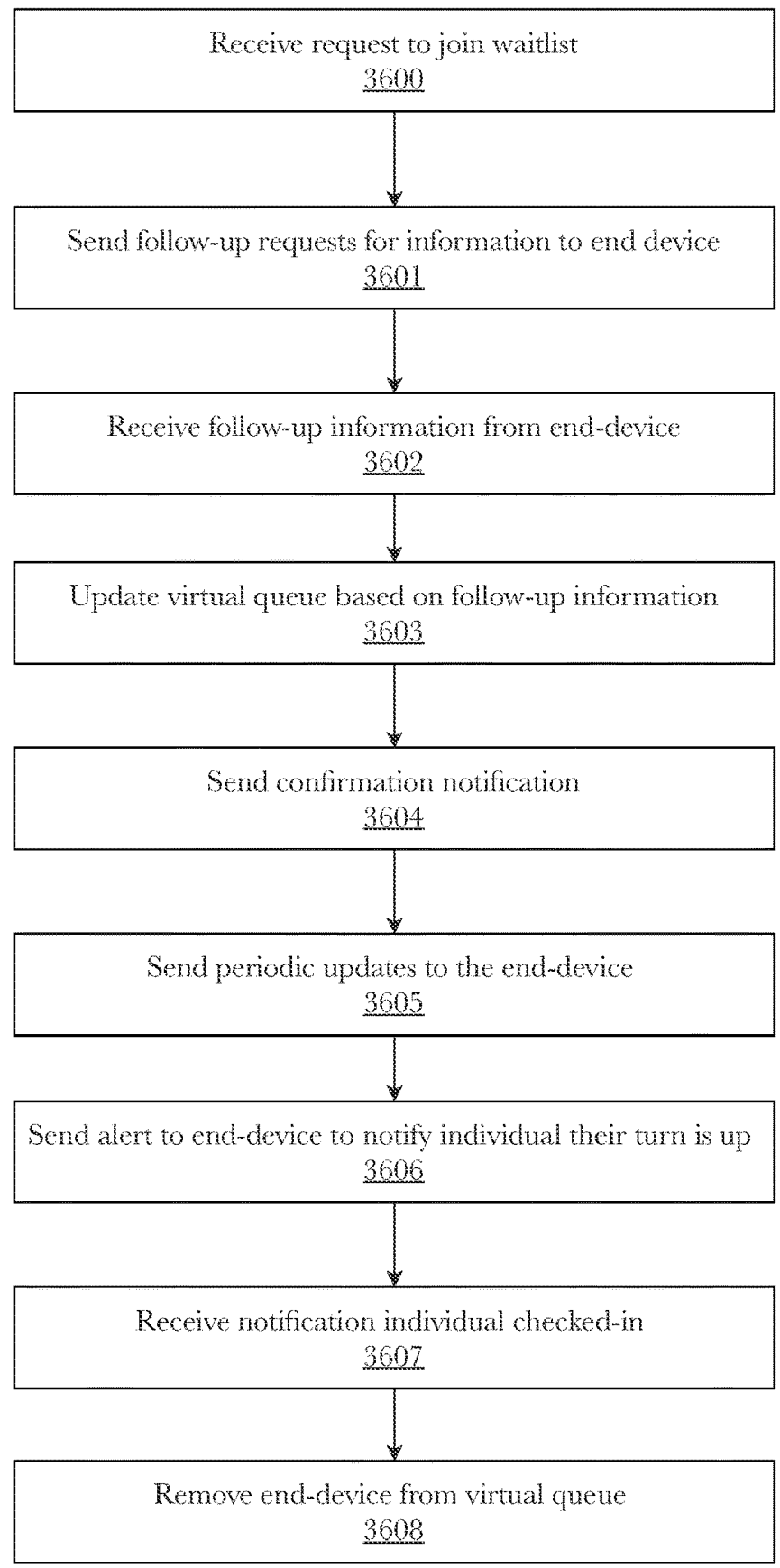
FIG. 36 is a method diagram illustrating another use of a cloud-based virtual queuing platform with an end-device, according to an embodiment.

FIG. 36 is a method diagram illustrating another use of a cloud-based virtual queuing platform with an end-device, according to an embodiment. In this embodiment, follow-up text messages are sent to an end-device to request further information. The information may be required or not depending on the application. The information may be used to more accurately predict wait-times, slot the appropriate number of persons in a queue, or other queue-based parameters.

Figure 37:
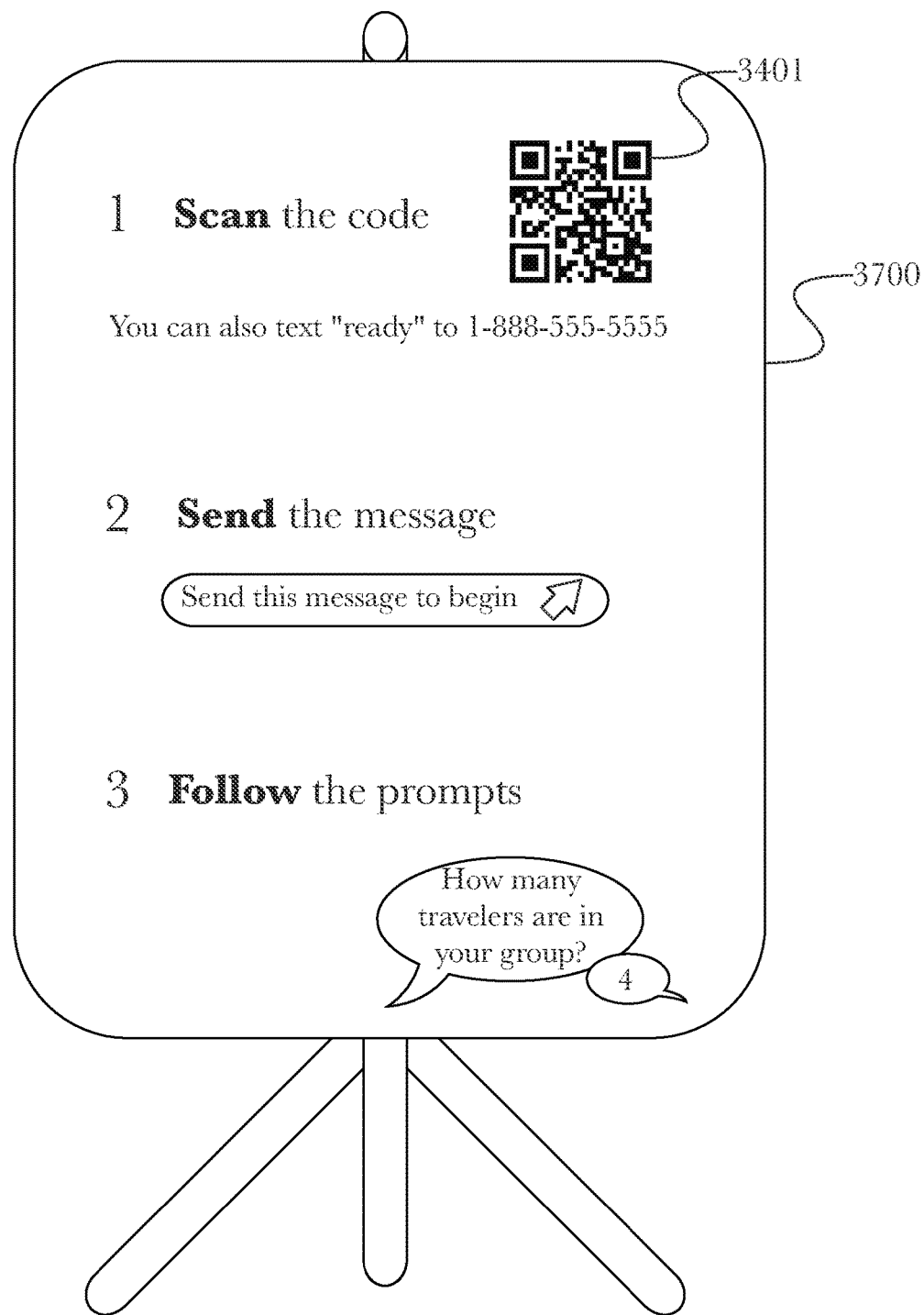
FIG. 37 is a block diagram illustrating signage used to initiate bi-directional communication between a cloud-based virtual queuing platform and an end-device, according to one aspect.

A group of travelers may scan a QR code 3401 as illustrated in the sign 3700 in FIG. 37, whereby after sending the automatically generated request 3402/3600, the end-device receives a request for information in the form of a text, as one example, from a cloud-based virtual queuing platform 3100 as to the number of passengers in the group 3601. A cloud-based virtual queuing platform 3100 may then accumulate the required number of slots 3603 from the reply 3602 in one or more queues as calculated by the queue load balancer 3303. Like FIG. 35 explains, a sequence of notifications 3604-3607 may then be sent to the end-device(s) and to the entity until the group has checked-in and has been removed from the queue 3608.

Figure 38:
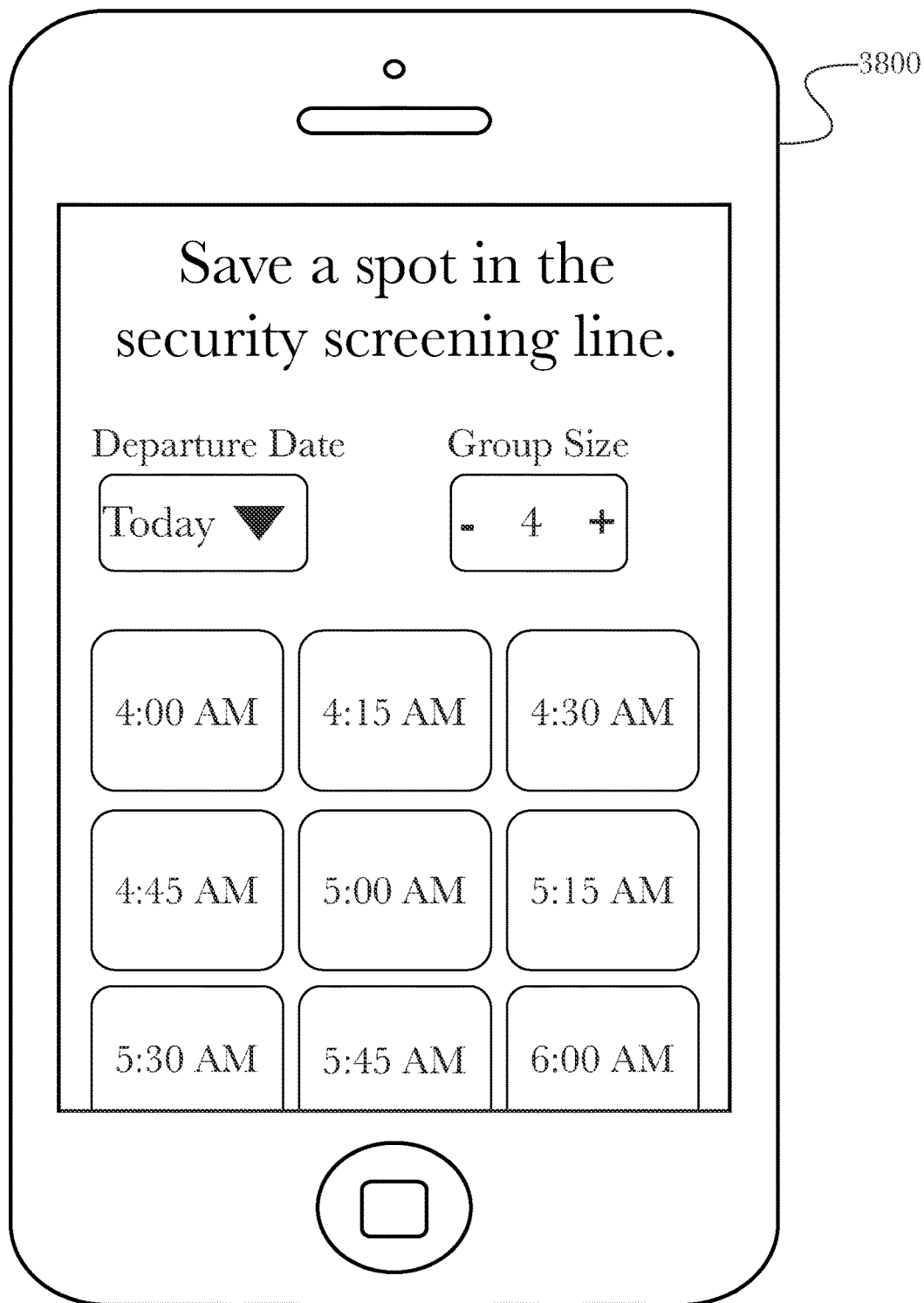
FIG. 38 is a block diagram illustrating one aspect of an exemplary mobile application used in bi-directional communication between a cloud-based virtual queuing platform and an end-device, according to one aspect.
Figure 39:
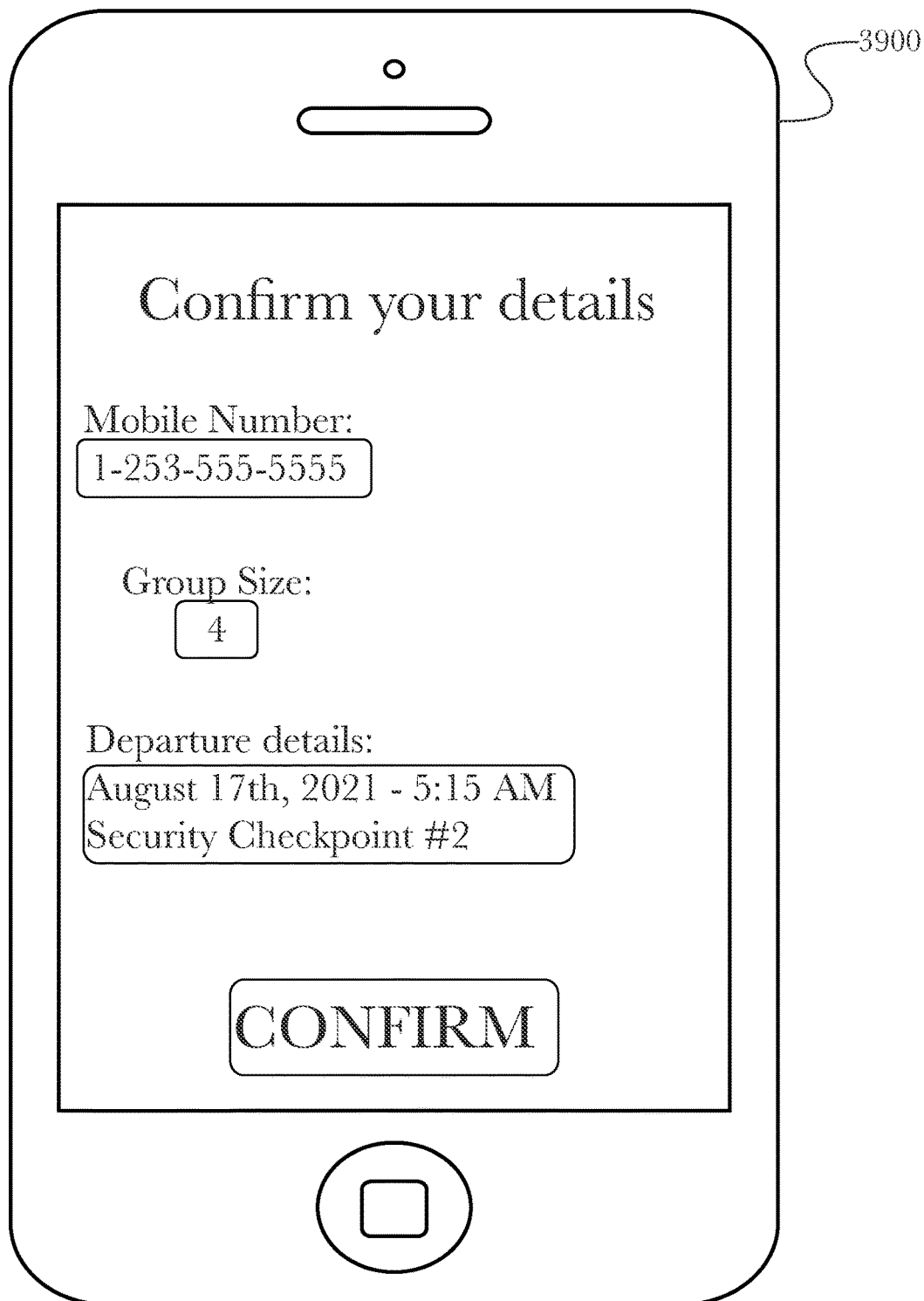
FIG. 39 is a block diagram illustrating another aspect of an exemplary mobile application used in bi-directional communication between a cloud-based virtual queuing platform and an end-device, according to one aspect.

FIG. 38 and FIG. 39 are block diagrams illustrating an exemplary mobile application (or web-based/browser-based according to one embodiment) used in bi-directional communication between a cloud-based virtual queuing platform and an end-device, according to an embodiment. FIG. 38 shows how a person may reserve a spot in a security checkpoint line for a group of 4 using a web-based or app-based mobile solution 3800. While FIG. 39 shows a confirmation screen following the reservation screen in FIG. 38 3900.

Figure 42:
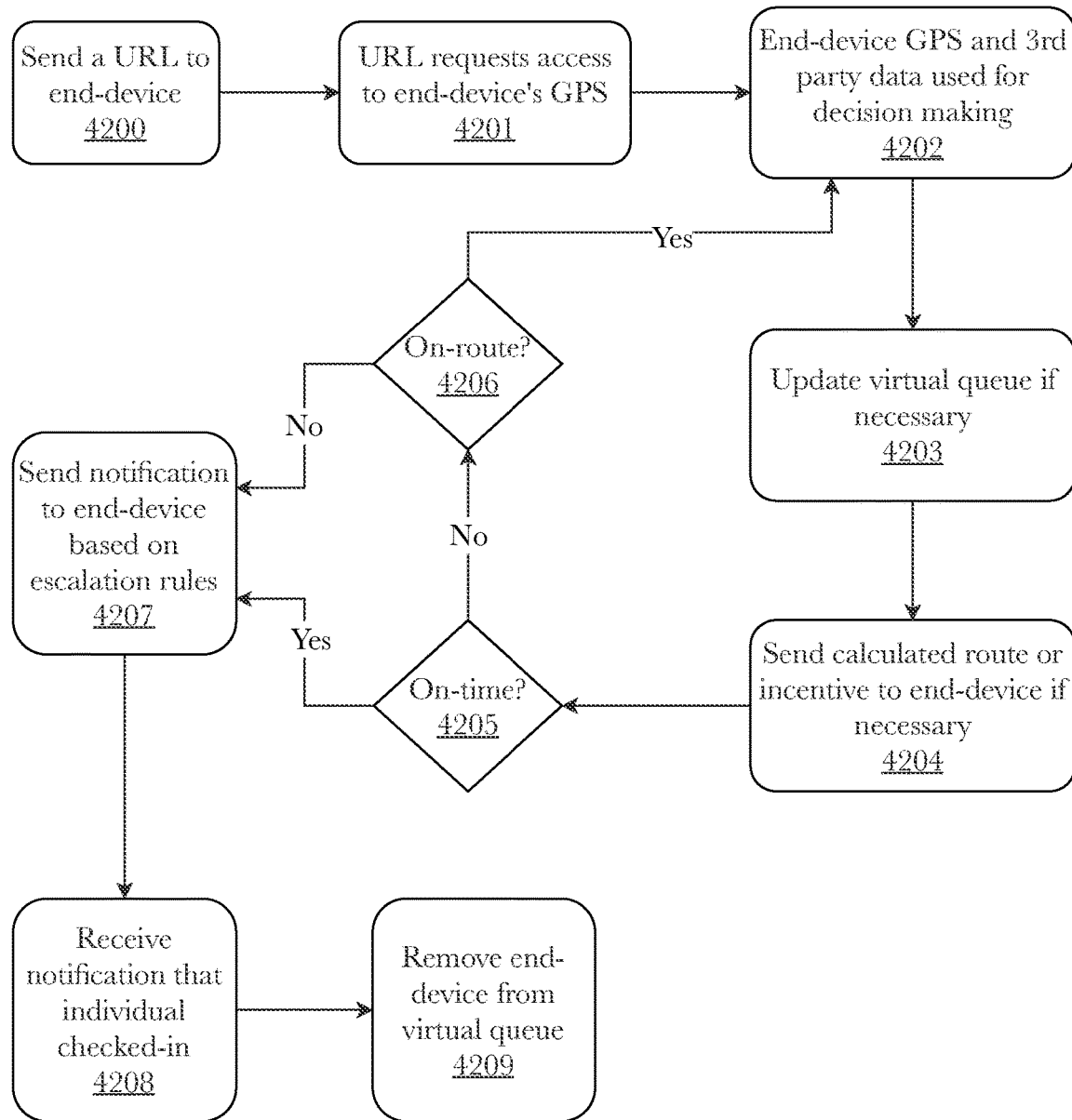
FIG. 42 is a flow diagram illustrating a web-based GPS aspect of a cloud-based virtual queuing platform, according to an embodiment.

FIG. 42 is a flow diagram illustrating a web-based GPS aspect of a cloud-based virtual queuing platform, according to an embodiment. According to one aspect of various embodiments, GPS is used to track a queued person or persons and may also be used to predict estimated-time-of-arrivals and to then use that information to dynamically adjust one or more queues. This figure illustrates just one method of gaining access to and implementing GPS functionality.

According to this embodiment, a URL is sent 4200 to an end-device that directs the end-device to a webpage that asks for access to the end-device's location 4201. The URL may be sent by any number of communication means (text, email, etc.). According to another embodiment, GPS access may be granted through a partnering application or a bespoke application.

The GPS data is then used at least by itself to determine the location of the queued person 4202. If traveling in a group, an automated message could be sent to the tracked person asking if the whole group is present therefore providing location data for the whole group using one GPS. The locality data may be used with $3^{rd}$ party data (such as map and traffic data, public transportation data, news, social media, and "Big data") to make predictions and manage one or more queues. Predictions using the GPS and $3^{rd}$ party data may estimate the time of arrival for a plurality of people 4202. The plurality of data may be used to suggest specific travel routes or incentives for some individuals so that they arrive at a specific time in order to balance the queue load. For example, if the data shows a large influx of people are requesting or plan to arrive within a short time window, new route suggestions may be sent to some individuals to increase the total travel time and discounts for future events may be offered as an incentive. Continuing with this example, other individuals may be offered a coupon to a coffee shop which is on-route to the queue destination, in the expectation that some percentage will take advantage of the coupon thus better balancing the queue throughput for that high-influx time window. Other predictions and uses are anticipated using location data, sensors, $3^{rd}$ party data, and combinations thereof in order to better manage and balance one or more queues.

In a first 4200 and second 4201 step, the URL is sent to an end-device 4200 which leads to a browser that requests permission for the GPS 4201. The initial GPS reading skips steps 4202 and 4203 as they are "as necessary", and checks if the queued person is going to arrive on time 4205. If the person is predicted to be on-time, then notifications are sent as normal, set by the notification escalation plan 4207. If the person is not to be on-time and has not departed for the queue destination 4206, then notifications will be sent according to the notification escalation plan using those two parameters 4205/4205. If the person will not be on-time but is in-route, then the queue may be updated 4203 and if a prediction module 3304 determines a new (may be shorter, longer, or the same based on load balancing) route, the new route is sent to the end-device 4204. It may also be the case that the delay caused by the queued person requires some shifting of other queued persons, an incentive may be sent to one or more queued people 4204. At some point in time, given the queued person makes it to the queue destination, he, she, or they will be checked-in 4208 and the queue may be update appropriately 4209.

Figure 43:
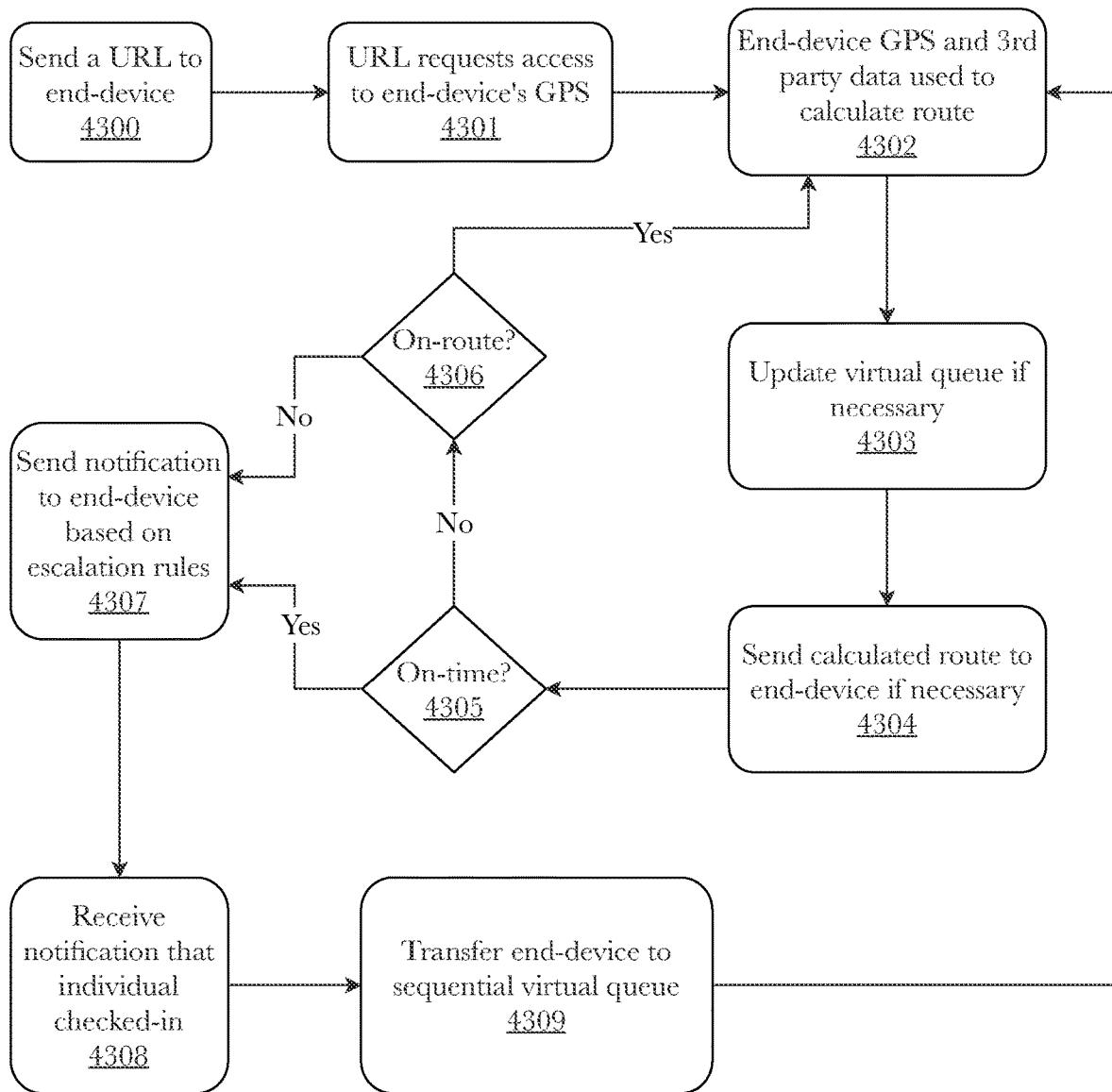
FIG. 43 is a flow diagram illustrating another web-based GPS aspect of a cloud-based virtual queuing platform, according to an embodiment.

Referring now to FIG. 43, steps 4300-4308 reflect the previous figure's steps, 4200-4208 respectively, with the exception that in a set of sequential queues, a person or persons may be transferred to the next sequential queue 4309, unless that queue was the last in the sequence. It is also correct to declare that FIG. 42 may be applied to sequential queues as a person or persons would inherently be removed from a previous queue in a sequence of queues after being transferred to the next queue in the same sequence.

Figure 46:
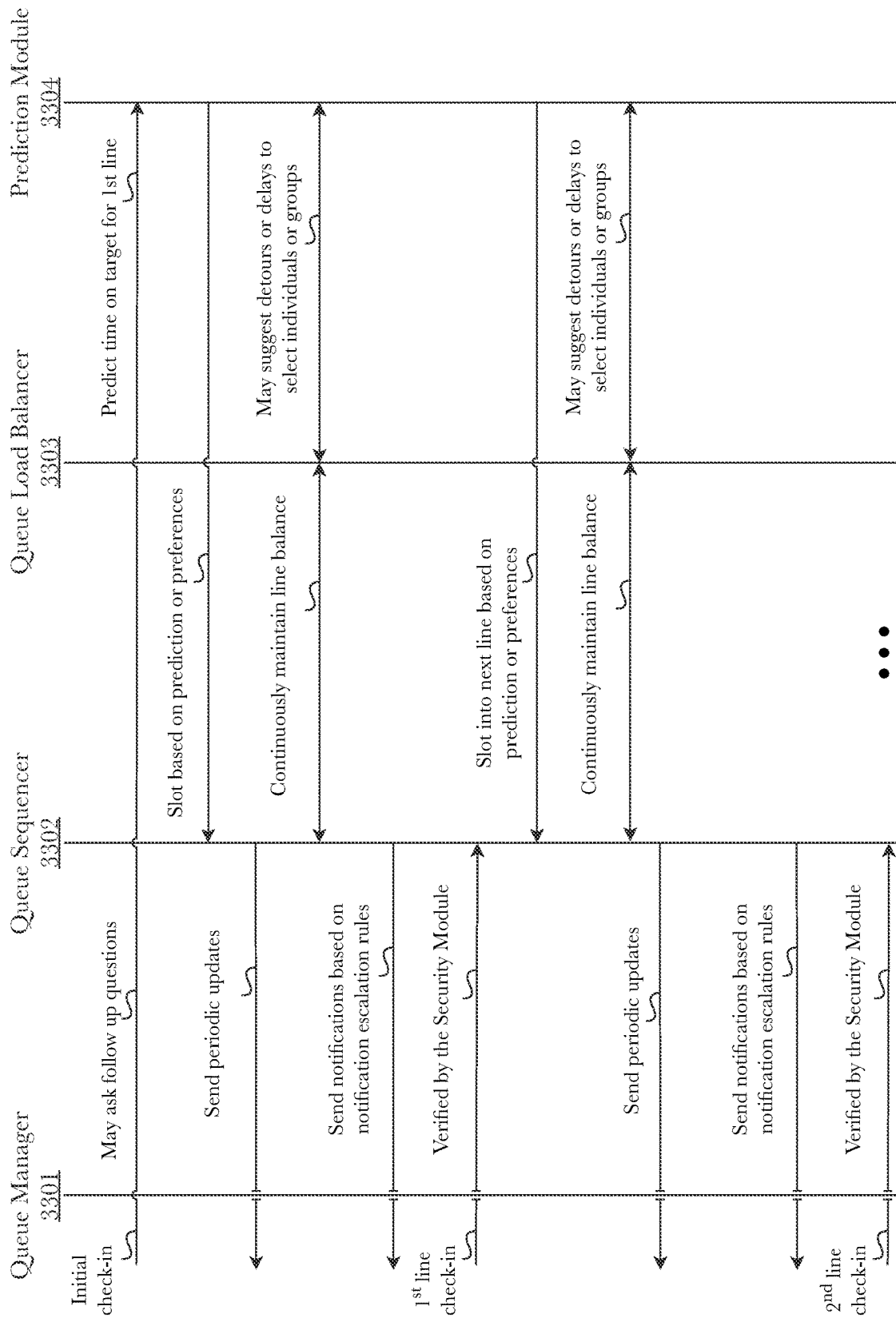
FIG. 46 is a message flow diagram illustrating the exchange of messages and data between components of a cloud-based virtual queuing platform for sequential event queue management, according to an embodiment.

FIG. 46 is a message flow diagram illustrating the exchange of messages and data between components of a cloud-based virtual queuing platform used in sequential event queue management, according to an embodiment. An initial check-in message is received by a queue manager 3301. Automated texting and callback technology may be triggered to ask one or more follow up questions to get more information. The follow up questions may be required or optional. A prediction module 3304 uses the available information to make the best check-in time recommendations, the amount of time needed to clear each queue, and so forth. The requesting party may then be placed in the first queue in the sequence based on the operating parameters (either by recommendations or explicit requests). The queue sequencer 3302 sends updated queue information to the queue manager 3301 which may trigger periodic notifications to be sent to the party.

A queue load balancer 3303 uses real-time queue information from a queue sequencer 3302 and predictions from a prediction module 3304 to keep the wait times to a minimum across the plurality of queues. The queue load balancer 3303 may be configured to prioritize other goals instead as disclosed elsewhere herein. As also disclosed elsewhere, the queue load balancer 3303 may use detours, incentivized delays, and coupons to adjust the flow of traffic through an event, both spatially and/or temporally. For example, a virtual event may not have spatial restrictions but network congestion restrictions, wherein queued persons may be presented with advertisements or media to control the flow of the queue. These aspects may be optional for queued persons with incentives to choose to wait longer than others, such as the airlines industry does when a flight is overbooked.

Once the party has checked-in to the first line successfully, the party is slotted into the next sequential queue. Throughout the whole sequential queue process, the queue load balancer 3303 is maintaining the optimal wait time configuration. This process of checking-in, maintaining bi-directional communication with the party (i.e., end-device), and maintaining optimal wait times is iterated through each line until the party clears the final queue.

Figure 47:
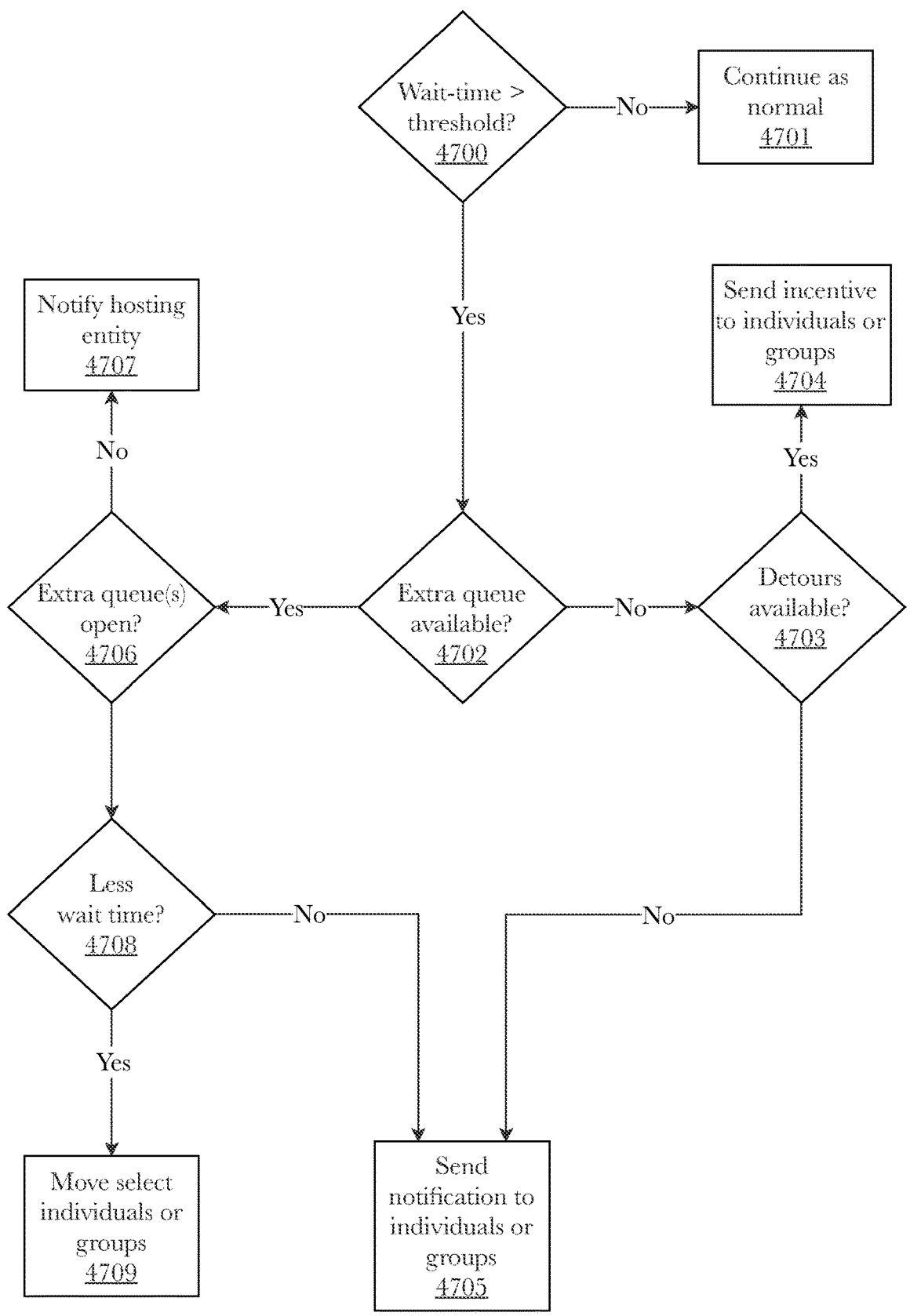
FIG. 47 is a flow diagram illustrating a load-balancing aspect of a cloud-based virtual queuing platform, according to an embodiment.

FIG. 47 is a flow diagram illustrating a load-balancing aspect of a cloud-based virtual queuing platform, according to an embodiment. This figure illustrates only one algorithmic aspect of a load balancer 3303. This aspect is the balancing of parallel queues, wherein parallel queues are queues all leading to the same outcome/destination.

In a first step 4700, the average wait time (wait time(s) could also be measured against some other parameter, e.g., even if one queued person has to wait more than X minutes, etc.) is compared a set threshold limit. If the average wait time has not surpassed the limit, then the operation continues as normal 4701. If the limit has been surpassed, then it is determined if a new queue is available 4702. This may be accomplished by storing entity profiles in a database, having such information as how many queues (or check-in stations) may be established. This applies for many aspects of the entity. According to one embodiment, entities may be sent automatic messages requesting such information if it is not known. If it cannot be established that another queue is possible, or that another queue is not possible, then incentives may be sent out to a calculated set of queued persons 4704 if available 4703. If not, then at least a notification is sent out to the effected parties, including the entity in some embodiments 4705.

If a new queue may be established or an already existing parallel queue does not exist 4706, then the entity is notified to establish (e.g., man a check-in counter, place or power on an automated check-in means) a parallel queue 4707. That is unless the entity does not need to perform any actions to instantiate a parallel queue. According to one embodiment, a cloud-based virtual queuing platform may send an electronic signal instantiating a new check-in apparatus/destination/virtual or physical point. For example, the electronic signal may turn on a "lane open" sign and boot an NFC beacon within a turn-style. If it so happens that a turn of events in-fact does not lead to wait times under the threshold, the effected parties may be notified 4705. However, it is likely that this algorithm combined with the other factors calculated by a cloud-based virtual queuing platform, i.e., the iterative queue simulations solutions, will provide a decreased average wait time. If it is determined that adding a new queue (or that an already existing queue is not at capacity) 4708 than notifications may be sent instructing individuals and groups to adjust accordingly 4709. The cloud-based virtual queuing platform may be configured to allow an individual or group of individuals to book a time slot in a queue using a mobile device (e.g., smartphone, tablet, smart wearable, etc.); the individual or group can overflow into another queue if it has availability. For example, if two airlines use the same gate, but different security checkpoints, and there is availability at one checkpoint and not the other, the platform can automatically overflow the individual or group to the other checkpoint so they can still book the desired virtual queue time slot. In such a case, a notification may be sent to individuals who have been 'overflowed' via various communication channels including, but not limited to, SMS, email, and other messaging applications (e.g., WhatsApp, etc.).

Not shown in this diagram are other considerations such as the economic cost of operating additional queues, pandemic considerations such as separating persons by vaccination-status, and other queue-related considerations. According to some embodiments, the wait time threshold 4700 may be compared against the time decreased by adding additional queues 4708, and if the wait time difference is significant enough, shuffle queued people around 4707 regardless if the new wait time 4708 is under the threshold 4700.

Figure 48:
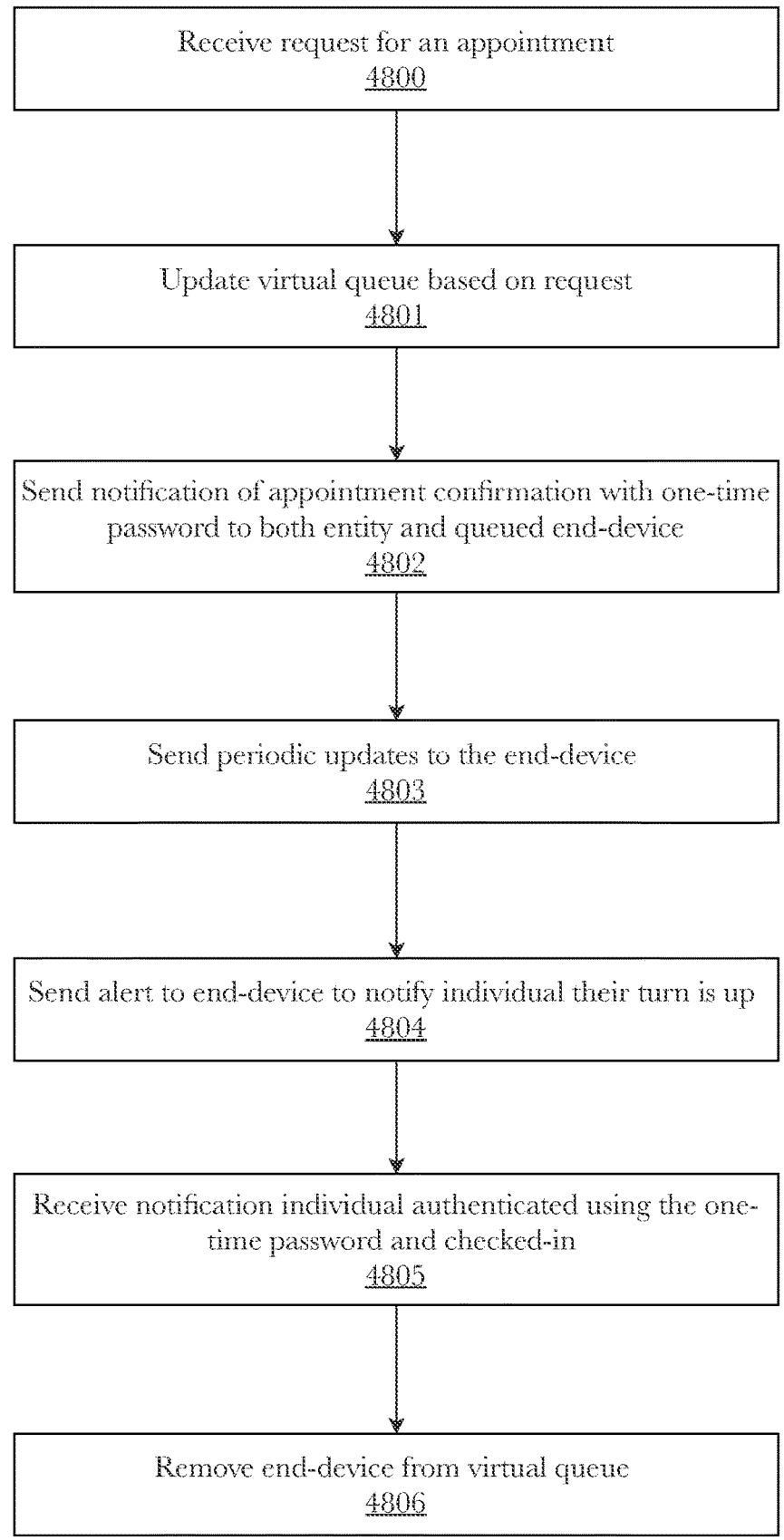
FIG. 48 is a method diagram illustrating a one-time password aspect in a cloud-based virtual queuing platform, according to an embodiment.

FIG. 48 is a method diagram illustrating a one-time password aspect in a cloud-based virtual queuing platform, according to an embodiment. This figure illustrates one method of implementing an authentication feature. The authentication in this example is a one-time use password that is given to the end-device and to the entity. According to one aspect, the password is only given to the end-device after a successful biometric authentication. According to another aspect, the entity is a business device that a business user uses to manually verify the password with the queued person. For example, a one-time password may be sent to both the queued person and the entity via text, email, or the like. Upon arrival, the queued person reads the one-time password to the business employee. According to one other aspect, the business employee may send a reply message back to a cloud-based virtual queuing platform confirming the queued person checked-in successfully. According to one aspect, the entity is an electronic device that is capable of verifying the one-time password such as a kiosk.

According to a first step 4800, a cloud-based virtual queuing platform receives a request for an appointment or a position in a queue. Requests may be other actions such as to leave a queue, etc. In a second step, the virtual queue may be updated based on the request 4801. A third step comprises sending a notification of appointment confirmation with one-time password to both an entity and a queued end-device 4802. Periodic updates may be sent to the end-device per a rule set 4803. In a fourth step 4804, an alert is sent to end-device (and the entity in some embodiments) to notify individual their turn is coming up or is up. Individuals are then authenticated using the onetime password via at least one of the implied or explicit methods disclosed herein. A notification of successful check-in may be automatically sent from an entity device or manually sent which is received by the cloud-based virtual queuing platform 4805. In a sixth step 4806, the end-device is removed from the virtual queue.

Figure 49:
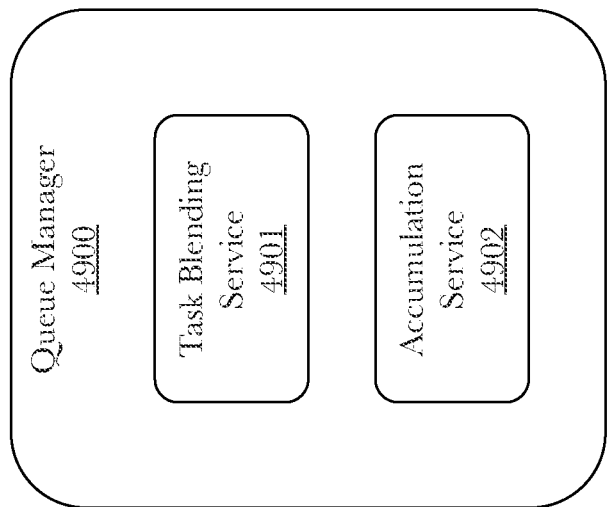
FIG. 49 is a block diagram illustrating an exemplary system architecture for a queue manager with task blending and accumulation, according to an embodiment.

FIG. 49 is a block diagram illustrating an exemplary system architecture for a queue manager 4900 with task blending and accumulation, according to an embodiment. According to various embodiments, a queue manager 4900, features the same functions as in previous embodiments disclosed herein, and further comprises a task blending service 4901 and an accumulation service 4902. Task blending 4901 is an improved version of call blending found in some call centers. Call blending gives the ability to deliver both inbound and outbound calls seamlessly to an agent, regulating outbound call volume based on inbound traffic. When inbound traffic is low, outbound calls are automatically generated for a specified campaign. When inbound traffic picks up, the dialer dynamically slows the number of outgoing calls to meet the inbound service level. Task blending further improves upon this by additionally redirecting computational resources for other tasks when queue throughput is low. According to various embodiments, callback clouds and cloud-based virtual queuing platforms as disclosed herein may comprise components that employ call blending or task blending.

Figure 50:
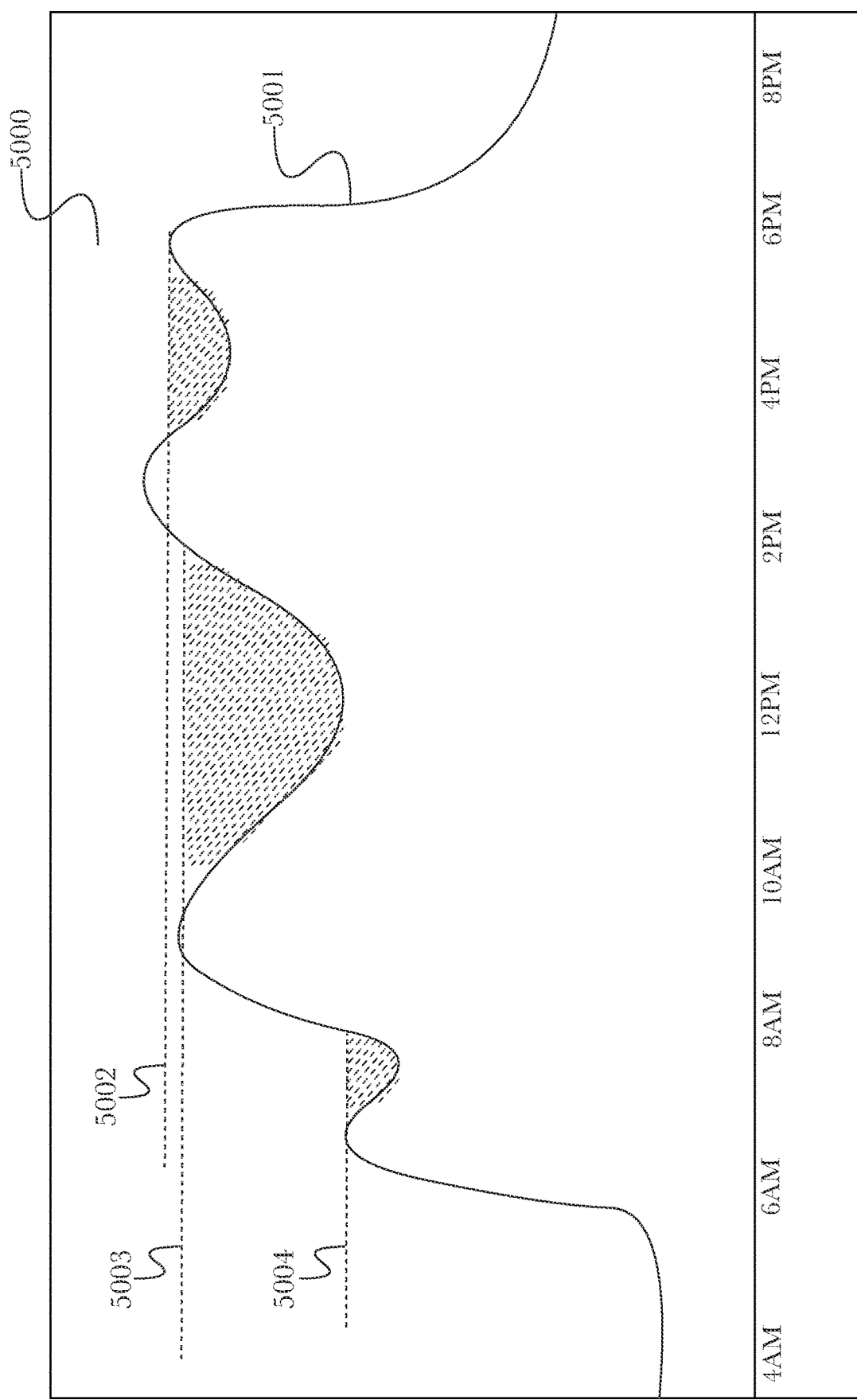
FIG. 50 is a block diagram illustrating a graph representing task blending opportunities based on queue throughput, according to one aspect.
Figure 52:
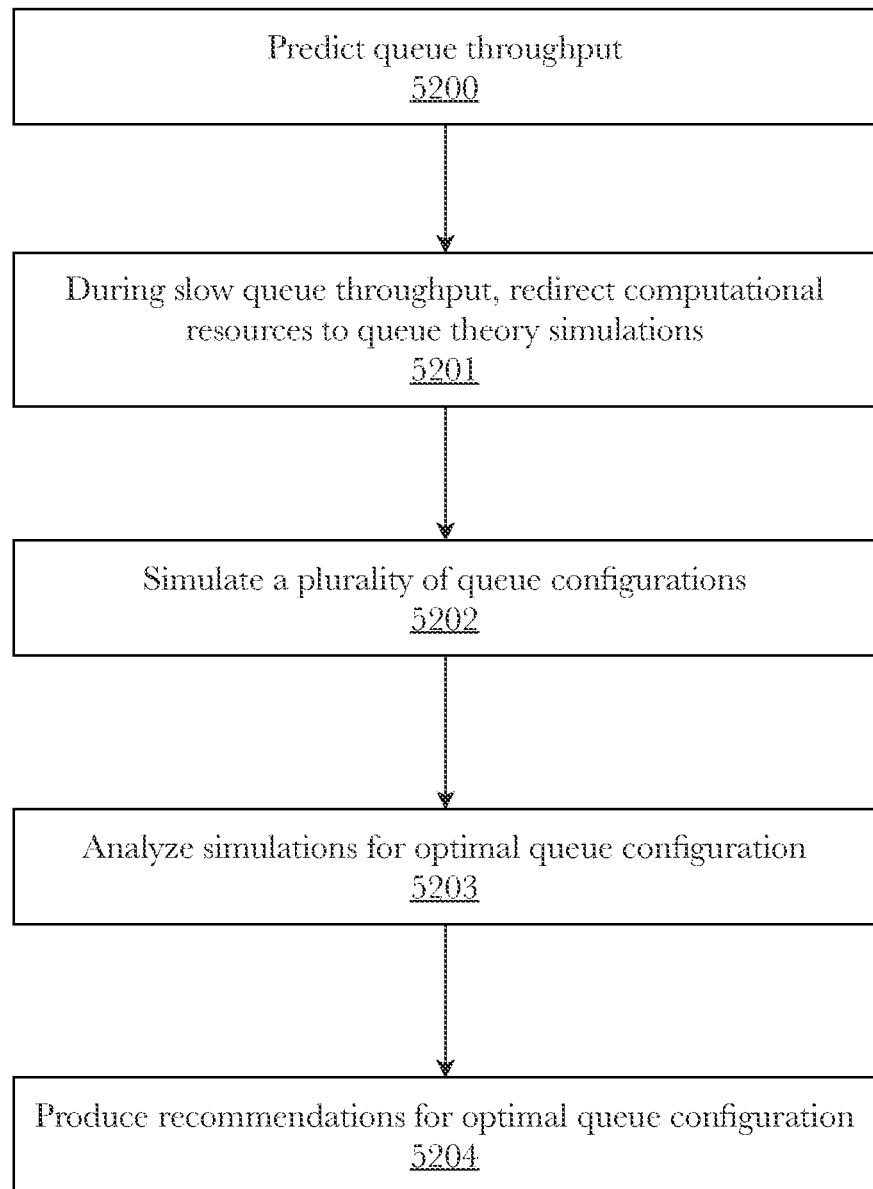
FIG. 52 is a method diagram illustrating task blending in a cloud-based virtual queuing platform, according to an embodiment.

Referring now to FIG. 50 and FIG. 52), to begin the implementation of a task blending service, queue throughput should be modeled historically and/or predicted 5200. For example, FIG. 50 illustrates a queue throughput between the hours of 4 AM and 8 PM 5000. With a future queue throughput modeled 5001, low throughput times may be identified 5002-5004 and used for call blending and task blending. According to one aspect, queue throughput may be modeled in real time, using calculus to derive instantaneous rates of change that may show the queue flow rate is decreasing.

According to one embodiment, low throughput queue flow may be used to trigger the reallocation of computational resources that were previously used for real-time queue simulations—see at least prediction module 3304 features in previous figures—for queue-configuration optimization simulations 5201. Real-time queue simulations refer to optimizing persons in a queue where the queue configuration is already established. Queue-configuration optimization simulations on the other hand uses queue theory to make recommendations physically and logistically for queues 5202. It is possible to implement recommended queue reconfigurations while persons are in a queue, but this is not recommended from a customer service standpoint. Furthermore, queue-configuration optimization simulations employ queue theory as well as other considerations. For example, a consideration of the queue's physical layout in space, the queue's possible physical arrangements, and the queue's physical relations to other queues. According to one aspect, determining optimal placement and configurations of many queues may be computationally intensive because it is similar to approximating solutions for the traveling salesman dilemma.

Queue theory optimized simulations may make use of Little's rule which provides the following results:

$$L = \lambda W; L_q = \lambda W_q$$

Where $\lambda$ is the mean rate of arrival and equals 1/E [Inter-arrival-Time], and where E[.] denotes the expectation operator. W is the mean waiting time in the system. $L_q$ is the mean number of customers in the queue. $W_q$ is the mean waiting time in the queue. The first part of the above applies to the system and the second half to the queue, which is a part of the system.

Another useful relationship in the queue is:

$$W = W_q + \mu$$

Where $\mu$ is the mean service rate and equals 1=E[Service-Time]. The above provides the mean wait in the system which is the sum of the mean wait in the queue and the service time (1/$\mu$).

Figure 51:
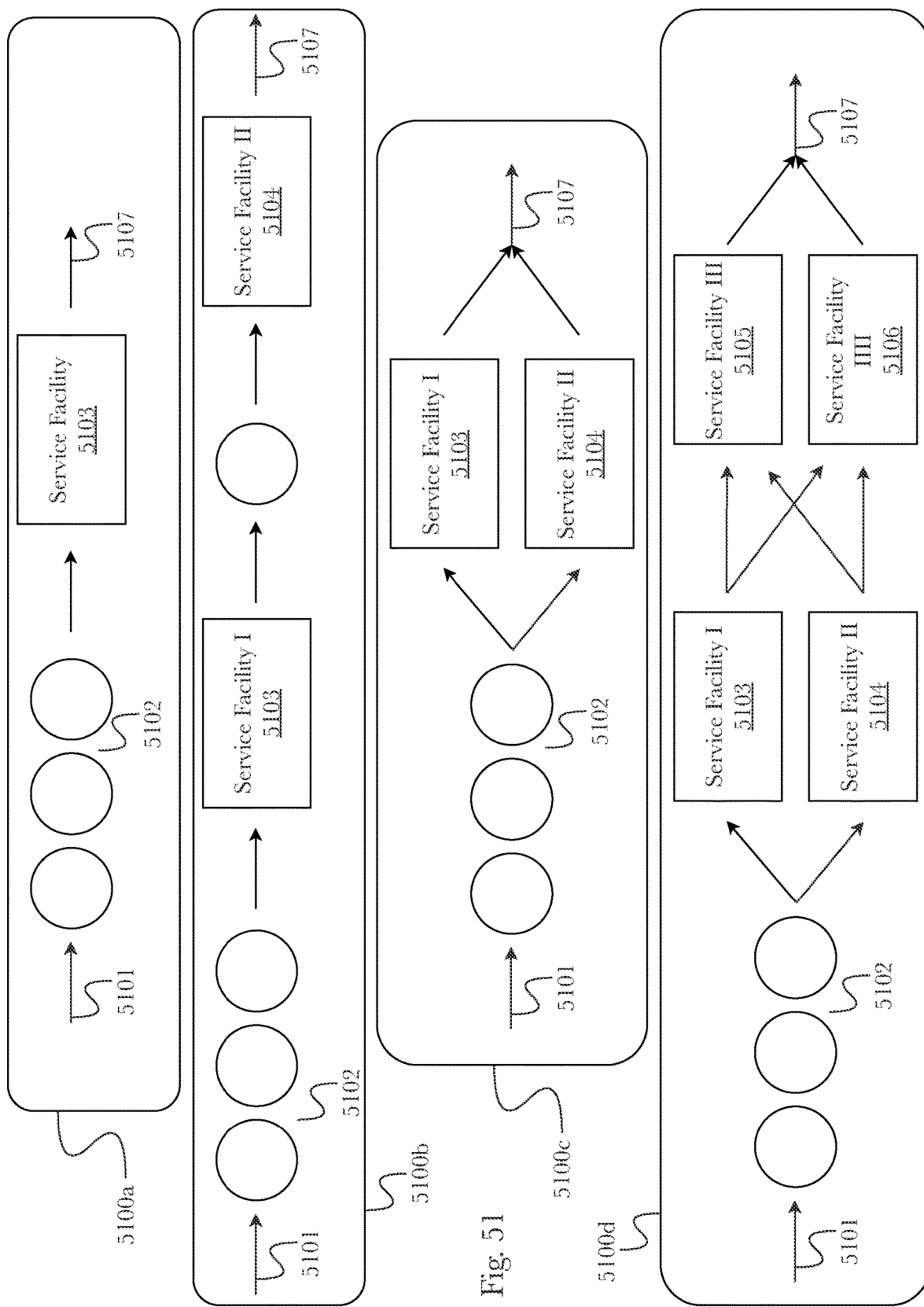
FIG. 51 is a block diagram illustrating four exemplary queue models used for queue simulations, according to one aspect.

Furthermore, queue theory makes use of at least 4 models as illustrated in FIG. 51. In FIG. 51, there are four models each with an arrow 5101 representing arrivals, a series of circles representing a queue 5102, one or more service facilities 5103-5106, and a departure arrow 5107. The first model is a single-channel, single-phase system 5100a. The second model is a single-channel, multi-phase system

5100*b*. The third model is a multi-channel, single-phase system 5100*c*. The fourth model is a multi-channel, multi-phase system 5100*d*.

Queue theory (the equations and queue models), physical restrictions, physical relations, and other queue data is used to simulate the optimal configuration of one or more queues 5202. The results of the plurality of simulation are analyzed for the optimal configurations 5203. These simulations may be provided a set of parameters by host entities. Produced recommendations are delivered via the various communication methods disclosed herein, e.g., web-based, app-based, text, etc. 5204. Queue-configuration optimization simulations may be computed at any time, not just during off-peak queue times. However, if resources are limited, task blending may be appropriate.

An accumulation service 4902 functions to supplement disclosed queue management processes by best reserving discrete positions in a queue for a group. For example, a group of 12 requests placement in a virtual queue, but the virtual queue may not have 12 continuous spots—for a variety of reasons. An accumulation service 4902 will reserve open spots, i.e., accumulate available positions in the queue, until the request is fulfilled. An accumulation service 4902 may call to a queue load balancer 3303 to rearrange persons to expedite the accumulation. This may mean adjusting select individuals for detours or incentives. Another method may be to increase or decrease the current wait time for persons queued back-to-back so that a new slot may be inserted between them.

Figure 53:
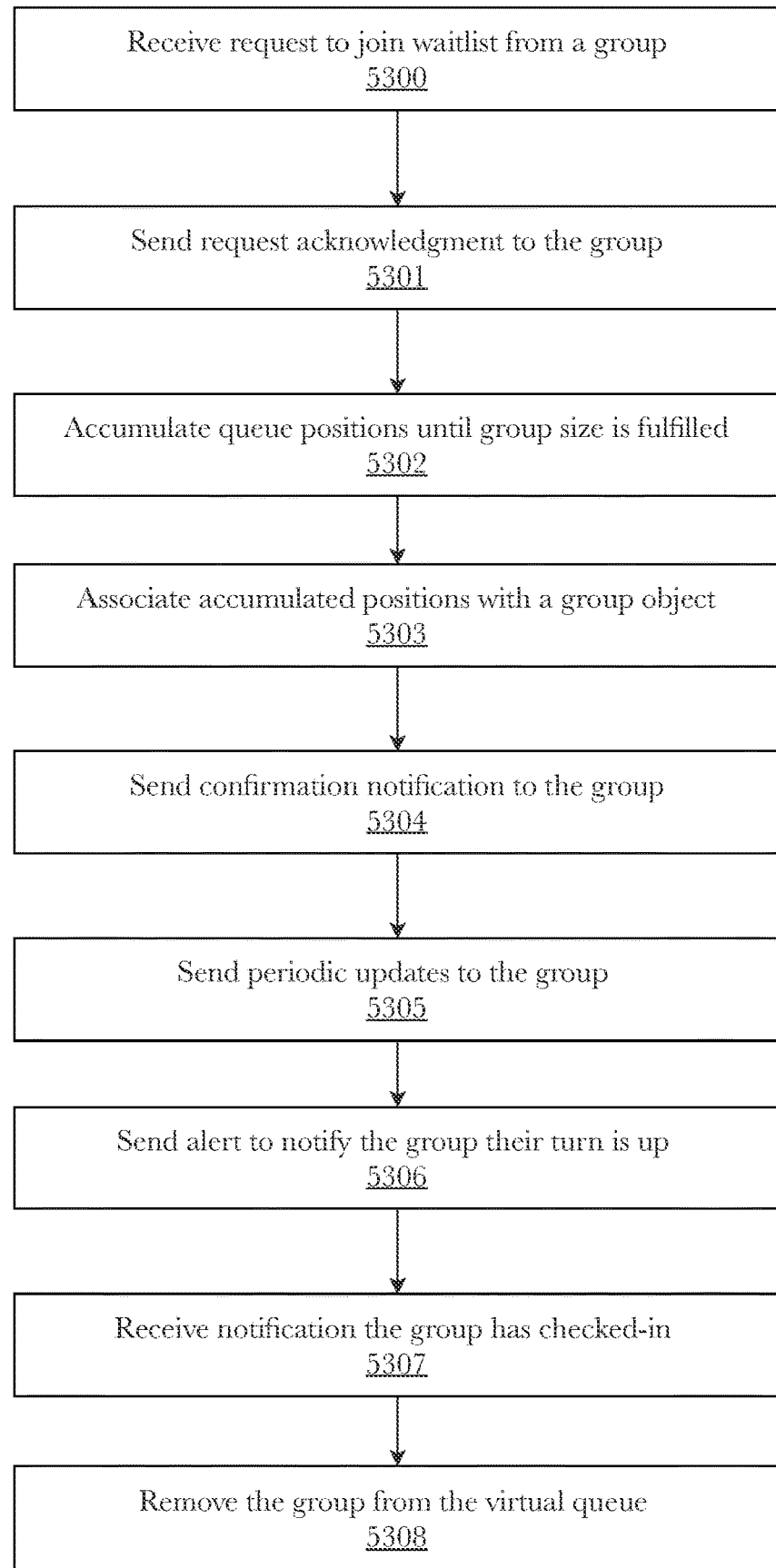
FIG. 53 is a method diagram illustrating an accumulation service used in a cloud-based virtual queuing platform, according to an embodiment.

FIG. 53 is a method diagram illustrating an accumulation service used in a cloud-based virtual queuing platform, according to an embodiment. An accumulation 4902 service receives a request to join waitlist from a group 5300 and sends a request acknowledgment to the group once received 5301. Queue positions are accumulated until the group size is fulfilled 5302. Accumulated positions are associated with a group object 5303 so the group object may be used in computational methods such as simulations of machine learning neural networks. A confirmation notification is sent to the group when all positions are finished accumulating 5304. Periodic updates are sent to the group as outlined in similar embodiments disclosed herein 5305. An alert is sent to notify the group their turn is up, or is coming up 5306. Notifications of the group's check-in status may be sent at the initial check-in, during the check-in process (e.g., how many of the 12 how so far processed through), and upon completion of the check-in process 5307. The group may now be removed from the virtual queue 5308.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 26:
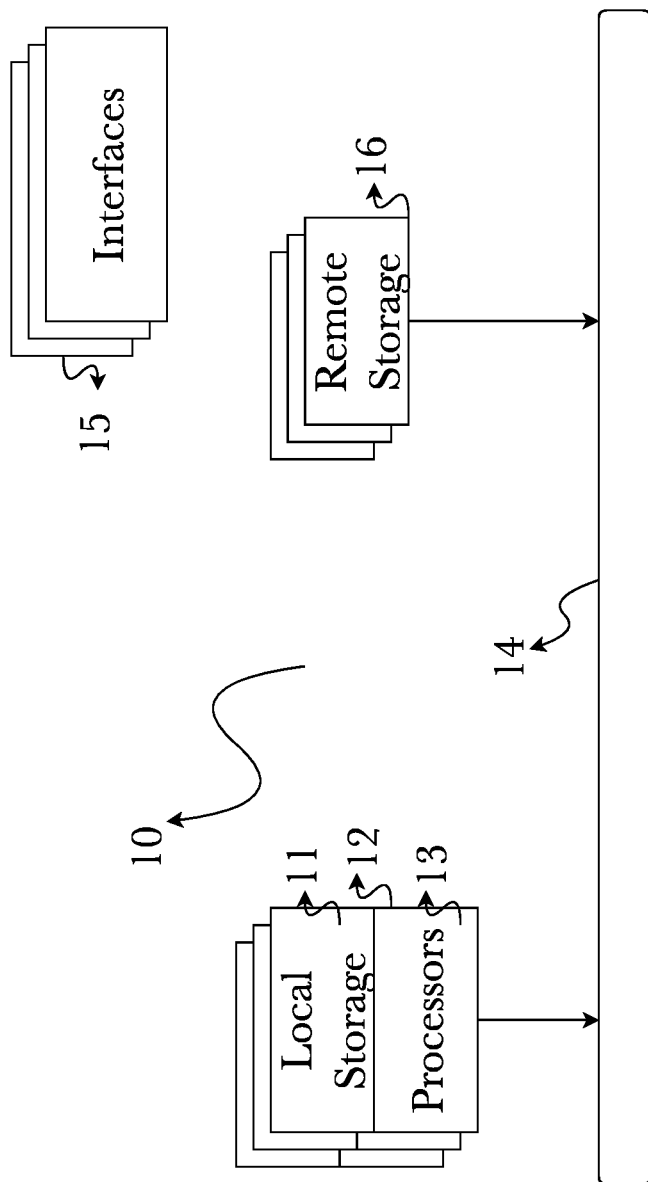
FIG. 26 is a block diagram illustrating an exemplary hardware architecture of a computing device.

Referring now to FIG. 26, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 26 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 27:
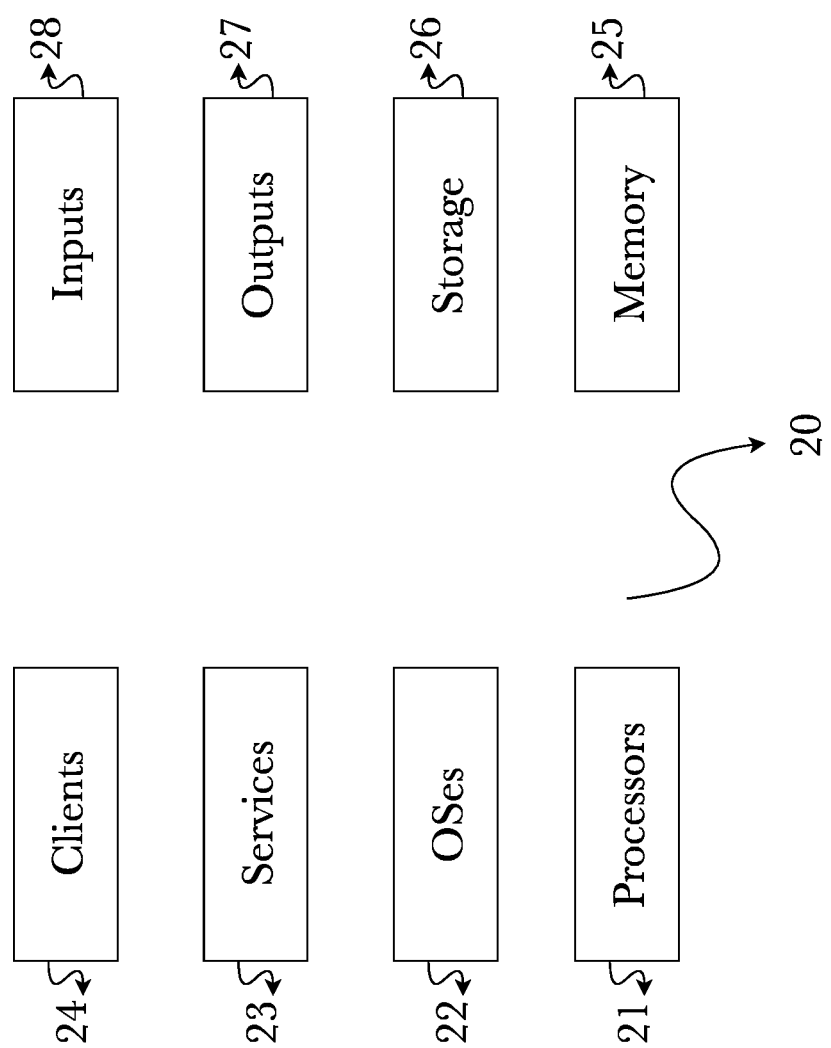
FIG. 27 is a block diagram illustrating an exemplary logical architecture for a client device.

In some embodiments, systems according to the present invention may be implemented on a standalone computing system. Referring now to FIG. 27, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 26). Examples of storage devices 26 include flash memory, magnetic hard drive, CD-ROM, and/or the like.

Figure 28:
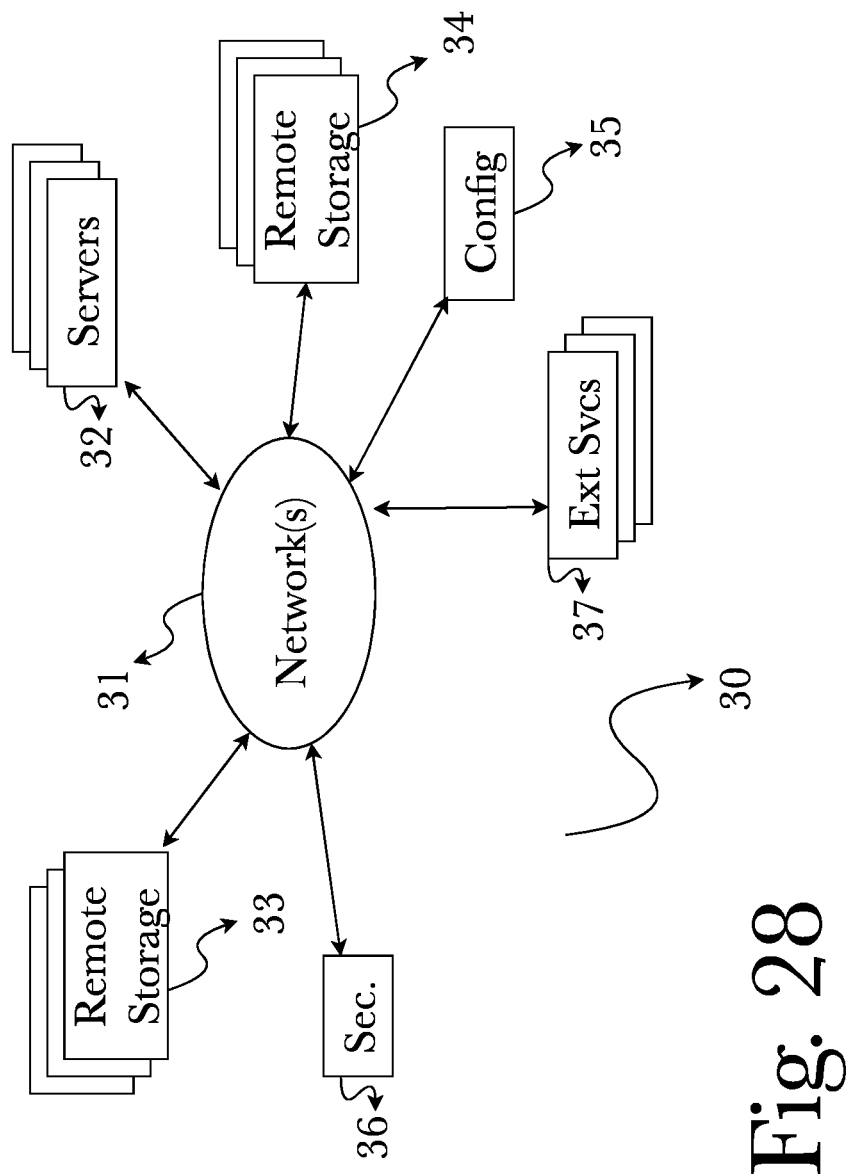
FIG. 28 is a block diagram showing an exemplary architectural arrangement of clients, servers, and external services.

In some embodiments, systems of the present invention may be implemented on a distributed computing network, such as one having any number of clients and/or servers. Referring now to FIG. 28, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 27. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 29:
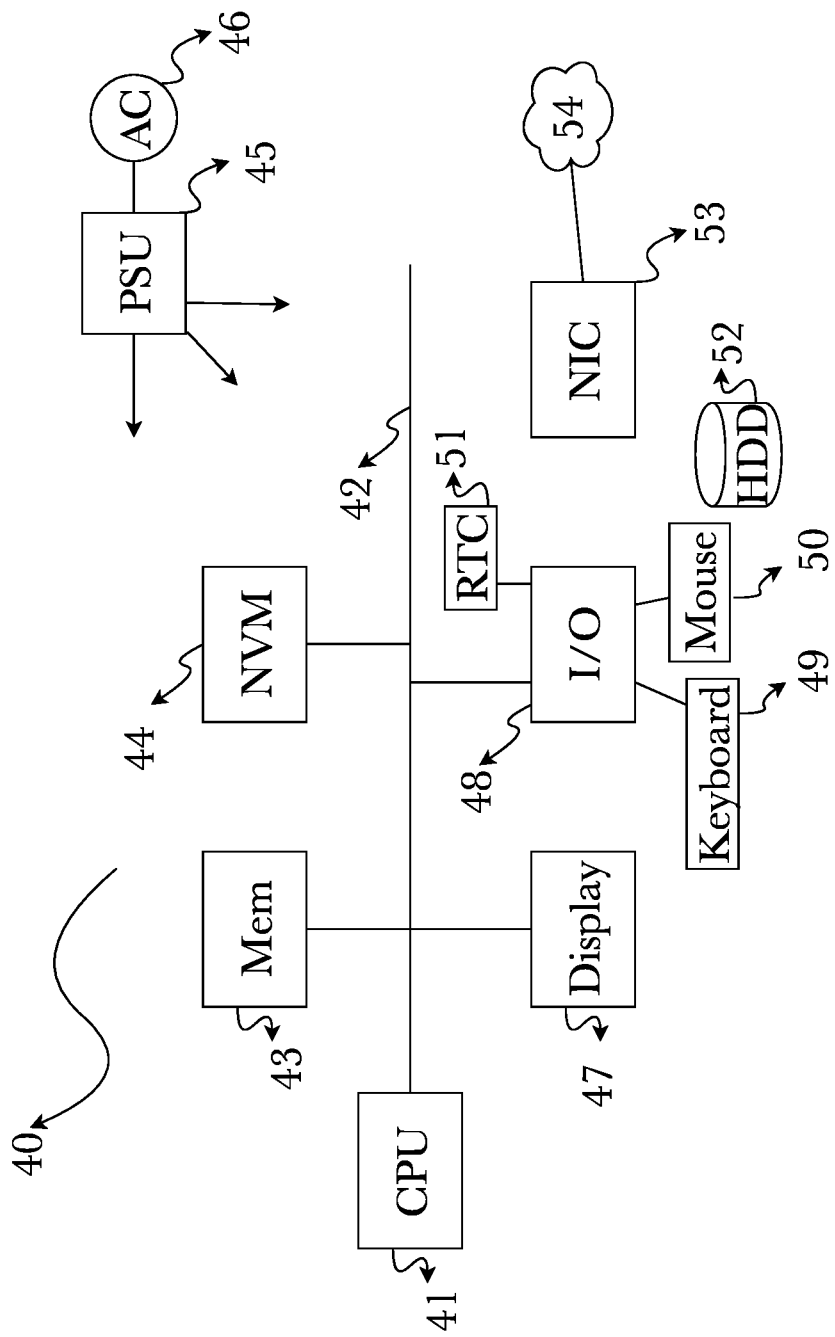
FIG. 29 is another block diagram illustrating an exemplary hardware architecture of a computing device.

FIG. 29 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for enhanced virtual queuing, comprising:
a task blending service comprising at least a processor, a memory, and a first plurality of programming instructions stored in the memory and operating on the processor, wherein the first plurality of programming instructions, when operating on the processor, cause the processor to:
receive a plurality of data relating to the historical throughput of a queue;
model future iterations of the queue using the plurality of data;
determine times of low queue throughput;
reallocate computational resources used for queue simulations during times of low queue throughput;
use the reallocated computational resources for simulating new queue configurations for the duration of the low queue throughput;
analyze the new queue configuration simulations for an optimal configuration, wherein the optimal configuration is the simulation with the least wait time; and
output the difference between the current queue configuration and the optimal queue simulation as a set of recommendations; and
an accumulation service comprising a second plurality of programming instructions stored in the memory and operating on the processor, wherein the second plurality of programming instructions, when operating on the processor, cause the processor to:
receive a request to join a virtual queue from two or more persons forming a group;
accumulate positions in the queue totaling the number of persons in the group;
send confirmation of the request to the group;
send periodic update notifications to the group based on a notification escalation plan, wherein the notification escalation plan comprises a rules-based multimodality means of communicating with the group;
receive a plurality of check-in notifications from an entity indicating the group has begun to check-in, or indicating how many persons in the group have already checked-in, or indicating the group has finished checking-in; and
remove the group from the virtual queue;
wherein the request is selected from the group consisting of a request to join a queue, a request to leave a queue, a request to transfer to a different queue, a request for the current wait time of a queue, a request for additional time, a request to schedule a position in a queue for a later time, and a request to change places in a queue.

2. The system of claim 1, wherein the multimodality means of communicating comprises internet-based communications, satellite communications, public telephone networks, mobile networks, Wi-Fi, Bluetooth, LoRa, public address systems, and near-field communications.

3. A method for enhanced virtual queuing, comprising the steps of:
receiving a plurality of data relating to the historical throughput of a queue;
modelling future iterations of the queue using the plurality of data;
determining times of low queue throughput;
reallocating computational resources used for queue simulations during times of low queue throughput;
using the reallocated computational resources for simulating new queue configurations for the duration of the low queue throughput;
analyzing the new queue configuration simulations for an optimal configuration, wherein the optimal configuration is the simulation with the least wait time; and
outputting the difference between the current queue configuration and the optimal queue simulation as a set of recommendations;
receiving a request to join a virtual queue from two or more persons forming a group;
accumulating positions in the queue totaling the number of persons in the group;
sending confirmation of the request to the group;
sending periodic update notifications to the group based on a notification escalation plan, wherein the notification escalation plan comprises a rules-based multimodality means of communicating with the group;
receiving a plurality of check-in notifications from an entity indicating the group has begun to check-in, or indicating how many persons in the group have already checked-in, or indicating the group has finished checking-in; and
removing the group from the virtual queue;
wherein the request is selected from the group consisting of a request to join a queue, a request to leave a queue, a request to transfer to a different queue, a request for the current wait time of a queue, a request for additional time, a request to schedule a position in a queue for a later time, and a request to change places in a queue.

4. The method of claim 3, wherein the multimodality means of communicating comprises internet-based communications, satellite communications, public telephone networks, mobile networks, Wi-Fi, Bluetooth, LoRa, public address systems, and near-field communications.

* * * * *